United States Patent
Movafagh

(10) Patent No.: US 11,621,549 B2
(45) Date of Patent: Apr. 4, 2023

(54) GROUND LEVEL PRIMARY ELECTRIC DISTRIBUTION SYSTEM

(71) Applicant: Roozbeh Movafagh, Novato, CA (US)

(72) Inventor: Roozbeh Movafagh, Novato, CA (US)

( * ) Notice: Subject to any disclaimer, the term of this patent is extended or adjusted under 35 U.S.C. 154(b) by 0 days.

(21) Appl. No.: 17/569,211

(22) Filed: Jan. 5, 2022

(65) Prior Publication Data
US 2022/0216682 A1 Jul. 7, 2022

Related U.S. Application Data

(60) Provisional application No. 63/134,349, filed on Jan. 6, 2021, provisional application No. 63/265,542, filed on Dec. 16, 2021.

(51) Int. Cl.
*H02G 9/06* (2006.01)
*E02F 5/10* (2006.01)
(Continued)

(52) U.S. Cl.
CPC ............... *H02G 9/06* (2013.01); *E02F 5/101* (2013.01); *E02F 5/12* (2013.01); *H02G 9/025* (2013.01)

(58) Field of Classification Search
CPC ........ H02G 3/06; H02G 15/003; H02G 15/00; H02G 9/06; H02G 9/02; H02G 9/00;
(Continued)

(56) References Cited

U.S. PATENT DOCUMENTS

| 4,276,091 A | 6/1981 | Aluminum |
| 4,276,332 A * | 6/1981 | Castle .................. H02G 3/0412 |
| | | 174/68.3 |

(Continued)

FOREIGN PATENT DOCUMENTS

| CH | 706129 B1 | 8/2013 |
| CN | 108975810 A | 12/2018 |

(Continued)

OTHER PUBLICATIONS

Anderton Product Range, 2019 Thorn & Derrick International, retrieved from www.powerandcables.com, p. 1-27, retrieved Mar. 10, 2022.

(Continued)

*Primary Examiner* — Angel R Estrada
(74) *Attorney, Agent, or Firm* — Edward S. Sherman

(57) ABSTRACT

A ground level primary electrical distribution system deploys terrain mounted or essentially terrain flush pipes that protect suppress ignition from fires that may occur if components fail within the pipes. The pipes can be deployed in remote and rugged terrain where overhead power lines poses fire risks from wind damage and it is impractical and disruptive to bury the electricity conducting cable or deployed along roadways or field at ground level or essentially flush with the ground to avoid excavation yet avoid the use of overhead power lines that can be subject to damage from high wind. The pipes can follow the terrain between junctions over rigid segments formed by a plurality of end-to-end coupled enclosures, while the conductors are protected within jacketing or flow through flexible insulating and isolating conduits within the more rigid pipes.

30 Claims, 37 Drawing Sheets

(51) Int. Cl.
*E02F 5/12* (2006.01)
*H02G 9/02* (2006.01)

(58) Field of Classification Search
CPC ............ H02G 9/025; H02G 3/00; H02G 3/02; H02G 3/04; H02G 3/0412; H02G 3/0437; H02G 3/22; H02G 3/283; H02G 3/285; E02F 1/00; E02F 5/101; E02F 5/12
USPC .......... 174/481, 480, 68.1, 68.3, 72 A, 72 C, 174/77 R, 76, 88 R, 70 C, 95; 248/68.1, 248/906, 49; 52/220.1–220.7; 385/134, 385/135; 428/920, 921; 405/180
See application file for complete search history.

(56) References Cited

U.S. PATENT DOCUMENTS

| | | | |
|---|---|---|---|
| 5,217,667 A | 6/1993 | Griffith | |
| 5,472,497 A | 12/1995 | Jaklin | |
| 5,681,640 A | 10/1997 | Kiser | |
| 5,985,385 A | 11/1999 | Gottfield | |
| 8,051,614 B1 * | 11/2011 | Peck | H02G 3/22 52/220.8 |
| 8,178,781 B2 * | 5/2012 | Duffy | H02G 3/0608 174/68.1 |
| 8,558,112 B2 * | 10/2013 | Pawluk | H02G 3/0437 174/68.3 |
| 10,029,945 B2 | 7/2018 | Werz et al. | |
| 2003/0210958 A1 | 11/2003 | Nothofer | |

FOREIGN PATENT DOCUMENTS

| | | |
|---|---|---|
| CN | 11817246 A | 10/2020 |
| EP | 1398798 A2 | 3/2004 |
| EP | 2346130 A2 | 7/2011 |
| GB | 476316 | 12/1937 |
| GB | 2554434 A | 4/2018 |
| WO | 2019069065 A1 | 4/2019 |

OTHER PUBLICATIONS

Technical Specifications for Green Trough, No. TS-101, Feb. 2018.
Elite Precast Concrete Cable Protection Covers, retrieved from www.powerandcables.com, retrieved Mar. 10, 2022.
GRP Cable Containment Rail Solution, retrieved from www.powerandcables.com on Mar. 10, 2022, dated Jan. 2021 on p. 28 of 28.
GRP Cable Containment, dated Aug. 2016 on p. 24 of 24.
Elevated Cable Troughing Brochure, retrieved from www.powerandcables.com on Mar. 10, 2022.
BCM GRC Limited Product Information, retrieved from www.powerandcables.com on Mar. 10, 2022.
TTS Technical Specification for Green Trough No. TS-101, Feb. 2018 version.
Webpage https://www.powerandcable.com/product/cable-trough/grc-cable-trough/ retrieved Mar. 11, 2022.
Diagram of Straight, bend, gradient and T-junction troughs, retrieved from www.powerandcables.com on Mar. 10, 2022.

* cited by examiner

FIG. 1A
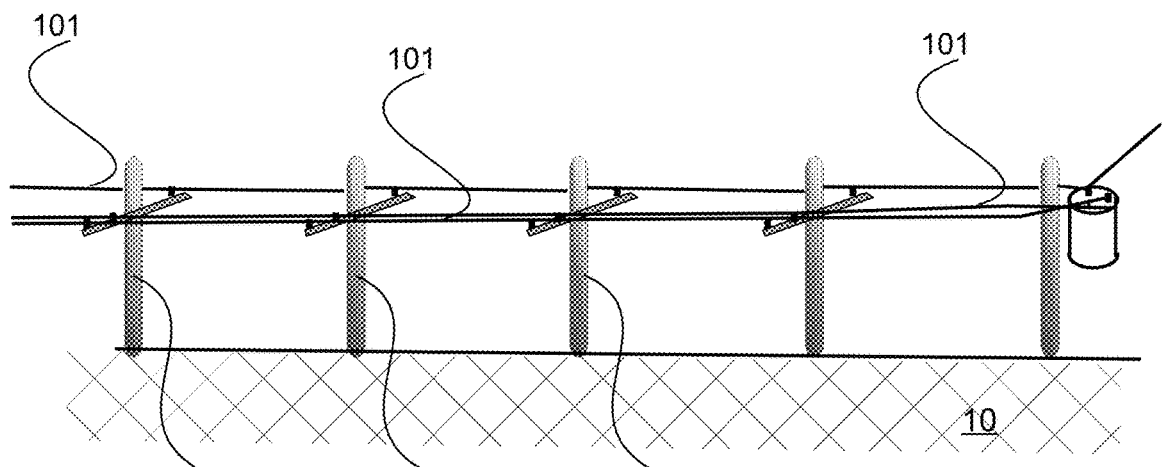
*Prior art*
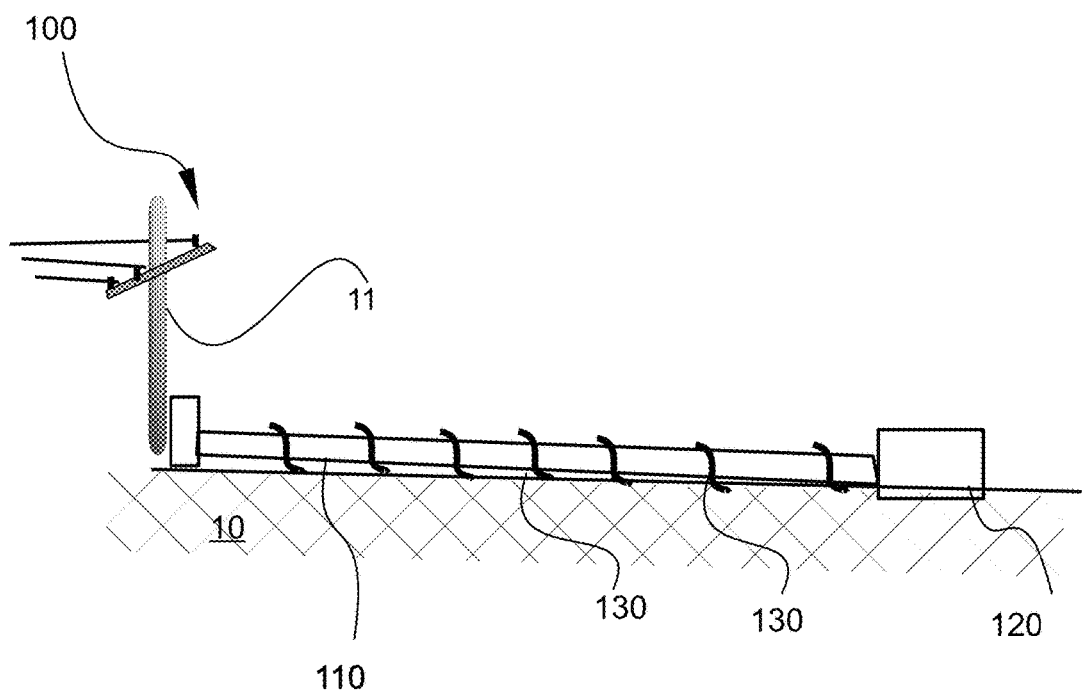
FIG. 1B

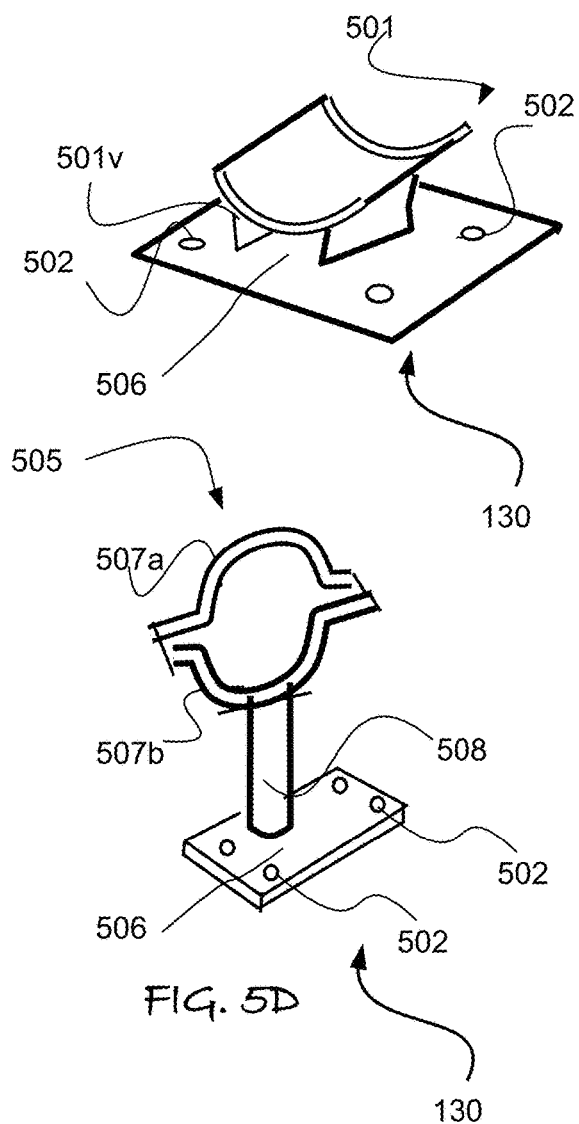
FIG. 5A
FIG. 5D
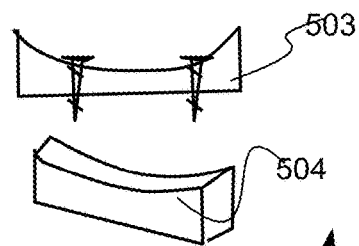
FIG. 5B
FIG. 5C
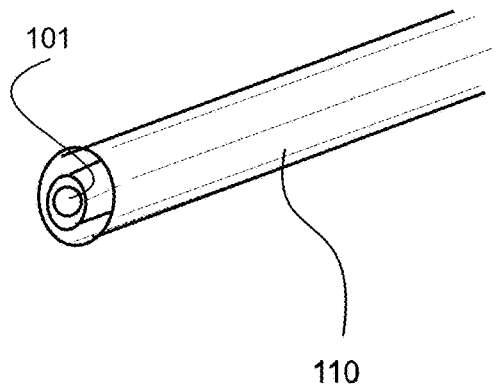
FIG. 5E

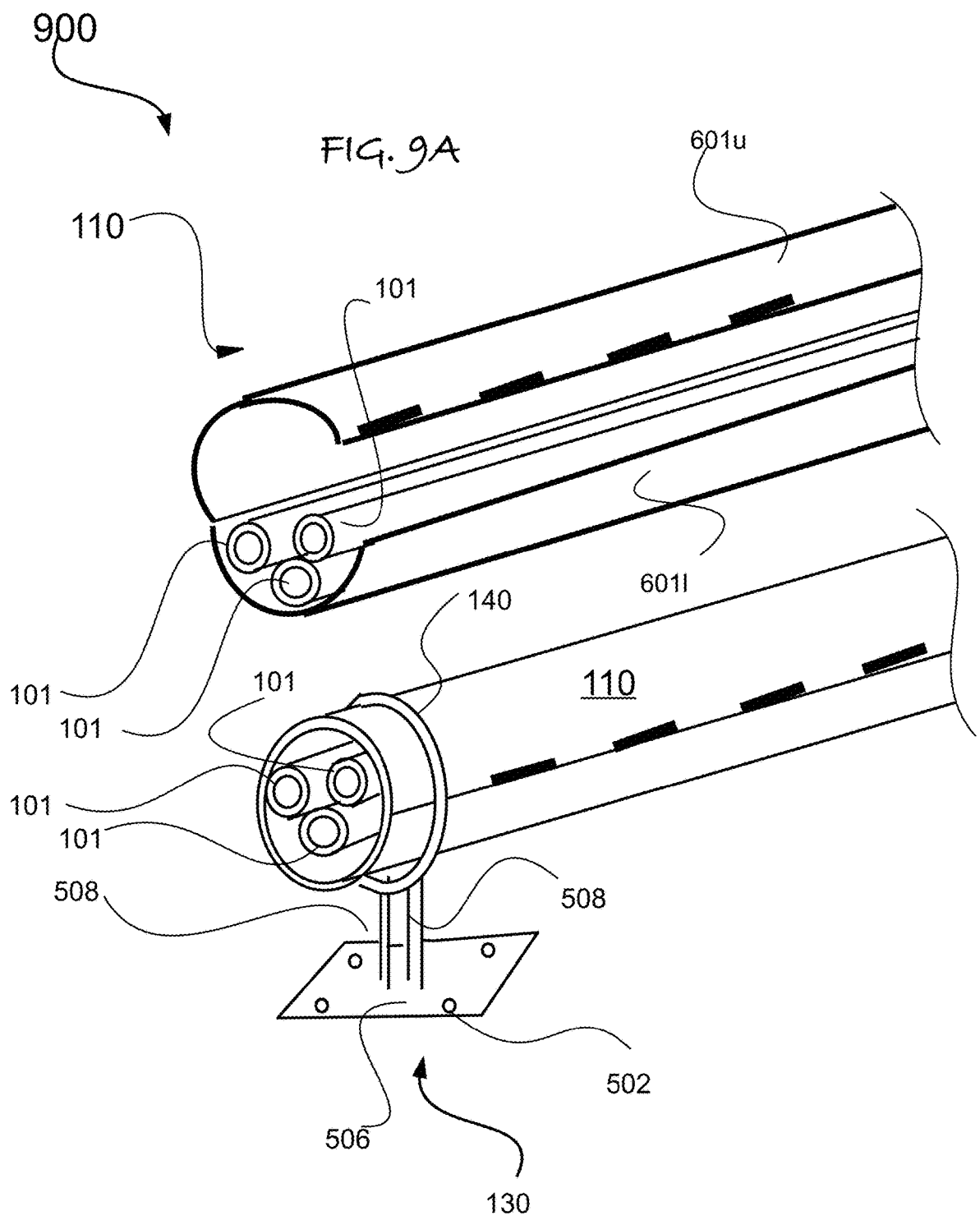

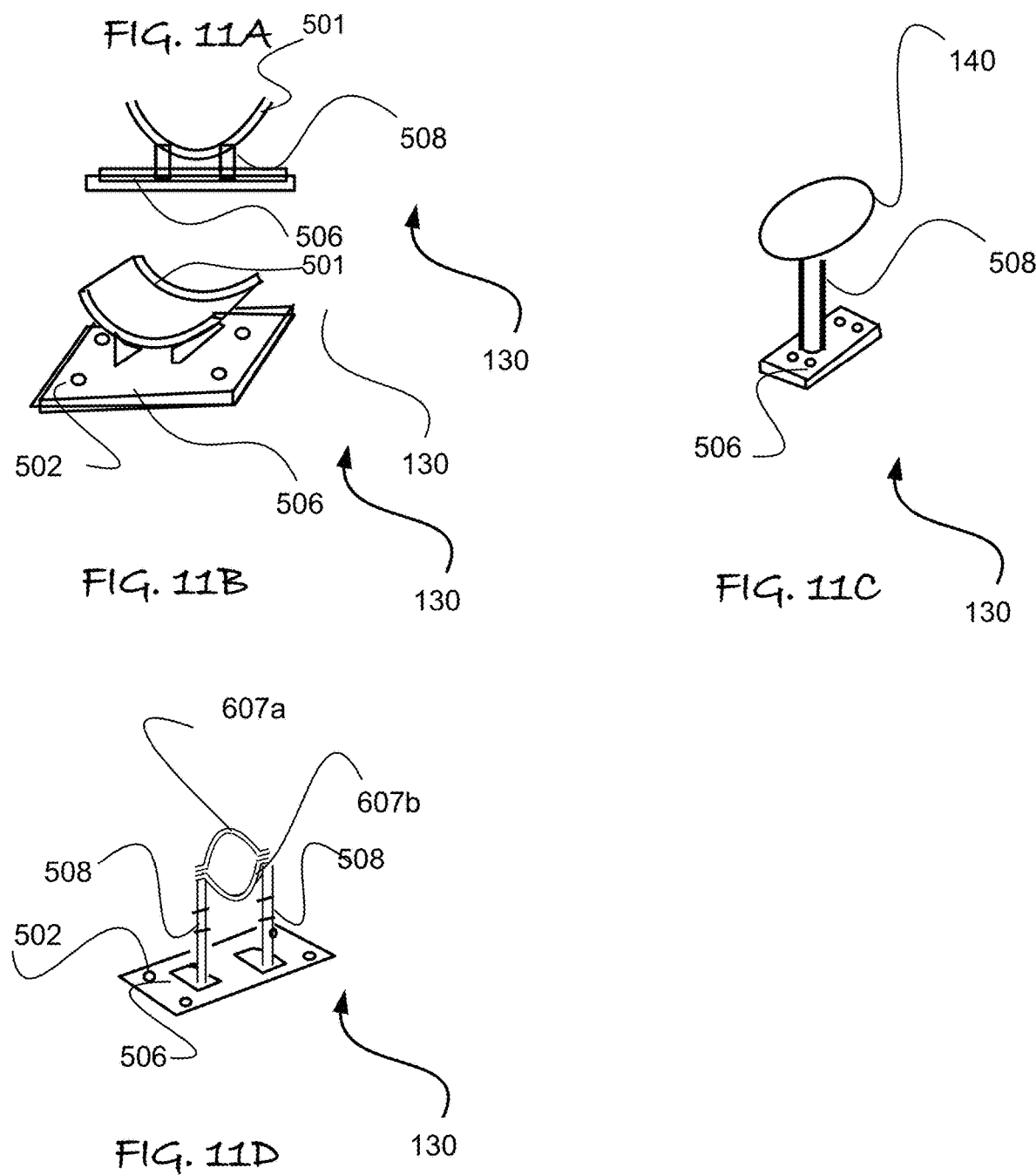

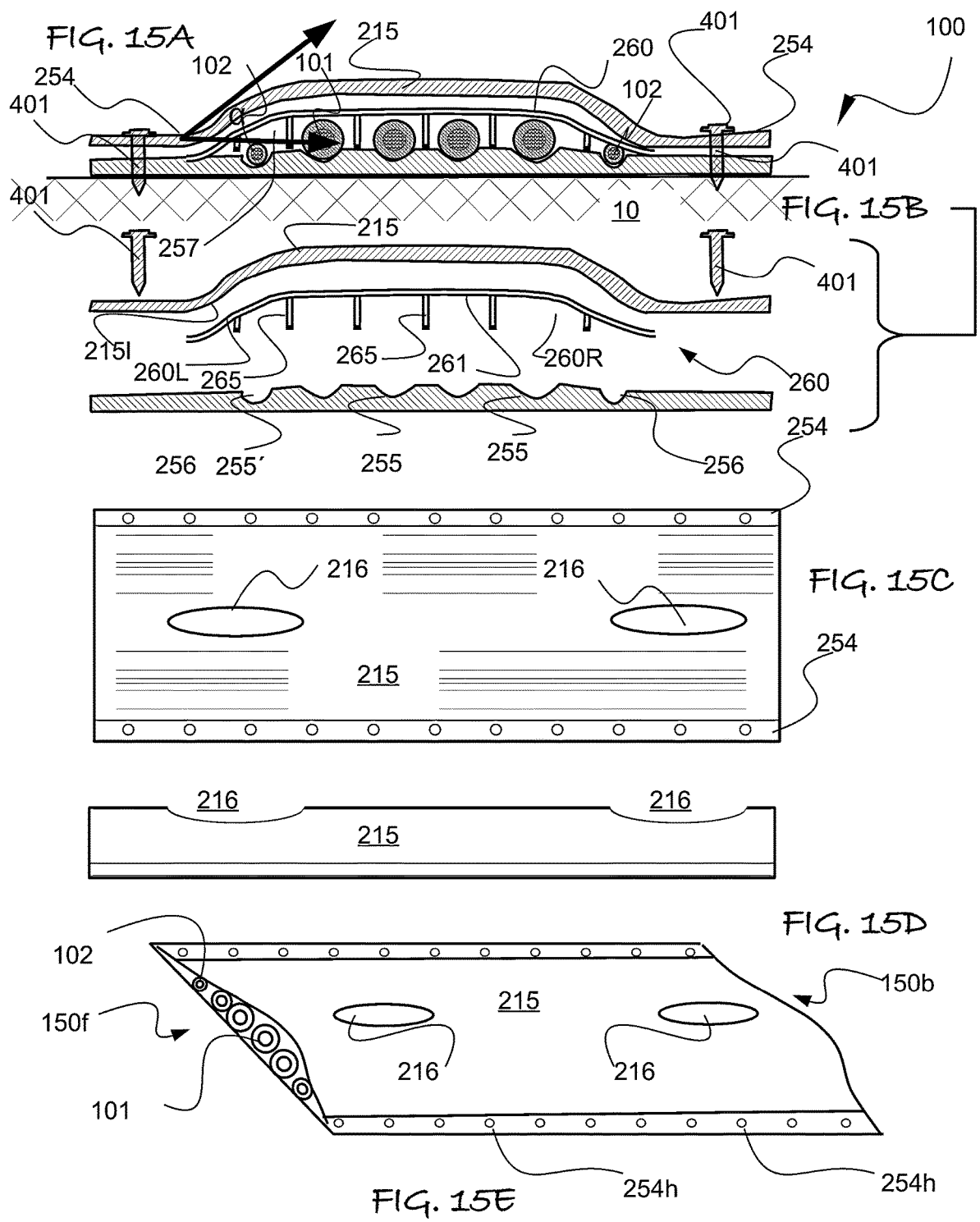

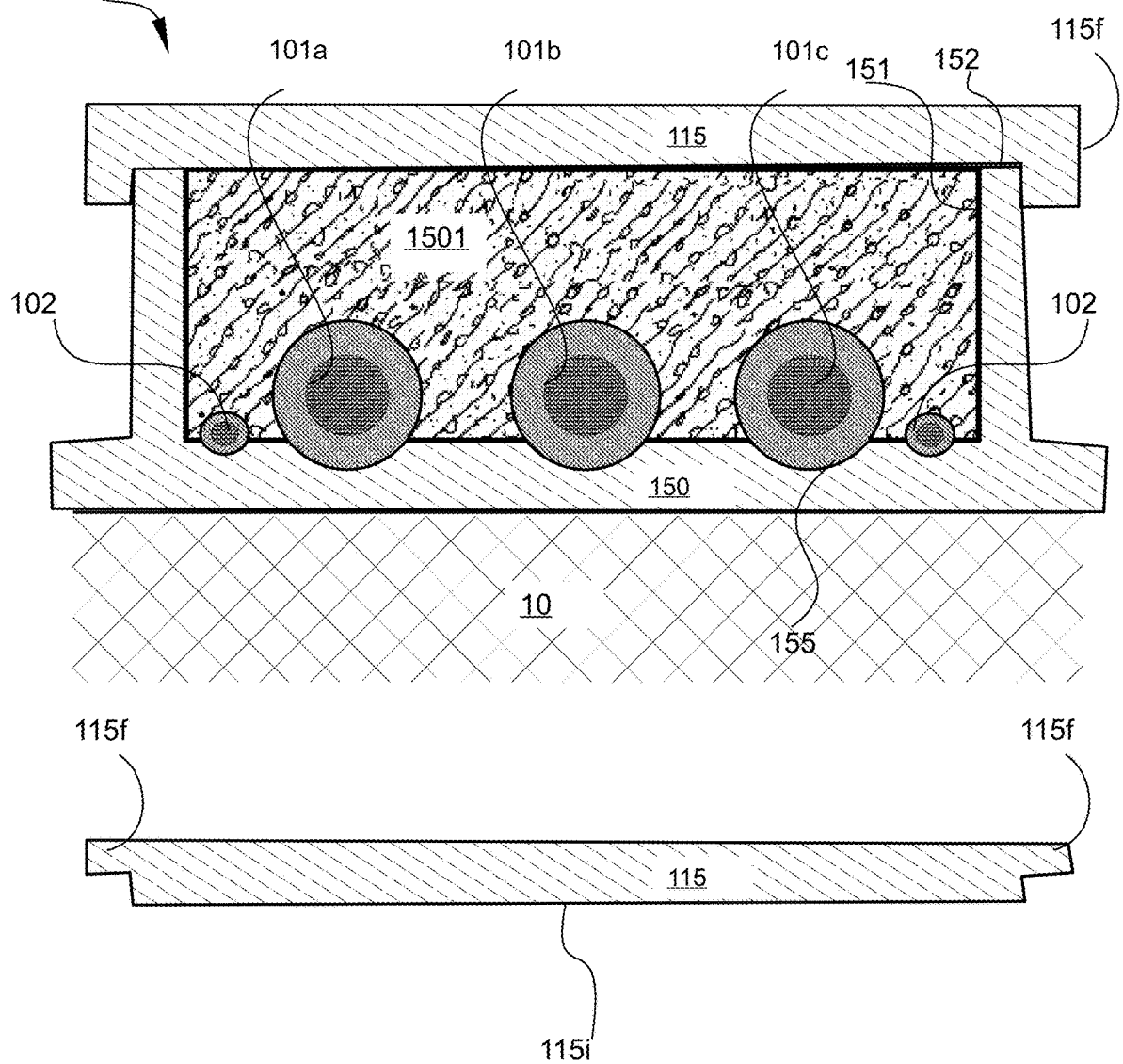

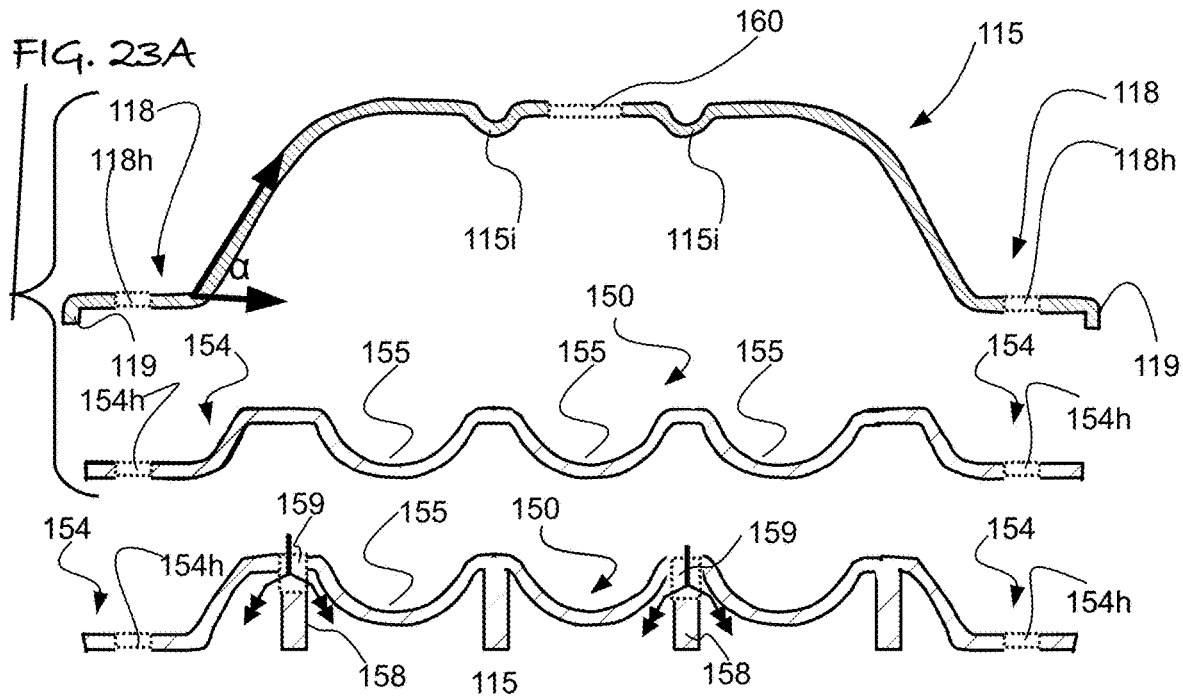
FIG. 23A
FIG. 23B
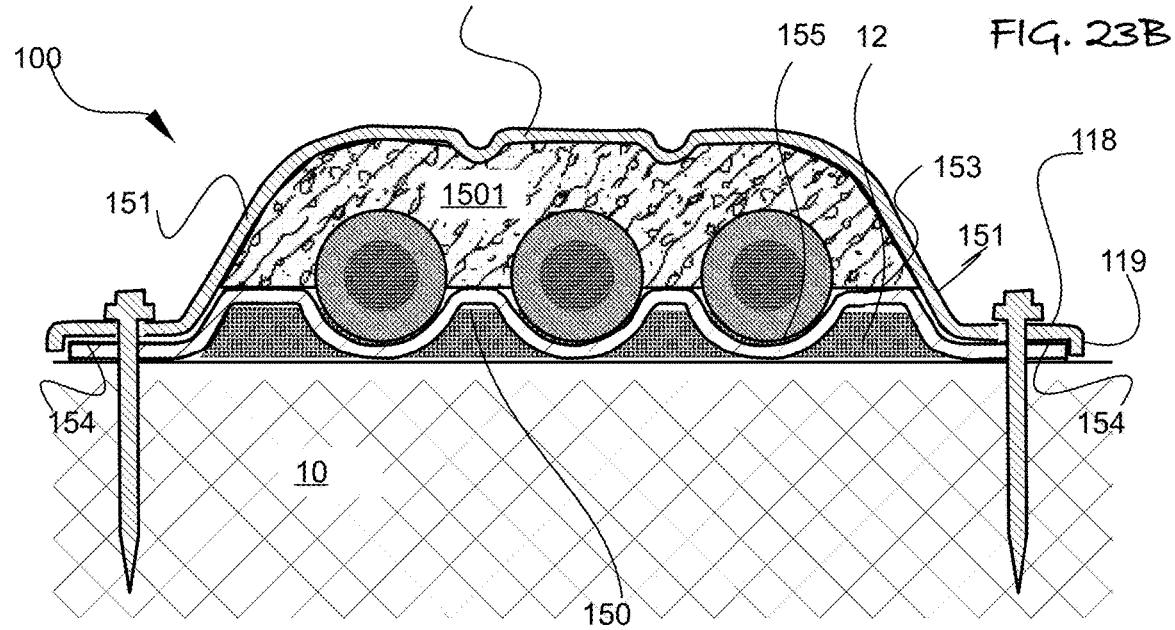
FIG. 23C

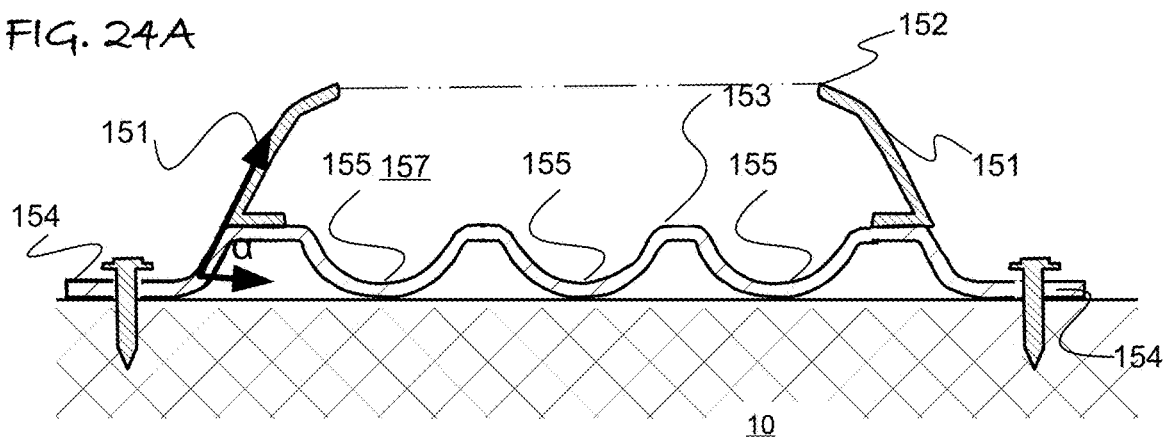
FIG. 24A
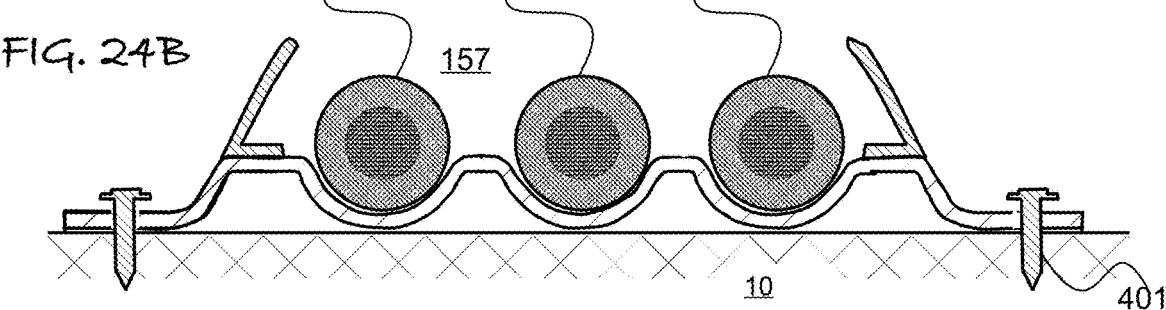
FIG. 24B
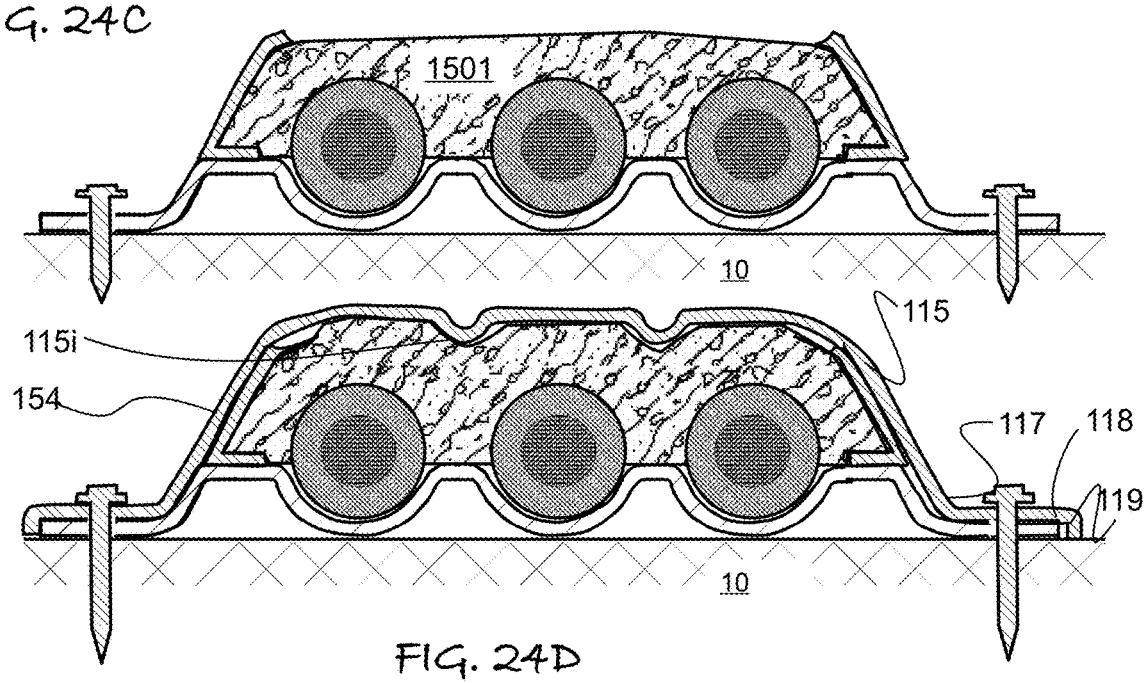
FIG. 24C
FIG. 24D

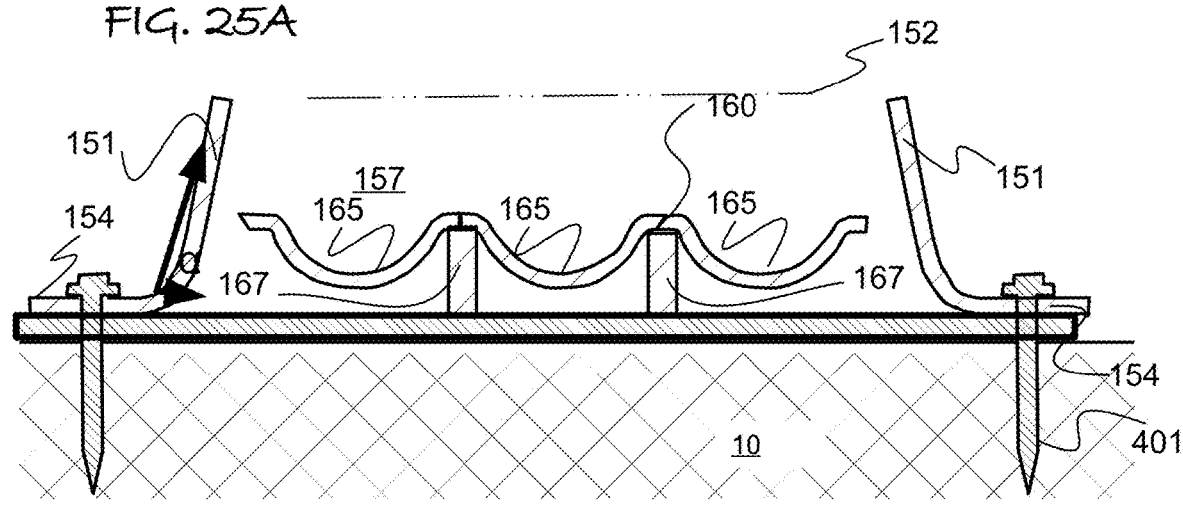
FIG. 25A
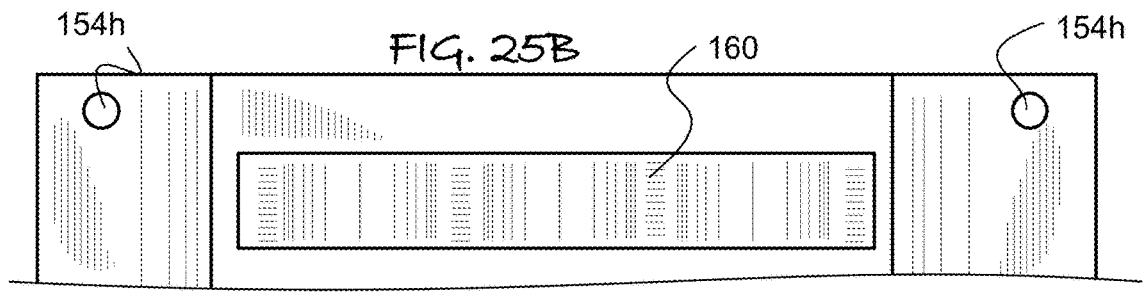
FIG. 25B
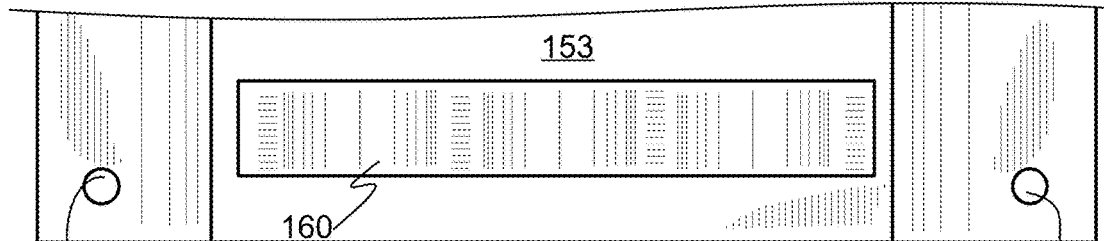
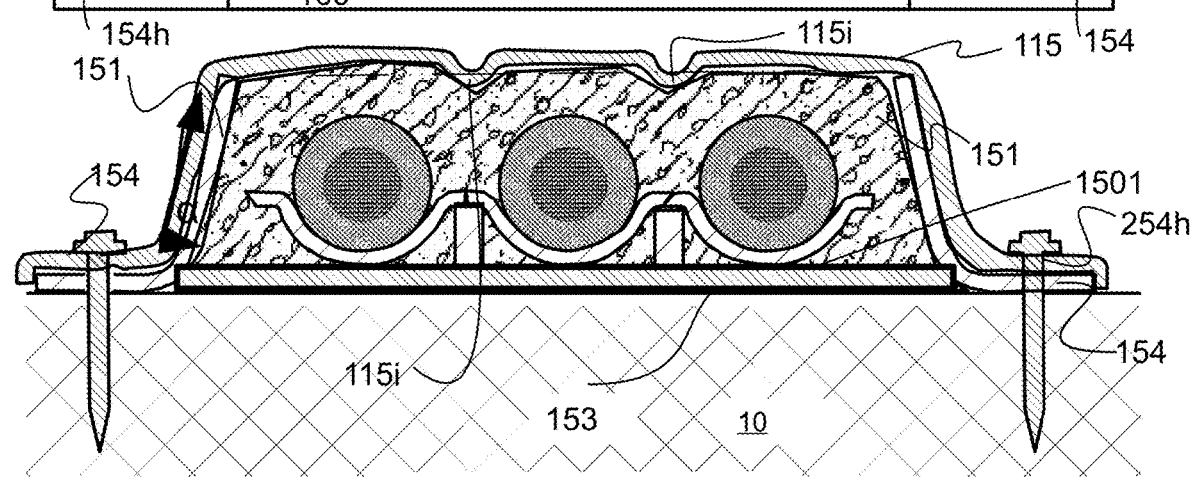
FIG. 25C

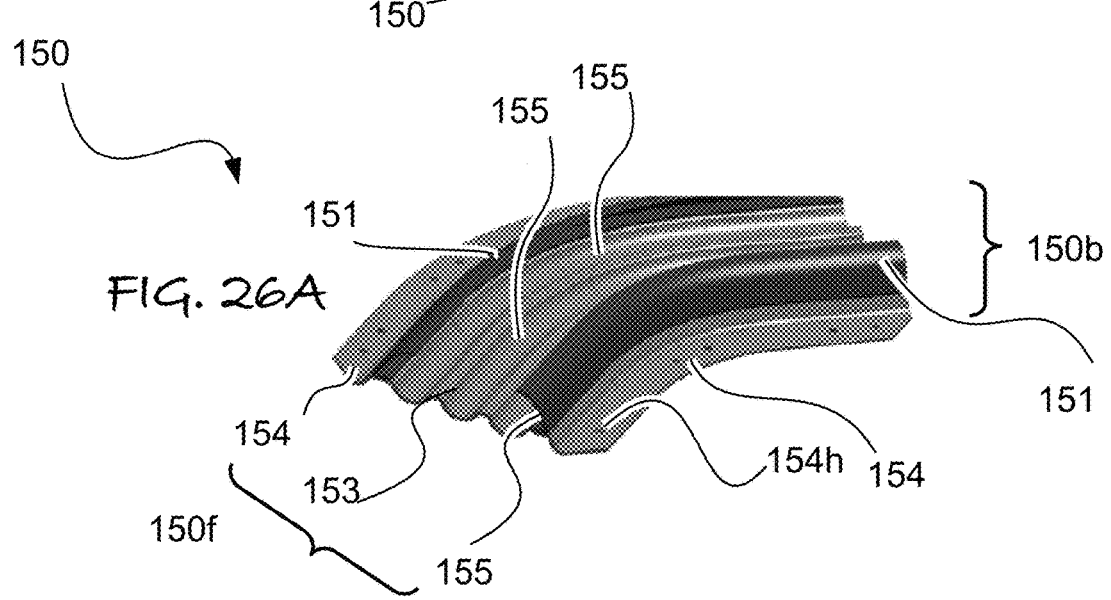
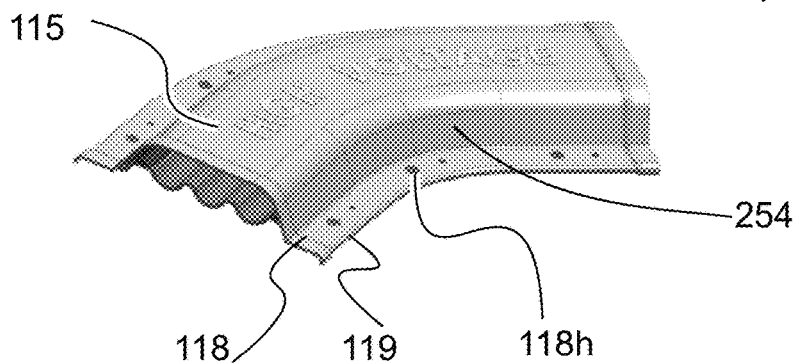

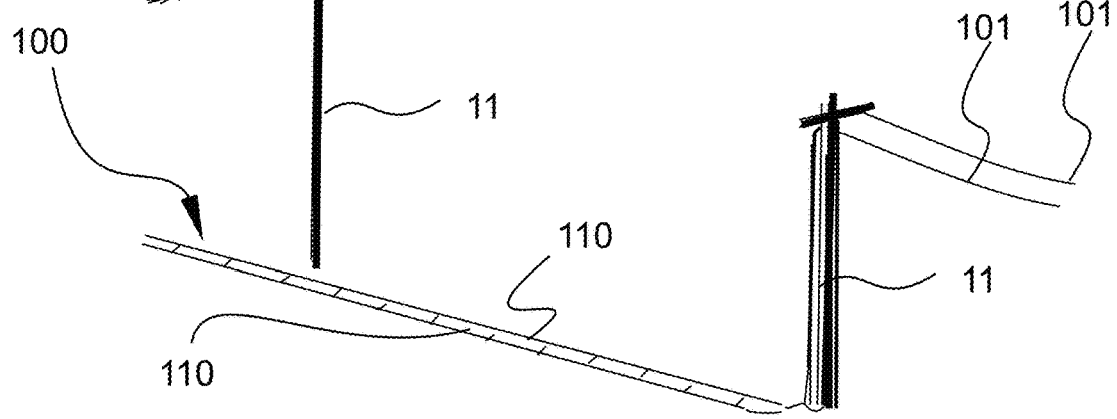
FIG. 28A
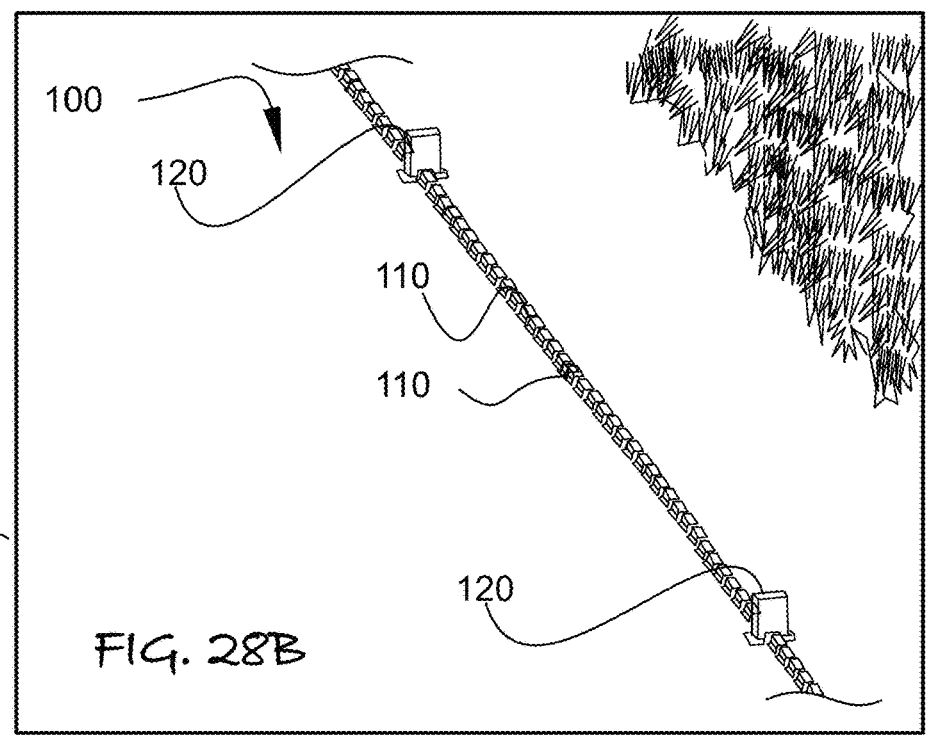
FIG. 28B
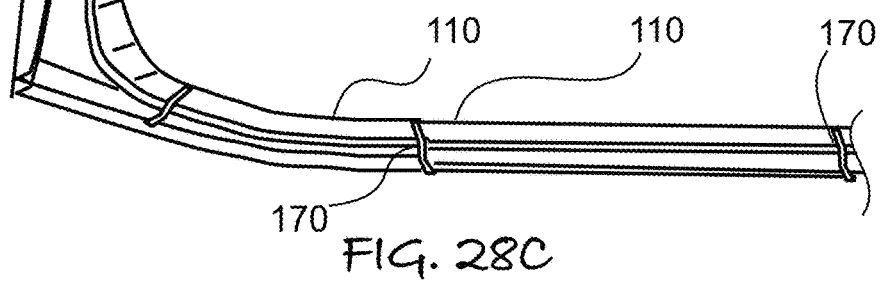
FIG. 28C

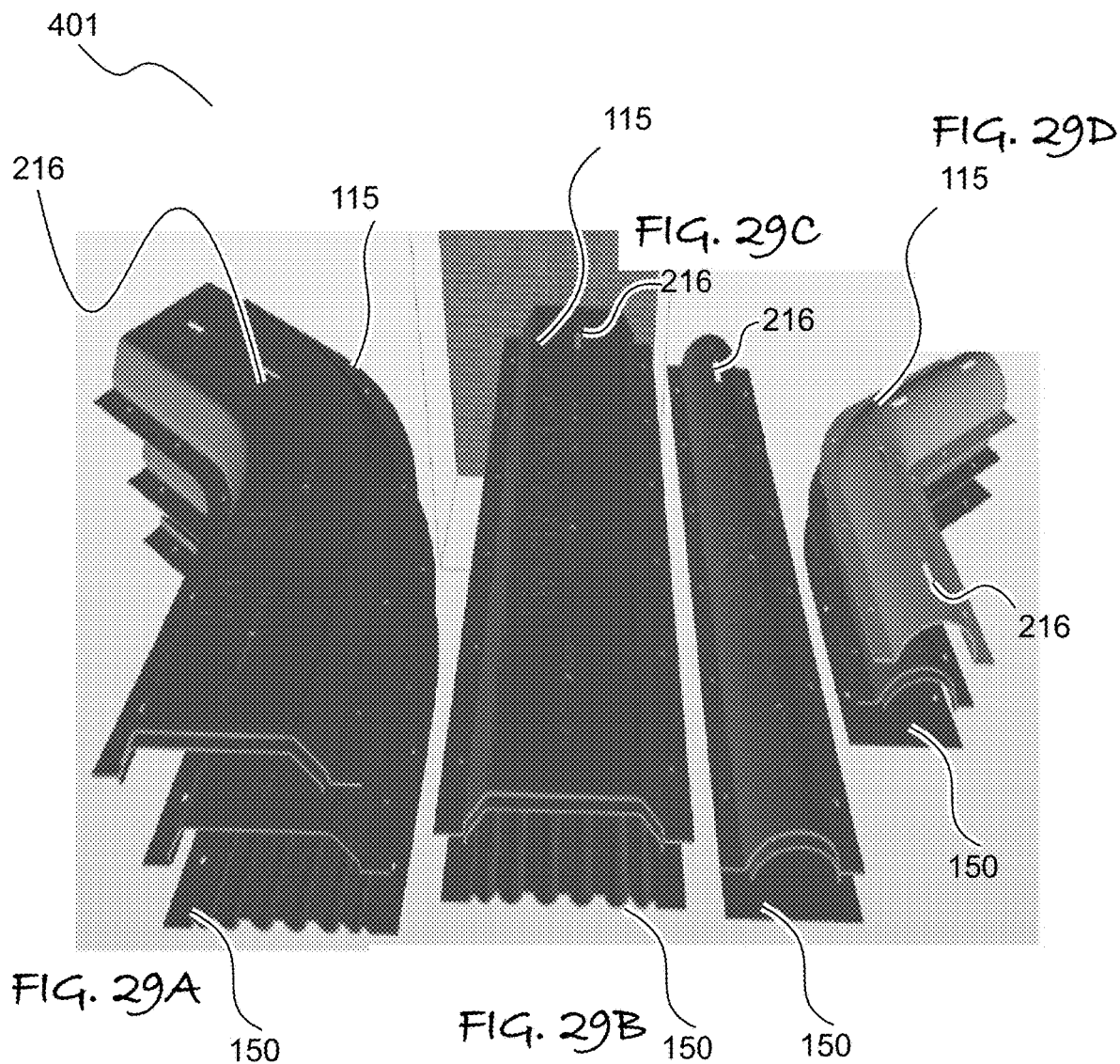

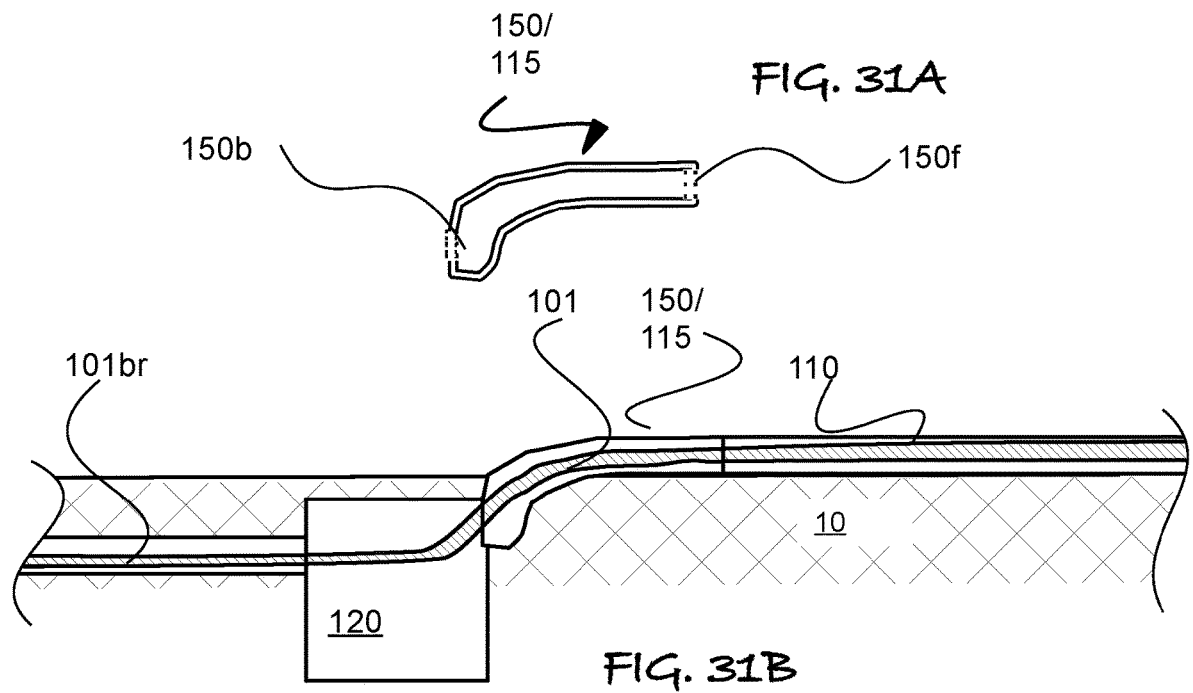
FIG. 31A
FIG. 31B
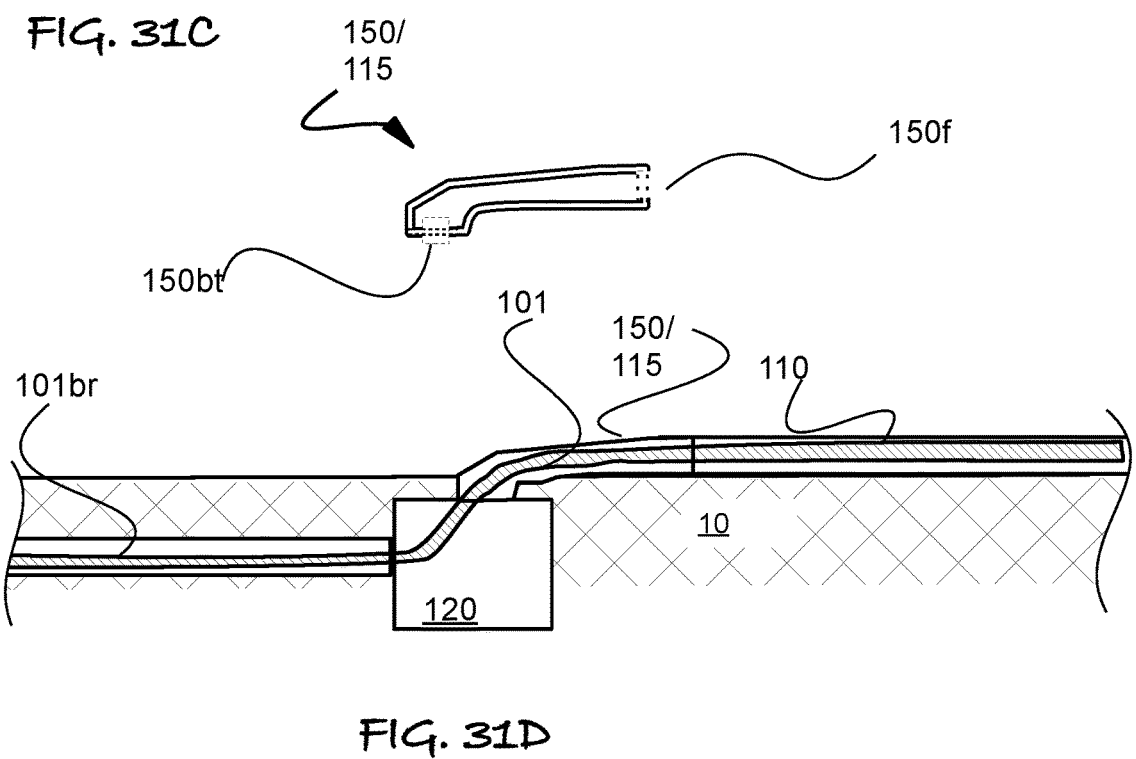
FIG. 31C
FIG. 31D

FIG. 34A
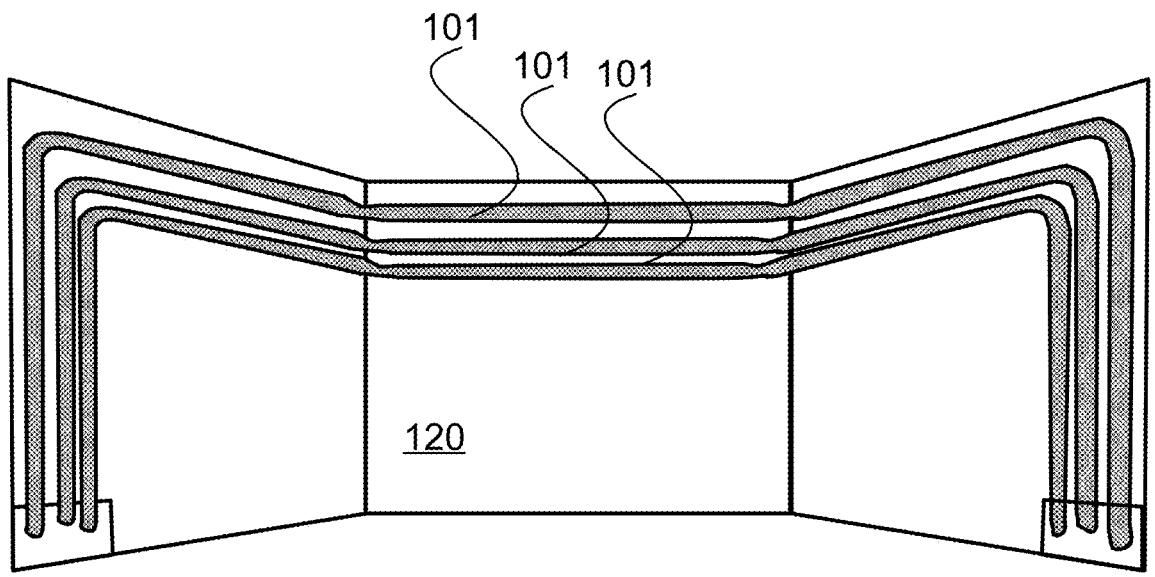
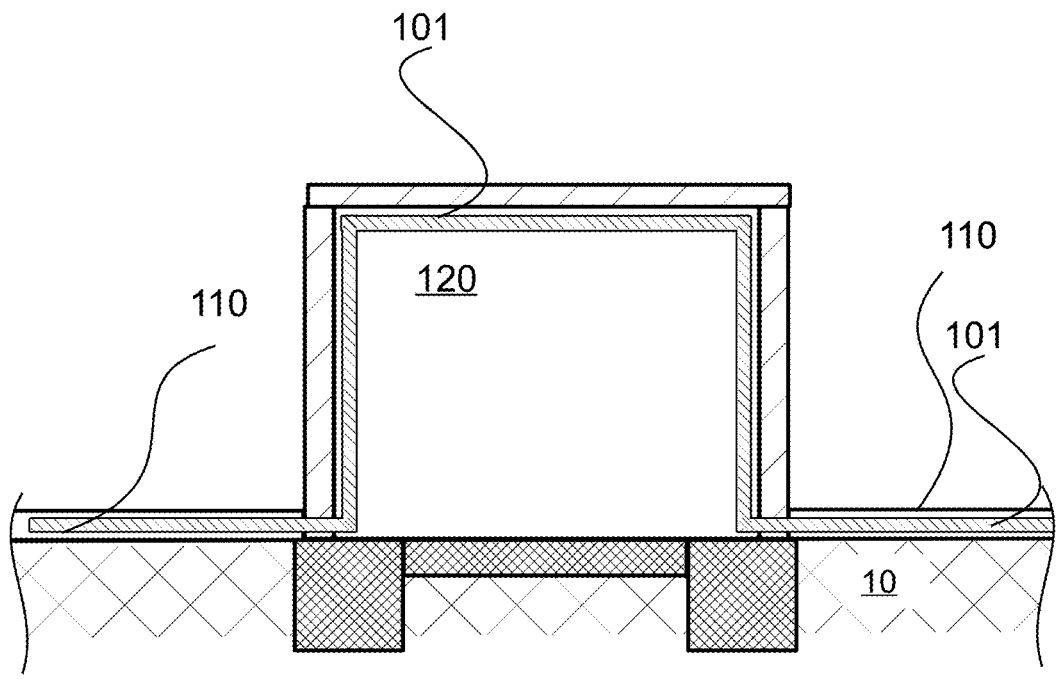
FIG. 34B

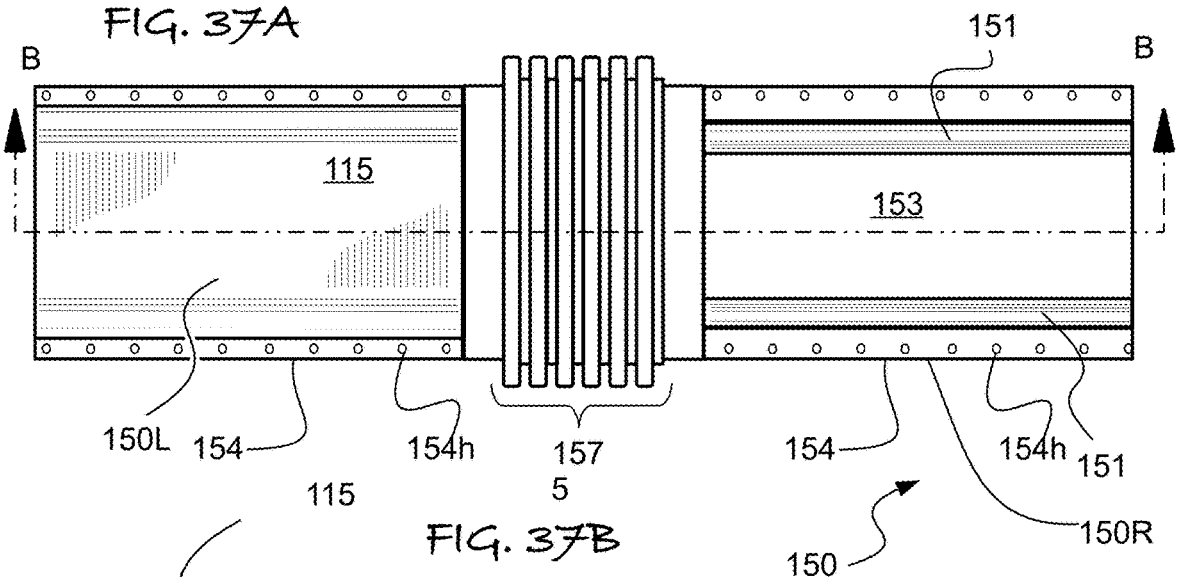
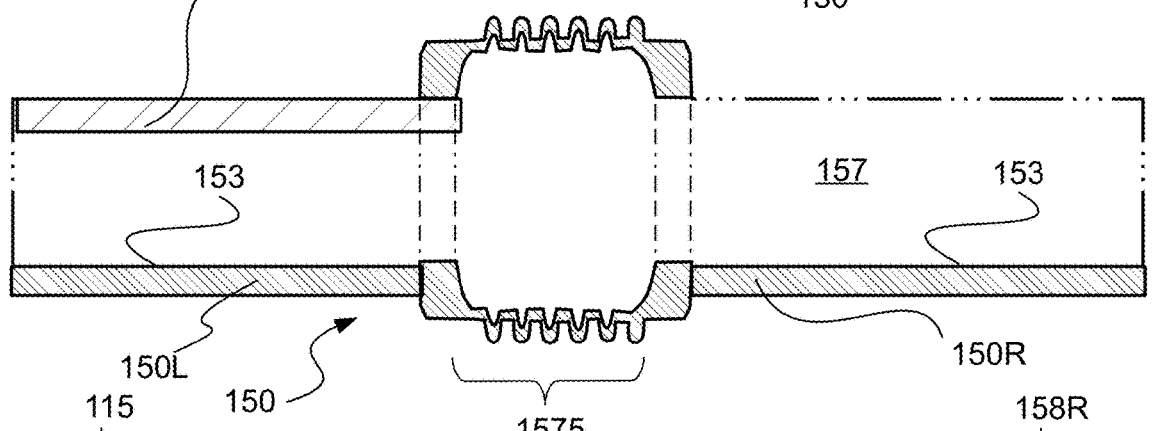
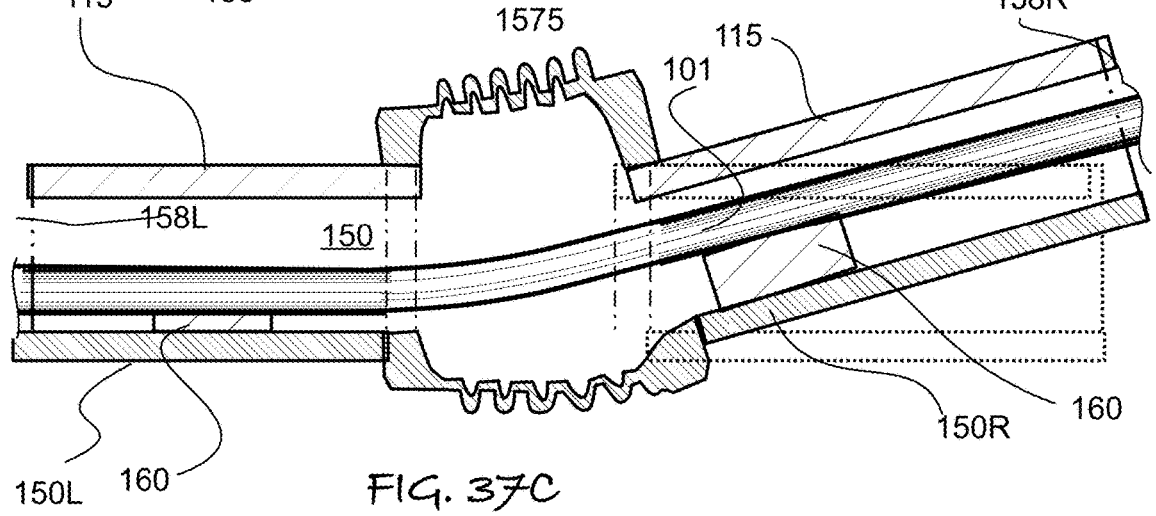

GROUND LEVEL PRIMARY ELECTRIC DISTRIBUTION SYSTEM

CROSS REFERENCE TO RELATED APPLICATIONS

The present application claims the benefit of priority to the following US Provisional applications: Ser. No. 63/134,349 filed on Jan. 6, 2021 and Ser. No. 63/265,542 filed in Dec. 16, 2021, both of which are incorporated herein by reference.

BACKGROUND OF INVENTION

The field of inventions is electric utility distribution systems.

The traditional primary distribution system design and construction continues to present risk, execution, construction, and financial challenges in meeting the hazards and as well as operational implications as it relates to climate change (Extremes or unprecedented wind levels, drought, increased tree mortality rate, and temperature rise, etc.)

Rebuilding the electric system to achieve to support arc free fire prevention is especially challenging in rural, unpopulated, or inaccessible areas with difficult terrain. A clear example is the most recent events of wildfires in California since 2017, where public safety and massive fire has been the result of unprecedented high wind levels causing vegetation contact with open conducers, branches or dead trees falling into energized overhead lines, Equipment or components failures resulting in electrical arcing and fire ignition.

Although the Californian utilities have deployed many strategies both from an operational perspective by shutting lines down during high fire index days and rebuilding the overhead systems with cover conductors and larger structures, there is no viable cost-effective solution to meet the needs of their customers to ensure reliable and safe power supply.

Accordingly, it is a first object of the invention to provide a viable and cost-effective solution to eliminate or minimize the risk fire ignition associated with primary electric grid due to external implication of climate change.

Another object of the invention is to provide such a solution in difficult terrain such as mountains areas, granite, rock, and hard grounds does not lend itself to the traditional undergrounding of electric facilitates or become prohibitive due to construction or field execution challenges.

The above and other objects, effects, features, and advantages of the present invention will become more apparent from the following description of the embodiments thereof taken in conjunction with the accompanying drawings

SUMMARY OF INVENTION

In the present innovation, a first object is achieved by providing a ground level primary electric distribution system (GLDS) that comprise, a plurality of pipes, in which two or more pipes of said plurality being connected at a junction, conductor cables extending through the two or more pipes, a means for mounting at least one of the pipes of said plurality substantially in proximal contact with terrain, wherein the plurality of pipes are configured to contain internal thermal ignition and preclude external damage to the integrity of the plurality of pipes and the conductor cables extending therethrough.

A second object of the invention is achieved by providing such a ground-level primary electric distribution system in which one or more pipes of the plurality has a fire-resistant concrete surrounding the conductor cables to contain internal thermal ignition and preclude external damage.

Another object of the invention is achieved by providing any such ground-level primary electric distribution system in which one or more pipes of the plurality form an acute angle less than 60 degrees with respect to the terrain in a direction transverse to a principal axis of the pipe.

Another object of the invention is achieved by providing any such ground-level primary electric distribution system in which one or more pipes of the plurality are disposed in proximal contact with the terrain by a plurality of enclosures, each having a bottom, opposing sidewalls that extend upward from opposing sides of the bottom that are aligned with a local principal axis of the pipe, in which the enclosures are connected at opposing ends that are generally orthogonal to the sidewalls, and a lid is disposed on the enclosure to covers an upper opening between the opposing sidewalls.

Another object of the invention is achieved by providing any such ground-level primary electric distribution system in which the conductor cables extend in a convoluted path within the junction.

Another object of the invention is achieved by providing any such ground-level primary electric distribution system in which the conductor cables are energized to at least 4,000 V.

Another object of the invention is achieved by providing any such ground-level primary electric distribution system in which connections between adjacent enclosures and the lids disposed thereon are covered by a plurality of coupling bars.

Another object of the invention is achieved by providing any such ground-level primary electric distribution system in which the conductor cables are insulated with a flexible dielectric material and the pipes are more rigid than the flexible dielectric material.

Another object of the invention is achieved by providing any such ground-level primary electric distribution system in which one of the lid and enclosures have outward extending side flanges disposed in proximal contact with the terrain for coupling thereto and one of the lid and the enclosure are form an acute angle less than 60 degrees with respect to the terrain.

Another object of the invention is achieved by providing any such ground-level primary electric distribution system in which in which one or more pipes of the plurality has a fire-resistant concrete surrounding the conductor cables to contain internal thermal ignition and preclude external damage.

Another object of the invention is achieved by providing any such ground-level primary electric distribution system in which downward extending portions of the lid covers the exterior of the sidewalls.

Another object of the invention is achieved by providing any such ground-level primary electric distribution system in which the downward extending portions of the lid that covers the exterior of the sidewalls have outward extending lateral flanges.

Another object of the invention is achieved by providing any such ground-level primary electric distribution system in which the side flanges have through holes for receiving anchors to couple the pipes in proximal contact with the terrain.

Another object of the invention is achieved by providing any such ground-level primary electric distribution system in which the junction is a walk-in height reinforced enclosure.

Another object of the invention is achieved by providing any such ground-level primary electric distribution system in which a portion of the lid has downward extending portion that covers the exterior of the sidewalls which then terminated in outward extending side flanges having a plurality of holes which extend over the outward extending side flanges of the enclosure that are disposed in proximal contact with the terrain for coupling thereto.

Another object of the invention is achieved by providing any such ground-level primary electric distribution system in which the side flanges of the lid extend over the side flanges of the enclosure are configured to vertically align the holes in the lid side flanges over at least some of the holes in the enclosure side flanges for receiving anchors that extend through the vertically aligned holes to couple at least one pipe to the terrain.

Another object of the invention is achieved by providing any such ground-level primary electric distribution system in which connections between adjacent enclosure and the lids disposed on the enclosed are covered by a plurality of coupling bars that engage at least one of the side flanges of the lid and the side flanges of the enclosure by flexing snap in place over the side flanges of at least one of the lid and the enclosure.

Another object of the invention is achieved by providing any such ground-level primary electric distribution system in which at least one or more of the enclosures of the plurality is connected to an adjacent enclosure by a hollow coupling segment with an interior cavity surrounded by a convoluted flexible wall.

Another object of the invention is achieved by providing any such ground-level primary electric distribution system in which one or more of the enclosures of the plurality has a central or medial portion with an interior cavity surrounded by a convoluted flexible wall.

Another object of the invention is achieved by providing any such ground-level primary electric distribution system in which one or more of the enclosures of the plurality is curved to change a local principal axis of a portion of at least one pipe.

Another object of the invention is achieved by providing a container system for forming channels that receive conductor cable for one of an essentially flush and ground level electrical distribution system, the container system comprising an enclosure having a tray one or more cable support members laterally spaced apart between opposing sidewalls that extend generally upward from a bottom of the tray to terminate at a rim, a lid configured to close a vertical opening in the tray when set to extend across the rim.

Another object of the invention is achieved by providing such a container system for forming channels that receive conductor cable for one of an essentially flush and ground level electrical distribution system in which the cable support members are one of formed integrally within the bottom of the tray and spaced apart and extending at least partially over a portion of the bottom of the tray.

Another object of the invention is achieved by providing any such container system for forming channels that receive conductor cable for one of an essentially flush and ground level electrical distribution system in which the cable support members have a plurality of holes to the allow a liquid used to the fill a cavity between the tray and the lid to flow under the tray and cable support members.

Another object of the invention is achieved by providing any such container system for forming channels that receive conductor cable for one of an essentially flush and ground level electrical distribution system in which the tray has one or more of outward extending flanges and the lid has downward extending side walls.

Another object of the invention is achieved by providing any such container system for forming channels that receive conductor cable for one of an essentially flush and ground level electrical distribution system wherein a lower portion of the lid penetrate below the rim.

Another object of the invention is achieved by providing any such container system for forming channels that receive conductor cable for one of an essentially flush and ground level electrical distribution system in which the tray has a central or medial portion with an interior cavity surrounded by a convoluted flexible wall.

Another object of the invention is achieved by providing a method of forming a ground level distribution system, the method comprising the steps of providing a plurality of bases having sidewalls on opposing sides of the base that extend in a generally upright direction to a rim and a lid configured to be supported on the rim of each base to close a vertical opening of the base, in which the container with the lid installed on the rim has a first height from an exterior bottom of the base to the exterior top of the lid, forming a shallow elongated trench to a depth at least a deep as first height and a length sufficient to receive the plurality of bases when configured with ends that are generally orthogonal to the sidewall disposed adjacent a nearest neighbor base in the plurality, inserting the bases in the shallow trench with the bottom of each base vertical and the sidewalls thereof generally horizontal in which ends of each base other than a first and a last base are adjacent the ends that are generally orthogonal to the sidewall disposed adjacent a nearest neighbor base in the plurality, installing one of at least one conduit and a plurality of conductors in channel supports that are one of formed in the base and inserted into the base, filling an enclosed channel formed by the plurality of bases in the trench with concrete to surround and encase the installed conduit or conductors, setting the lid on the rim of each base, when the top of the lids are below a grade of the adjacent soil covering the lid with granular matter provides a flush grade over the trench, when the exterior of the sidewalls of the bases are not adjacent sidewall of the trench then filling a gap between sidewalls of the trench and exterior of the sidewalls of the bases with a granular material.

Another object of the invention is achieved by providing such a method of forming a ground level distribution system in which the step of setting the lid on the rim of each base occurs after the concrete has filled the enclosed channel but before the concrete has set so at least portion of the lid are adhere to the concrete.

Another object of the invention is achieved by providing any such method of forming a ground level distribution system in which the step of setting the lid on the rim of at least some of the bases occurs before occurs before the step of filling the enclosed channel with concrete.

Another object of the invention is achieved by providing any such method of forming a ground level distribution system in which concrete is one of pumped into the covered channel and poured into the covered channel via holes in the lids Another object of the invention is achieved by providing any such method of forming a ground level distribution system in which the bases are provided and inserted in the shallow trench by extrude a continuous base of concrete.

The above and other objects, effects, features, and advantages of the present invention will become more apparent from the following description of the embodiments thereof taken in conjunction with the accompanying drawings.

BRIEF DESCRIPTION OF DRAWINGS

FIG. 1A is a schematic diagram of the prior art overhead electrical distribution system, whereas FIG. 1B is a schematic diagram of an inventive ground-level distribution system.

FIG. 2A is a schematic diagram of another embodiment of the ground-level distribution system, whereas

FIG. 5A-D are perspective views of various components for optional use with the ground-level distribution system. FIG. 5E is a cut away perspective view of a cable configuration

FIGS. 9A and 9B is a schematic cutaway perspective view of another alternative embodiment of the cable system or a component thereof.

FIG. 11A-D are schematic illustrations of various alternative anchoring means ground-level distribution system components.

FIG. 15A-15E are schematic structural and assembly diagrams of another aspect of ground-level distribution system components in which FIG. 15A is a transverse cross-sectional view of the assembled and complete system, FIG. 15B is an exploded cross-sectional view of the components thereof before assembly and encasement of conductors and fiber optic cables. FIG. 15C is a top plan view of the outermost component in FIG. 15B, FIG. 15D is a side elevation view thereof and FIG. 15E is perspective view of a portion of the complete system in FIG. 15A showing the transverse cross-section thereof.

FIG. 16A-16C are schematic structural and assembly diagrams of another aspect of ground-level distribution system components in which FIG. 16A is a transverse cross-sectional view of the assembled and complete system, FIG. 16B is an exploded cross-sectional view of the components thereof before assembly and encasement of conductors and fiber optic cables. FIG. 16C is a top plan view of the outermost component in FIG. 16A.

FIG. 17A-E are schematic structural and assembly diagrams of another aspect of ground-level distribution system components in which FIG. 17A is a transverse cross-sectional elevation view of a portion of the complete system.

FIG. 17B is an exploded transverse cross-sectional elevation view of a tray and lid that form components of the FIG. 17C is a top plan view of the lid in FIG. 17A-17B. FIG. 17D is a top plan view of optional connector piece and FIG. 17E is a transverse cut away perspective view of a portion of the complete system.

FIG. 18A-18D schematically illustrated a 4-way junction box for providing connections to the various embodiments of the ground-level distribution system components in which FIG. 18A is an exploded perspective view thereof including an optional lid, FIG. 18B is a top plan view and FIG. 18C is a side elevation view and FIG. 18D is a front elevation view thereof.

FIG. 21A is a schematic cross-sectional elevation view of another embodiment of a ground-level distribution system whereas

FIG. 22A is a schematic cross-sectional elevation view of another embodiment of a ground-level distribution system whereas FIG. 22B is a cross-section elevation view of an alternative component thereof.

FIG. 23A is an exploded cross-sectional elevation view of alternative components of a ground-level distribution system, whereas FIG. 22B is an alternative to a component thereof. FIG. 23C is a schematic cross-sectional elevation view of another embodiment of a ground-level distribution system deploying a component of FIG. 23A and in combination with the component of FIG. 23B.

FIG. 24A-C are schematic structural and assembly diagrams of another aspect of ground-level distribution system components and their method of use in which FIG. 24A illustrates in a transverse cross-sectional elevation view assembled components thereof before installation of conductor cables, FIG. 24B shows the conductor cables installed thereon. FIG. 24C illustrates the step filling the cavity around the cables with concrete that hardens to form a protective covering over the cables and FIG. 24D illustrates the cover or lid installed over the assembly in FIG. 24C.

FIG. 25A-C are schematic structural and assembly diagrams of a variant of the ground-level distribution system components and their method of use in which FIG. 25A illustrates in a transverse cross-sectional elevation view assembled components thereof before installation of conductor cables, FIG. 24B is a top plan view of FIG. 25A and FIG. 24C is a transverse cross-sectional elevation view of the assembled ground-level distribution system with the lid over covering in place.

FIG. 26A-26C schematically illustrate in perspective view another alternative embodiment of base or tray and lid for assembly into the ground-level distribution system.

FIG. 28 A-C schematically illustrate in perspective views portion of the ground-level distribution system.

FIG. 29A-29D schematically illustrate in perspective views alternative configuration for trays and lids to accommodate different size and numbers of conductor and/or fiber optic cables.

FIG. 31A-31D schematically illustrate an alternative embodiments of a ground-level distribution system with a transition a buried distribution system via a junction box in which FIG. 31A is a cross-sectional elevation of the component shown connecting the buried junction box to the ground-level distribution system whereas FIG. 31B shows in cross-sectional elevation the cable traversing the junction box using this component. FIG. 31C is a cross-sectional elevation of an alternative component shown with a different connection to the buried junction box on one side and the ground-level distribution system on the other, whereas FIG. 31B shows in cross-sectional elevation the cable traversing the junction box using this alternative component.

FIG. 31D is a cross-sectional elevation view of a junction box 120 providing a transition from the pipe 110 on the right to the buried cable or conduit 101br on the left.

FIG. 34A is a schematic perspective view within an alternative embodiment of a junction box, whereas FIG. 34B is a cross-sectional elevation view thereof that includes the GLDS.

FIG. 35A is a cross-sectional elevation view of another alternative embodiment of a junction box connect to a GLDS, whereas

FIG. 36A is a schematic top plan view of an alternative embodiment of a connection piece or coupler bar whereas

FIG. 37A is a schematic top plan view of an alternative embodiment of an open base or tray component for forming a GLDS, whereas FIG. 37B is a cross-sectional elevation view thereof take at section line B-B in FIG. 37A in which the left side has an installed cover. In the cross-sectional elevation view in FIG. 37C the cover is installed on the right and left sides and the central or medial portion between them is flexed to tilt the right side at an acute angle away from the left side.

DETAILED DESCRIPTION

Figure 2A:
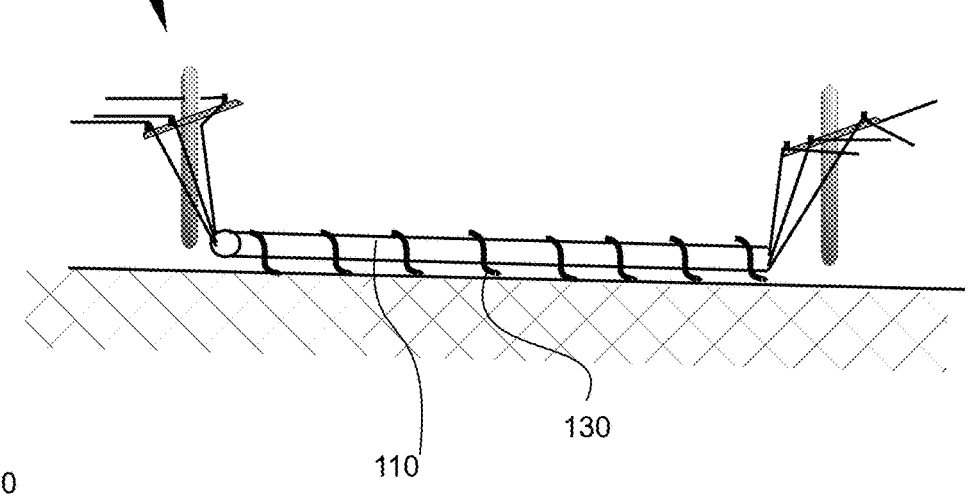

Referring to FIGS. 1A through 37C, wherein like reference numerals refer to like components in the various views, there is illustrated therein a new and improved Ground-Level Primary Electric Distribution System, generally denominated 100 herein.

FIG. 1A is a side elevation view of the common and prior art aerial mounted primary electric distribution System in which conductor cable 101 are suspended from spaced apart poles 11.

In accordance with the present invention the ground level primary electric distribution system (GLDS) 100 comprises a plurality of pipes 110 with two more pipes 110 of said plurality being connected together in at least one junction 120. Conductor cables 101 then extend through the two or more pipes 110. Various means 130 are deployed for anchoring or mounting the plurality of pipes 110 as well as components thereof, in substantially proximal contact with terrain, wherein the plurality of pipes 110 are configured to contain internal thermal ignition and preclude external damage to the integrity of the plurality of pipes 110 and the high-voltage conductor cables 101 extending therethrough, such as from fire and other natural disasters, including but not limited floods, windstorms, tornados and the like.

This GLDS 100 may deploy a hybrid approach in combining existing components from various utilities/industries (e.g., electric, gas, petroleum, etc.) and new asset components (fire resilient U-Guard, Conduit, Pad-mount Skirt and the like) to construct a primary electric distribution system to reduce or eliminate the risk of electric ignition due to external factors, as well as vegetation management requirements for an overhead distribution system. Various embodiments of the system and system components are believed capable of providing the safest methods of providing electric service in the applicable areas, prevents electric utilities from initiating planed service shut offs due to high fire index or winds, and minimizes the wildfire risk.

Fire resilient components (such as U-guard brand pole protectors and Pads) may form part of an integrated system to house the primary conductors 101 on or over pipe 110 or junctions 120.

In some embodiments GLDS 100 has multi-layer protection of the pipes to ensure public and system safety, such as fully insulated cable, schedule 40 PVC conduct, and an outer layer of fire resilient U-guards (rigid) or steel conduit (grounded with cathodic protection).

The term pipe(s) 110 is intended to embrace an elongated passage for eventually covering, protecting and isolating a plurality of parallel conductors, all of which extend generally in parallel to the principal or longest axis of the pipe 110. The term cable 101 is intended to embrace insulated elongated electrical conductors, which is conductive wires and assemblies of wires, empty conduit that can receive insulated or uninsulated elongated electrical conductors as well as a conduit with pre-installed insulated or uninsulated elongated electrical conductors, which is known as CIC for Cable in Conduit. For example, a pipe 110 may accommodate 3 or more adjacent isolated elongated electrical conductors, which may include any combination of the same or different types of electrical cable constructions, such as insulated conductors, conduit for adding conductors at a latter stage as well as CIC.

Various means 130 for anchoring or mounting the plurality of pipes 101 substantially in proximal contact with terrain are illustrated in the Figures as described in the various embodiments below.

FIG. 1 illustrates conventional overhead distribution systems in which the electrically conducting cable 101 is suspended overhead and energized the voltage is between 4 KV and 21 KV. The conductors may be open or covered. Connections to industrial, commercial, and residential users are formed by nodes or junctions with step down transformers to reduce the voltage in distribution conduits to at least one of 120 and 240 V, or the local standard voltages for countries other than the United States. The conductors or conductor cables 101 are optionally suspended from upright wood, metal, or composite poles 11 that are mounted to the ground, soil or terrain 10.

FIG. 1B illustrates an embodiment of the GLDS 100 showing at least one fire resilient pipe 110 (which on poles 11 may include fire resilient pole covers, such as is available under the U-Guard brand) which is mounted to the terrain 10 (depending on the dynamics of elevation, ground, and its type) and optional junctions 120 at opposing ends. The left end has a junction 120 that forms a ground leading to an overhead distribution system whereas the right end of the pipe 110 has a second junction 120 for connection to another pipe 110.

FIG. 2A illustrates how the pipes 110 that are mounted proximal to the ground or terrain minimize exposure to primary conductive cables 101 that would otherwise be suspended overhead or need to be buried in the ground. Overhead (OH) lines are eliminated between junctions 120, as are poles 11 which suspend the OH lines, and which may provide OH transformers and service drops. Such transformers and service drops can also be provided at or within junction boxes 120.

Figure 2B:
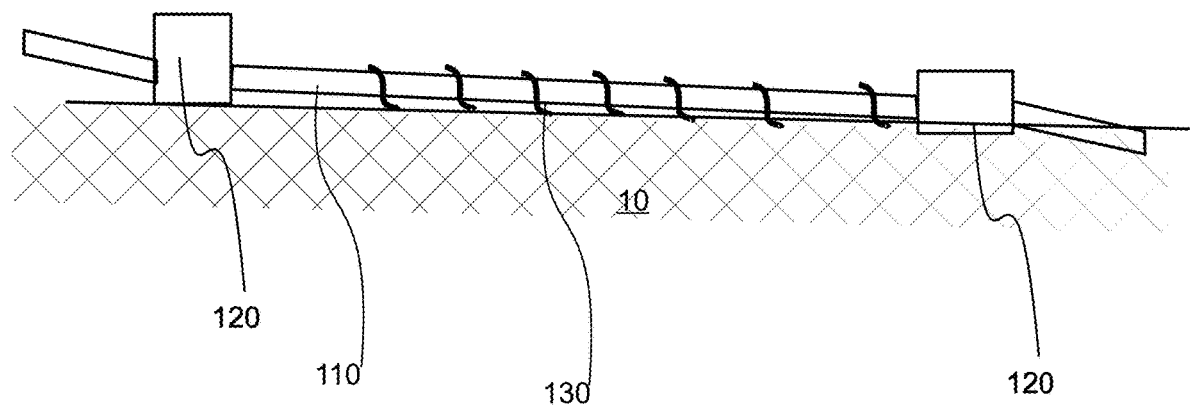
FIG. 2B is a schematic diagram of a portion of a distribution system that eliminates or avoids the use of overhead wires between junctions.

FIG. 2B illustrates that junctions or junction boxes 120 may simply be physical connections between relatively inflexible pipe 110 segments, allowing each pipe segment 110 connected to another segment 110 to divert direction and/or orientation to accommodate local terrain and the desired path of the distribution system. A junction 120 can also be formed at a pad mounted transformer (FIG. 13A) for connection to lower voltage distribution cables, such as when a utility is building new services or is able to convert the OH services to underground or a GLDS 100.

Figure 3A:
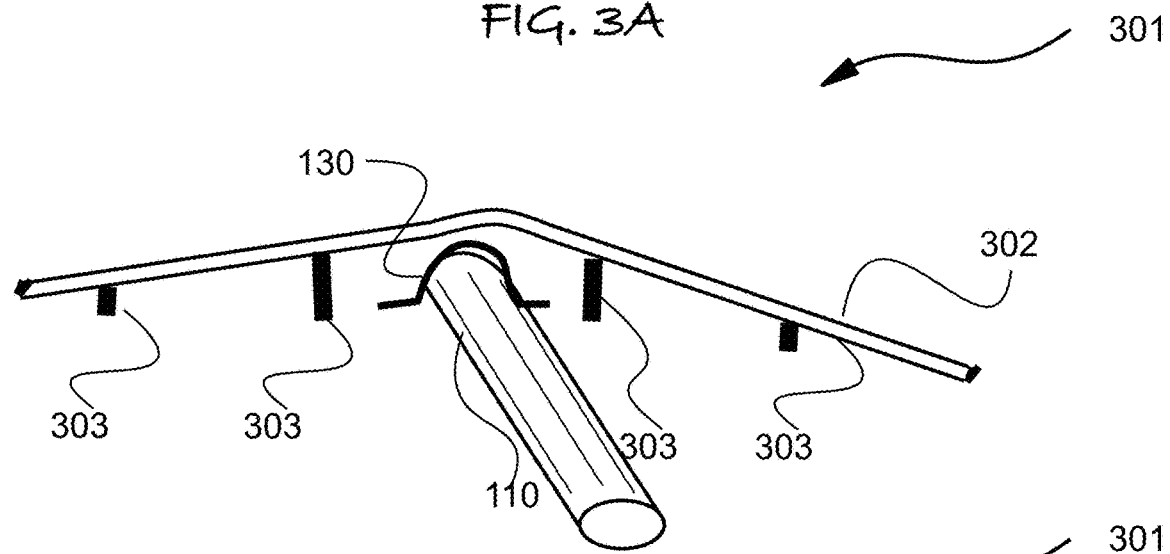
FIGS. 3A and 3B illustrate in schematic elevation and perspective view respectively a ramp that extends over the pipe segments of the system where
Figure 3B:
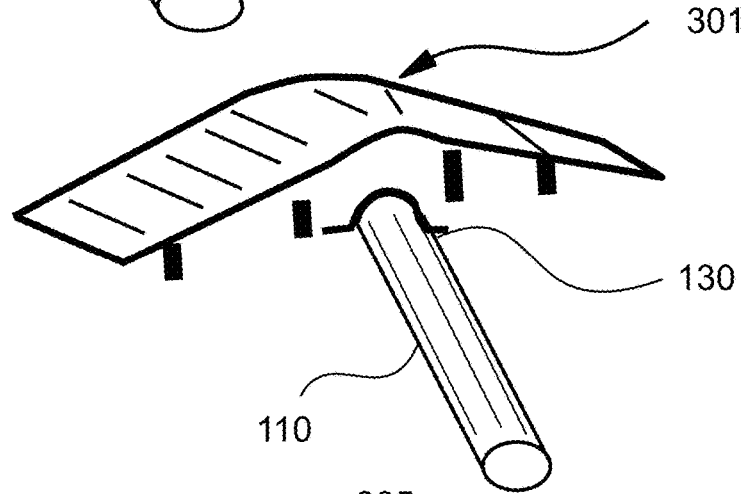
Figure 3C:
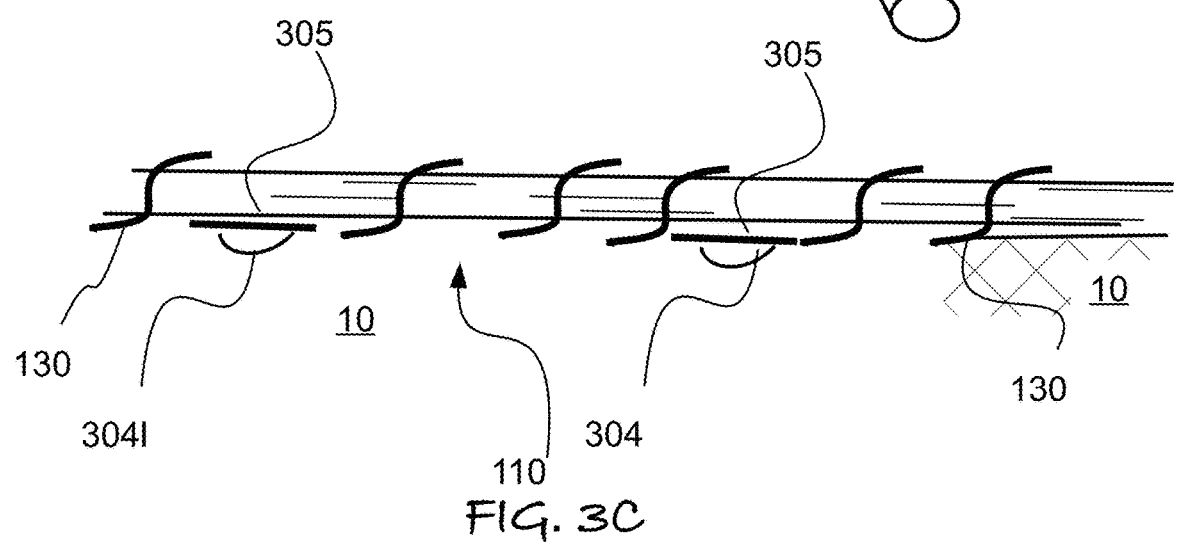
FIG. 3C is a schematic elevation view of tunnels under a pipe segment.

FIG. 3A-3C illustrates additional components useful to comply with access and environmental regulations in terrains and jurisdictions such as California. In FIGS. 3A and 3B a ramp 301 having an entrance and exit for fire truck crossings can be placed strategically to extend over the pipe 110. The ramp 301 can simply be steel plates 302 suspended above the ground by a plurality of footings 303.

As illustrated in FIG. 3C, a tunnel 304 supported by steel plate or pipes 305 is placed under the ground-level system pipes can allow for crossing of wildlife, such as the California tiger salamander.

FIG. 4A-6E illustrates various components that can be optionally deployed with different manner of pipes 110 to convey the requisite fire resistance and mechanical resilience from possible sources of external environmental damage.

Figure 4A:
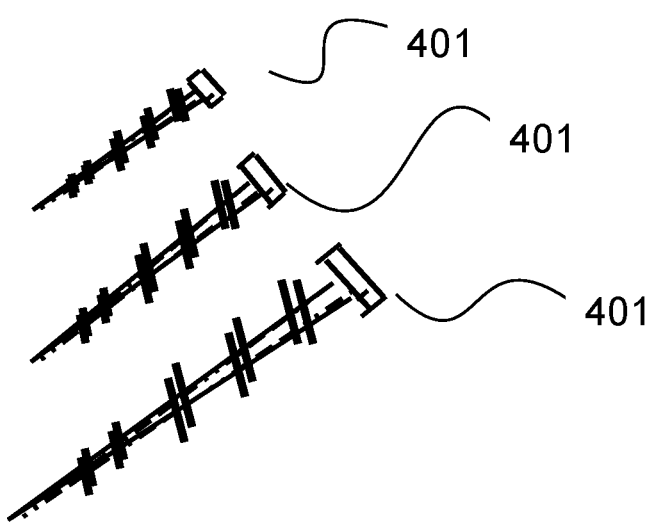
FIGS. 4A and 4B are perspective views of various components for optional use with the ground-level distribution system.

FIG. 4A illustrates anchor bolts 401 of various sizes for connecting plates 506 or other components to pads on or directly to the terrain which are optionally have lengths vary from 6, 12, 18 or more inches in length.

Figure 4B:
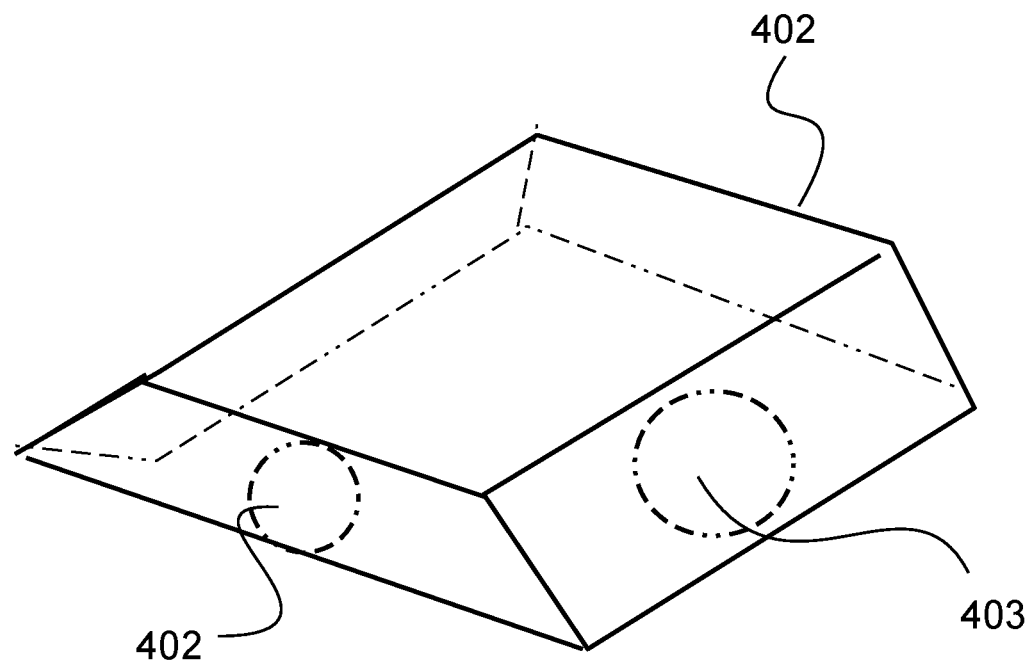

FIG. 4B illustrates a pad mount skirt extension 402 for equipment with conduit(s) connected at the generally circular knockout segments 403. The pad mount skirt extension 402 can be formed in various fire-resistant materials, such as fiberglass impregnated cross-linked plastic resins that contain flame retardant chemicals and compounds, as well as ceramic or concrete cast structures.

FIGS. 5A-D, FIGS. 6A-C, FIG. 8A, FIGS. 10A-D and FIGS. 11A-E, among others, illustrate a series of alternative means for anchoring or mounting 130 the plurality of pipes 110.

FIG. 5A illustrates a raised conduit resting stand 501 with anchor holes 502 through the anchor plate 506. The conduit resting stand 501 is connected to the anchor plate 506 via vertical slabs 501v. The pipe or conduit is intended to be disposed on the concave upper portion of the stand, which can be shaped to stably support other shape pipe 110, such as a U-shape to support rectangular pipe 110. FIGS. 5B and 5C respectively illustrate in front elevation and perspective views a fiberglass composite stand 503 with inserts 504 for terrain or should attachment with a concave upward support surface. FIG. 5D illustrates an adjustable conduit support system 505 with an anchor plate 506. The adjustable portion is the vertical placement of the two half circular arcs 507a and 507b that extend around opposing sides of the pipe 110 and clamp it in place to the upright support column 508 that extend upward from the planar anchor plate 506. Holes 502 in the anchor plate 506 are provided for receiving screws, bolts, clamps, or other means to connect to either terrain or soil 10 or terrain mounted components such as poured concrete fittings, or other terrain mountable components and the like.

The conductor cables 101 are preferably insulated with a flexible dielectric material and the pipes are more rigid than flexible dielectric material. However, in various embodiments a plurality or separate and spaced apart flexible or rigid dielectric conduit may be inserted or formed in pipes 110 in the same manner as cable 101 are installed and the bare or insulated conductor cable 101 that be inserted in into each conduit. This configuration improves the ease of replacing the conductor cable 101 by removing it between various junction in the system. FIG. 5E illustrates a cable and conduit system showing how schedule 40 PVC conduit 509 that is fully shielded, with aluminum or copper conductors 101, typically used in underground system, is placed within the pipe 110.

Figure 6A:
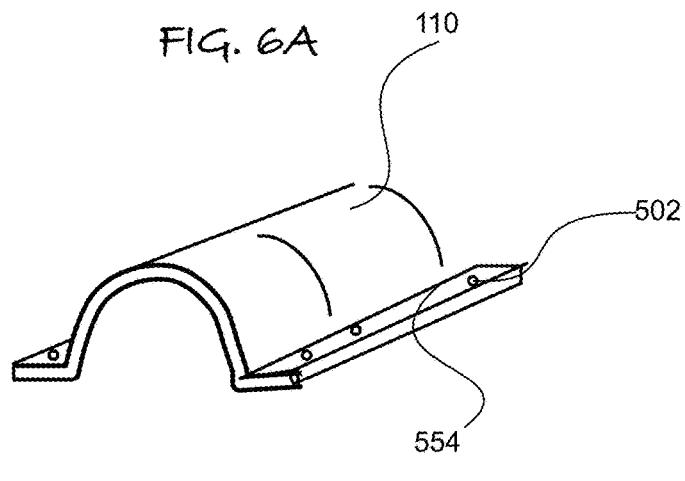
FIG. 6A-C are schematic perspective views of various anchor or mounting components for optional use with the ground-level distribution system.
Figure 6B:
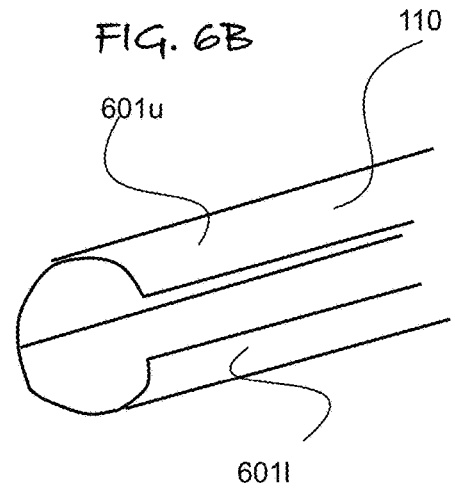
Figure 6C:
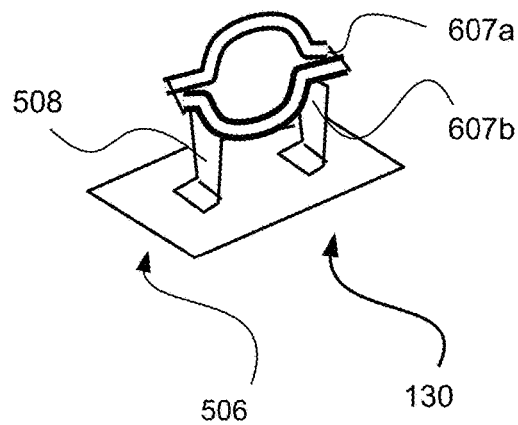
Figures 7A, 7B:
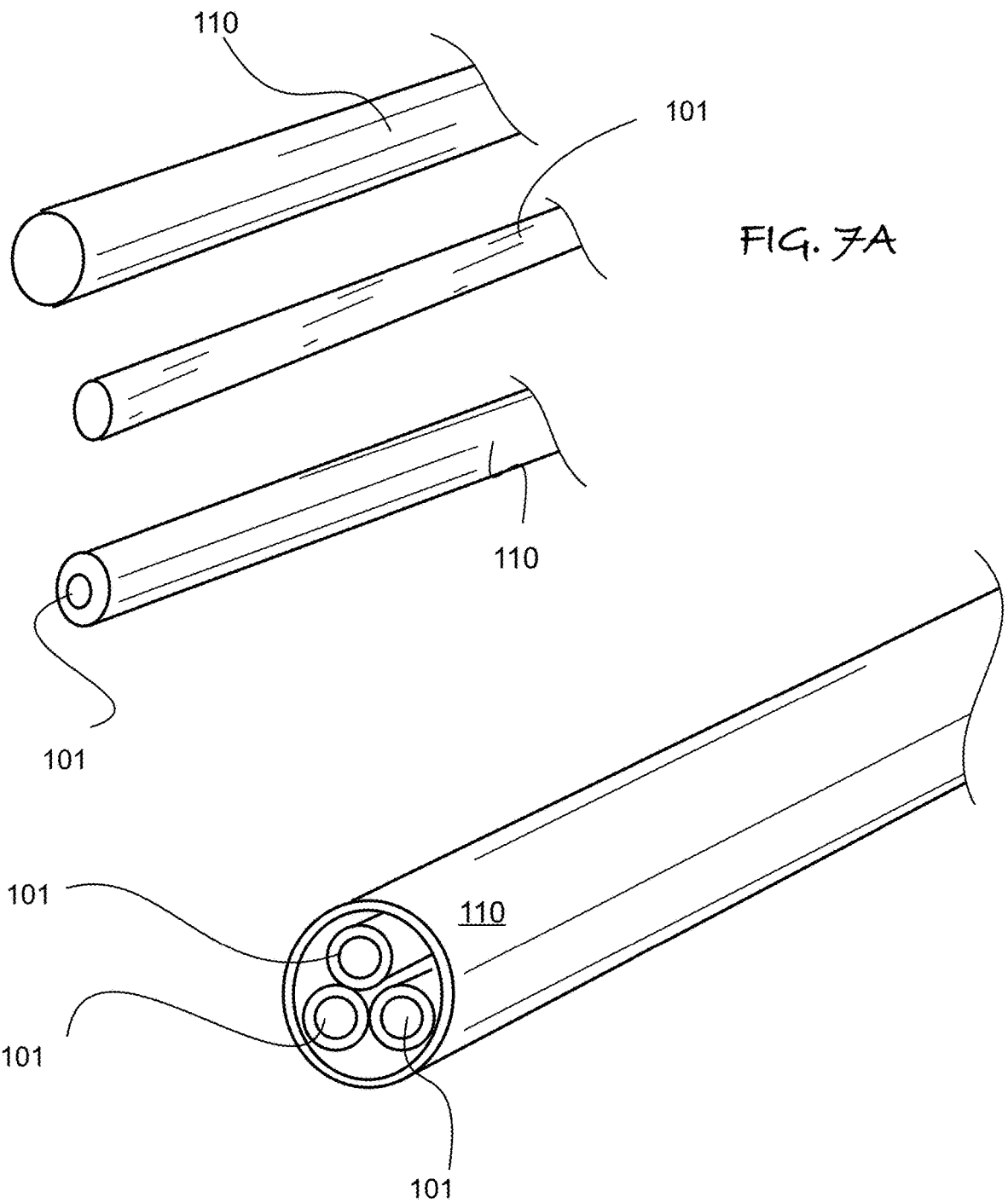
FIGS. 7A and 7B are schematic cutaway perspective views of components of the cable system that are optionally deployed within the ground-level distribution system.

FIG. 6A illustrates a portion of fire-resistant pipe 110 segment or conduit cover with anchor holes 502 in opposing side flanges 254. When the sides flanges 254 are mounted to an impermeable substrate, a pipe 110 is formed. FIG. 6B illustrates a split conduit of steel or fire-resistant pipe 110 or conduit covering. When the upper shell 601u and lower shell 6011 are fastened a pipe 110 is formed. The upper 601u and lower shell 6011 may be in hinged connection along one side of the pipe 110 that is formed. FIG. 6C illustrates in a perspective view a fixed elevated support plate 506 has 2 spaced apart column or standoff that extent upward to support on opposing end a lower semi-circular bracket 607b, for supporting a round pipe 110 which is held in place by the upper attaching to the lower semi-circular bracket 607b FIG. 7A illustrates multiple cables 101 that may extend parallel through the pipe 110, as shown in FIG. 7B, such as separate flexible fiberglass conduit segments that are spaced apart in the pipe 110 within which shielded conductor 101 is inserted in each conduit. Hence, each conductor 101 is within its own flexible fiberglass conduit. The pipe 110 contains multiple parallel strands or segments of the flexible fiberglass conduit having the connectors therein. The pipe 110 can be covered with U-Guard brand fire resistant layers that protect the fiberglass conduit and conductors therein. Further, as another example the pipe 110 can be metallic, and grounded, or nonmetallic composite materials that are reinforced and significantly thicker than the flexible fiberglass conduit to provide strength from external physical damage as well as minimize the potential for fire damage.

Figure 8A:
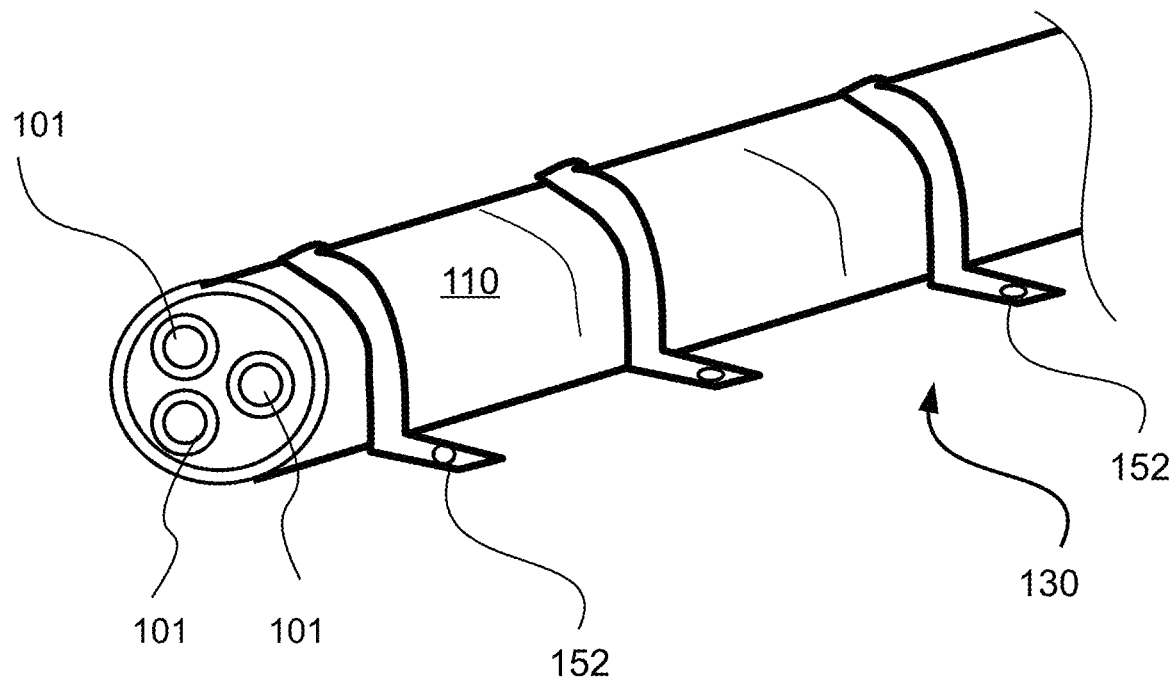
FIGS. 8A and 8B are schematic cutaway perspective view of an alternative embodiment of the cable system or a component thereof.
Figure 8B:
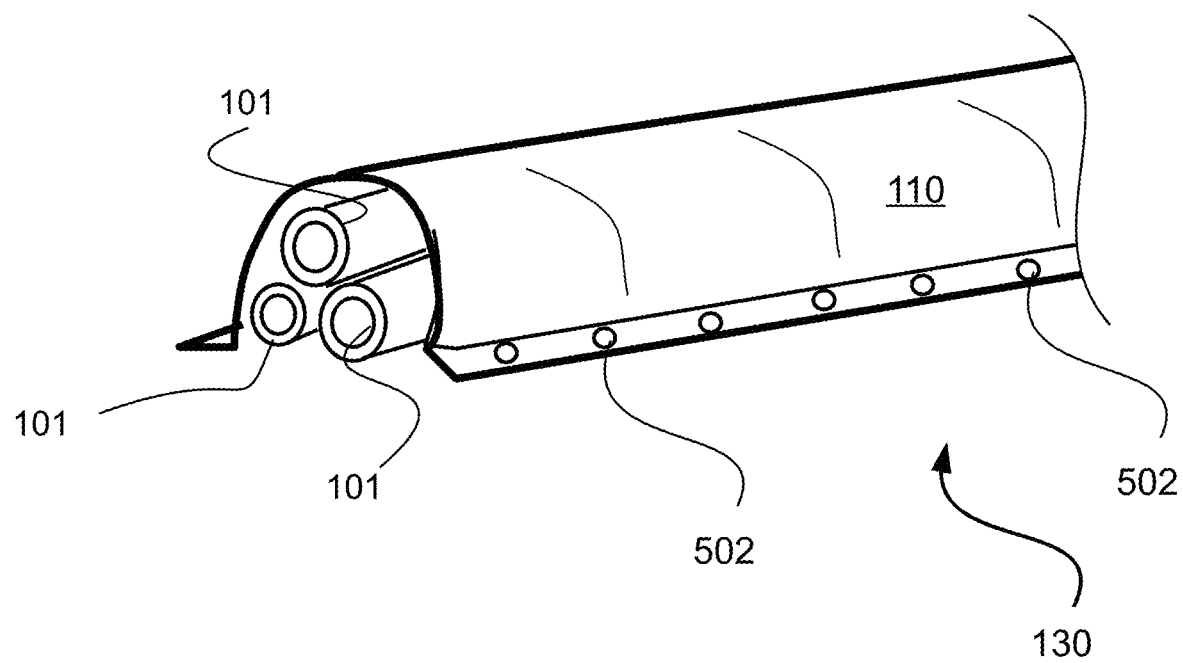

FIG. 8A illustrates configurations for uneven ground of a cable 101 within conduit the primary system is to be installed fiberglass or steel pipe 110 with anchoring systems. The anchors 130 can be selected as appropriate to the site dynamics. FIG. 8B illustrates another embodiment in which multiple pipes 110 that comprise flexible PVC conduit have conductors therein and are covered by an elongated composite or steel U-shaped cover 115 with anchoring holes 502 on opposing sides. The U-shaped cover may have one or more layers that are fire resistant coatings.

FIGS. 9A and 9B illustrate a split conduit system 900 which is open like an elongated shell in FIG. 9A. This split conduit is illustrated as closed in FIG. 9B. FIG. 9B also illustrates an adjustable bracket 140 extending around the pipe 110 that is connected by an upright column or standoff 508 that can be varied in height above the lateral anchoring plate 506 to which it is coupled. The position of the bracket 140 that extends around the pipe 110 may be adjustable via the upright stand 508, which can have sliding or telescoping sections.

Figure 10A:
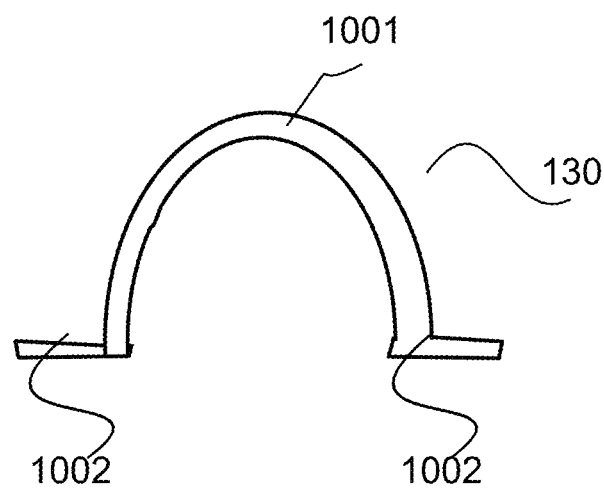
FIG. 10A-10D are various perspective and isometric views of anchoring means ground-level distribution system components.
Figure 10B:
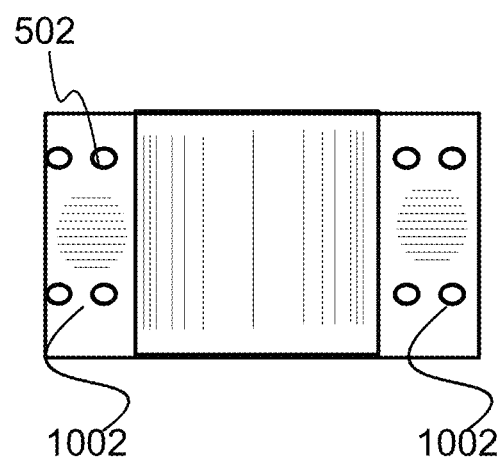
Figure 10C:
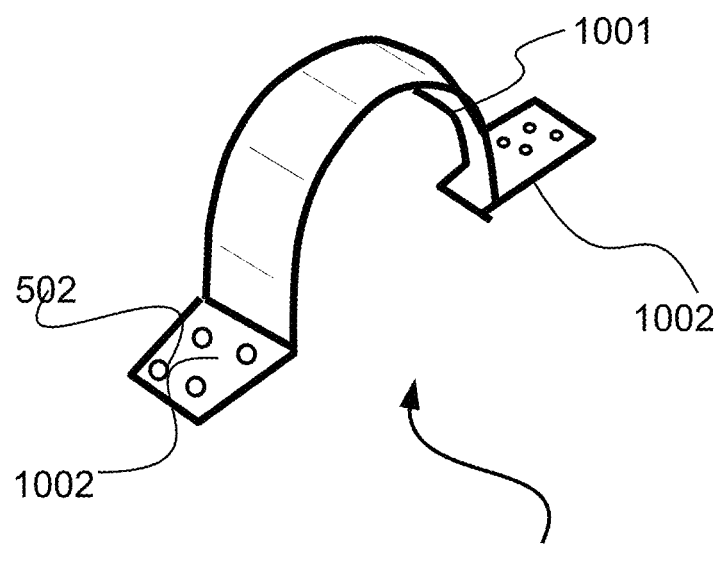
Figure 10D:
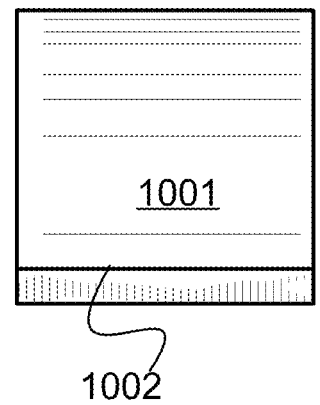

FIG. 10A-D illustrate alternative views of a form of anchoring means 130 that is a steel clamps 1001 that form ½ circular arc between the coupling thereof at opposing ends to lateral mounting fixtures 1002, which have holes 502 for receiving screws, or bolts such as ground penetrating anchor bolts 401, clamps or other means to connect to either terrain or terrain mounted components such as poured concrete footings. FIG. 10A is a front elevation view thereof, FIG. 10B is a top plan view, FIG. 10C is a perspective view and FIG. 10D is a side elevation view of the clamp.

FIG. 11A-11E illustrates various views alternative clamps or anchoring means 130 to couple various embodiments of the pipe 110 to the terrain or soil 10. The various anchoring means 130 may deploy a plate 506 with holes 502 such as receiving ground penetrating anchor bolts 401. The plate 506 may support via one or more columns 508 or stands off that extend upward to support the resting plate 501 that has an upward concavity to receive a portion of the outer diameter of the pipe 101, as well as alternative shape to receive and support the complimentary shape of a pipe with a different cross-sectional shape, such as a U-shape for a rectangular pipe 101.

Figure 12A:
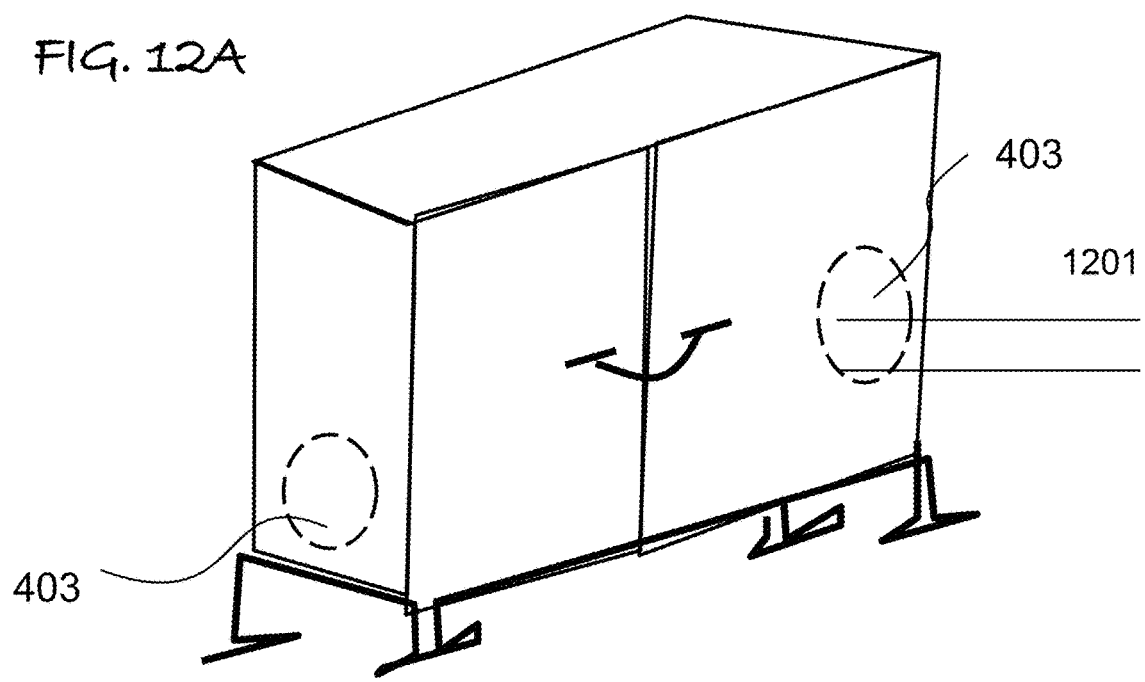
FIG. 12A is a perspective view of an embodiment of tap link to the ground-level distribution system and FIG. 12B is a schematic wiring diagram thereof.

FIG. 12A illustrates in a perspective view a tap link cabinet 1201 with a plurality of knock outs or punch outs 403 which when opened can then receive pipes 110 that can optionally be configured for elevated to flat ground installation or be pad mounted for further protection.

Figure 12B:
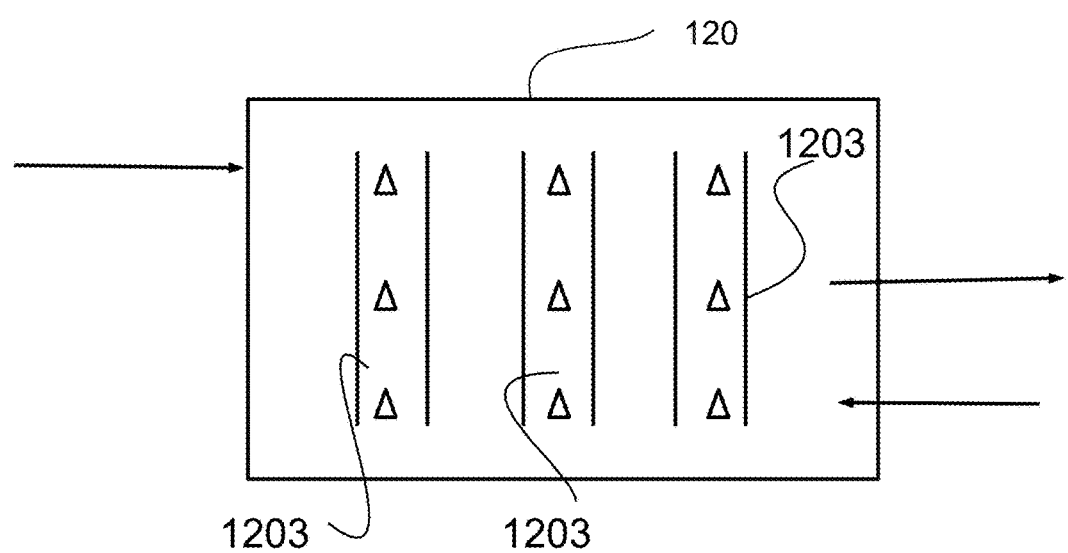

FIG. 12B is a schematic illustration of the optional electrical connections in a junction box 120 via busbars 1203 within the link, which optionally may use single phase vacuum switches.

Figures 13A, 13B, 13C:
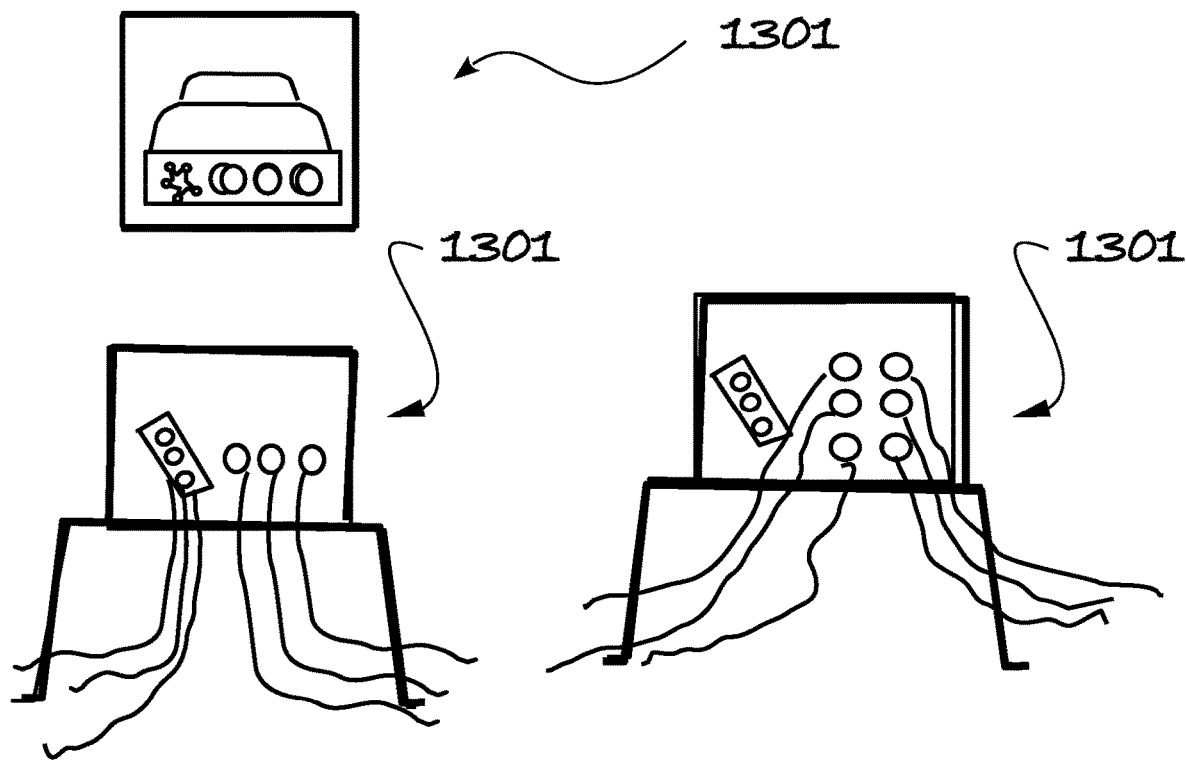
FIG. 13A-C are schematic connection diagrams of connections at a pad mounting link.
Figure 14A:
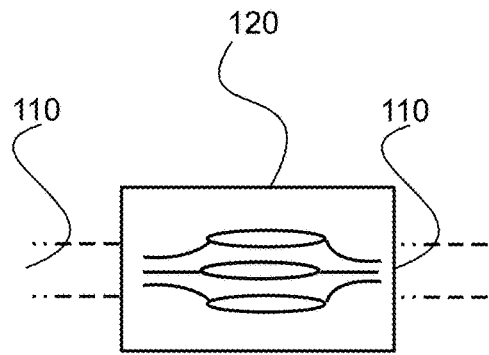
FIG. 14 A-D are schematic structural and connection diagrams of alternative junctions 120 or links 1301 in the ground-level distribution system
Figure 14B:
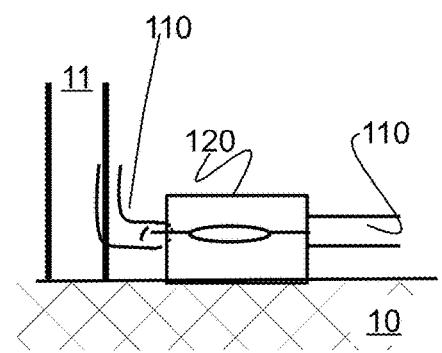
Figure 14C:
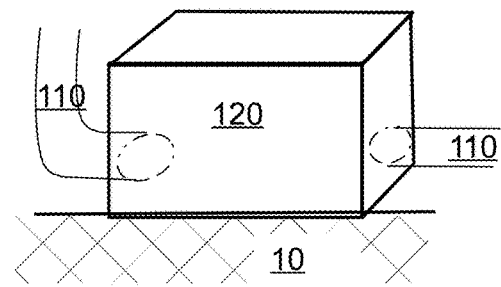
Figure 14D:
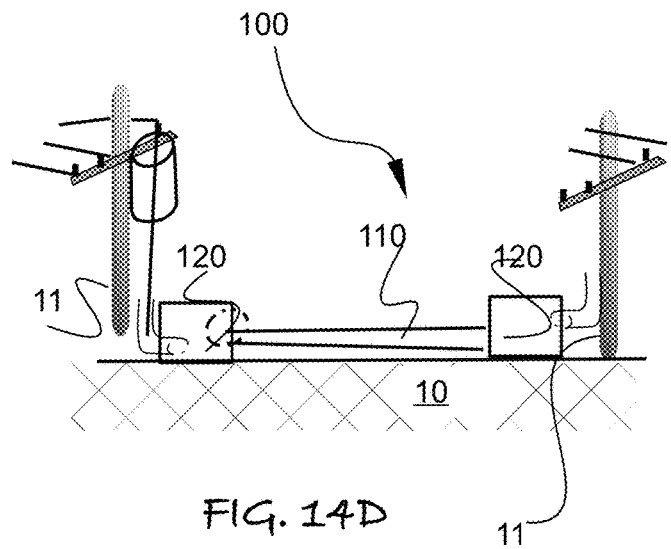

FIGS. 13A-C illustrate alternative embodiments of a pad mount transformer 1301 option with secondary risers in which each pipe 110 can extend outward to sides of the cabinet which optionally may contain a loop transformer.

FIG. 14A-D illustrate alternative embodiments of junction boxes 120 which in FIG. 4A may have a separate connection. The junction box 120 has internal connections between conductive cable therein that enter on opposite side from pipe 110 that extend on or parallel to the surface of terrain 10. The junction boxes 120 in FIG. 14B-C in contrast connect or direct cable therein 101 from a horizontal direction in a first pipe or conduit 110 to exit from the junction box to then extend in a second pipe or conduit 110 in the vertical direction such as up a pole 11 to connect with a transformer and or OH distribution system.

FIG. 15A-15E are schematic structural and assembly diagrams of another aspect of ground-level distribution system 100 formed from multiple components that include a base 250 for supporting a series of cable 101 in a spaced apart arrangement in channels 255 defined by one or more arcing segments. The side channel 255' have a smaller radius arc to accommodate smaller diameter optic cables 102, such as may be used for system integrity communications, or leased to third parties, such as telephonic and cable signal and entertainment distribution networks. The cable 101 and 102 may remain spaced apart by an indexing member 260 in which a plurality of downward appendages 265 descent from a generally horizontal support 261. The indexing member 260 may be arcuate at opposing side 260R and 260L to conform to the interior or lower surface 2151 shape of a capping member 215 with a plurality of spaced apart holes 216. The center of the capping member 215 is arcuate with flat side flanges 254 having hole 254$h$ that align with side holes in the base 250. A dielectric filler, such as concrete mixtures can be poured or pumped into the cavity 257 between the capping member 215 and the base 250 via the holes 216. The capping member 215 has sloping arcuate sides 253 the upper center portion and flat side flanges 254 are reinforced by the cured and allow vehicle to drive over the structure without damaging the integrity of the sealed cables 101 and 102.

Figure 16A:
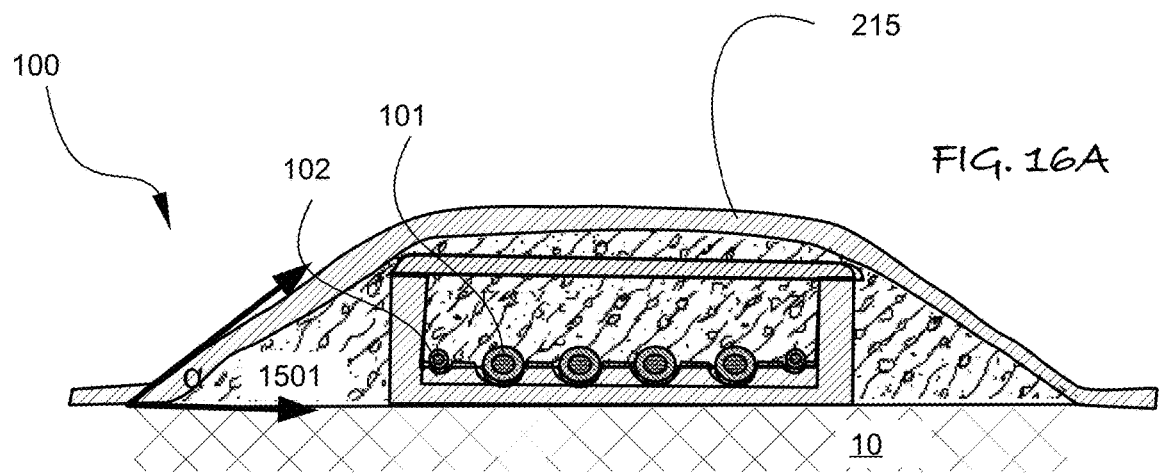
Figure 16B:
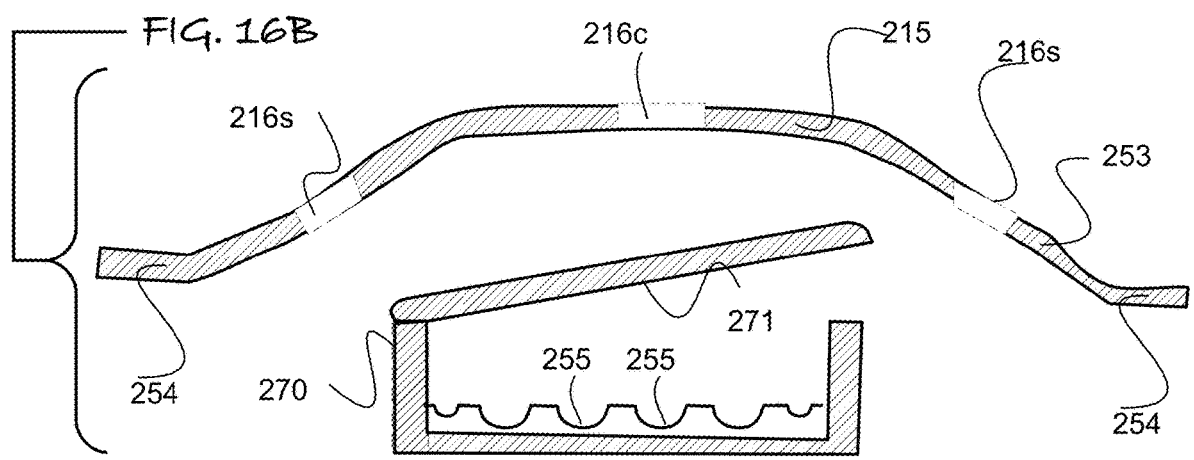
Figure 16C:
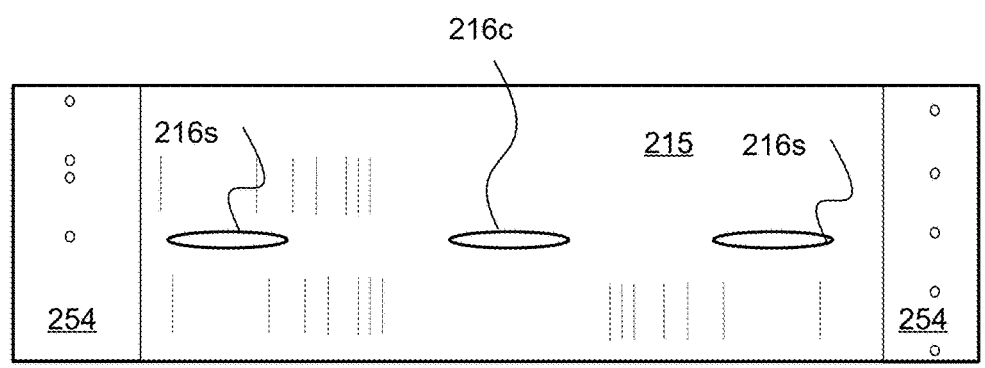

FIG. 16A-C illustrate another embodiment in which the cable 101 and optionally cable 102 are sealed in an elongated pipe 110 formed form a plurality of generally U-shaped boxes with open ends 270 that itself is covered with a sealable lid 271. Each U-shaped channel segment or box 270 that is then covered by a capping member 215 having smooth and generally arcuate sloping sides 253. The cable 101 and optionally cables 102 are seated the receiving channel 255 in the bottom of the U-shaped channel segment or box 270 When the boxes 270 are arranged end to end and the cable 101 and optionally 102 inserted in receiving channels 255 then concrete can be pumped or poured into the box 270 before the lid 251 set on the upper rim inserted. The filled boxes 270 with lids 271 are then covered by the caping member 215 and concrete is poured or pumped via the holes 216 thereof to file the space above the lid 271, the sides of the box 270 and below the capping member 270. The box 270 is set on the ground 10, and the capping member has side flanges 254 that extend beyond the edge of the box for anchoring to the ground via the holes 254$h$ thereof. It should be noted that the holes 216 for filling with concrete include a center hole and 2 holes on opposing sloping side 253 that are between the center hole 216$c$ and the side holes 216$s$. The sloping sides of the capping member 215 when reinforced by the filler such as concrete 1501, will support vehicle and allow then to readily traverse the pipe or conduit 110. It is preferable that the capping member 215 have sloped sides in the direction transverse to the principal axis of the pipe 110 that form an acute angle $\alpha$ with terrain 10 that is preferable less than about 60°, and more preferably not more than 45°. In other embodiments the lid 115 or the tray or enclose 150 may provide such sloped sides between the ground or terrain and the pipe 110 to allow vehicle to cross-the pipe, as well as avoid making a barrier for small animals. In other embodiments such sloped sides in the direction transverse to the principal axis of the pipe 110 may form an angle $\alpha$ with terrain 10 that is preferable less than about 75°, and more preferably not more than 65°, and most preferably not more than 45° by the shape of the most exterior components of the pipe 110 or system, such as junction boxes 120. More preferably, the transitions between the sides of the pipe 110 and any component of the GLDS 100 have gradual changes in curvature between the portion of the side with the largest slope a and the terrain 10 and a top of the pipe 110 or other components that is flat and vertical, such as in the embodiment od FIG. 15A, 17A, 25C, 26A-30B, among others.

Figure 17A:
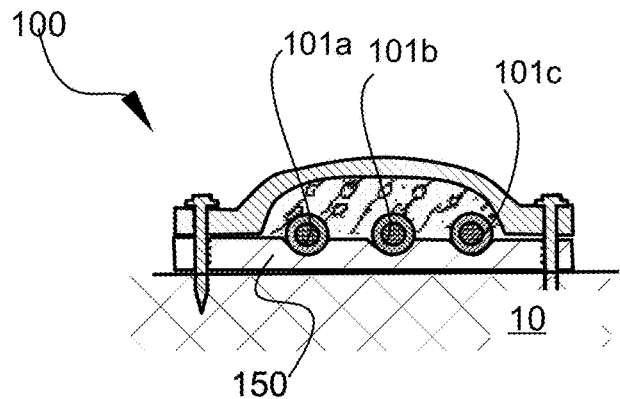
Figure 17B:
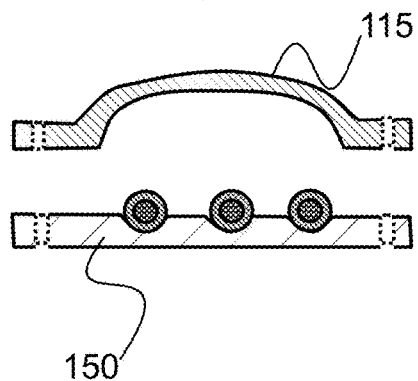
Figure 17C:
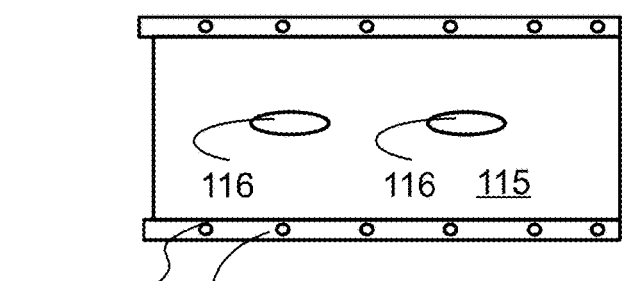
Figure 17D:
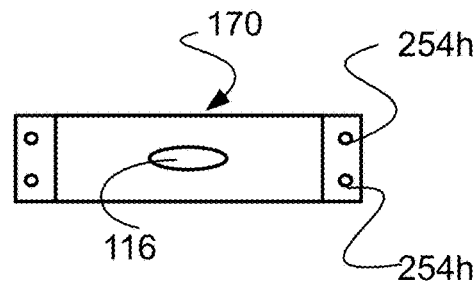
Figure 17E:
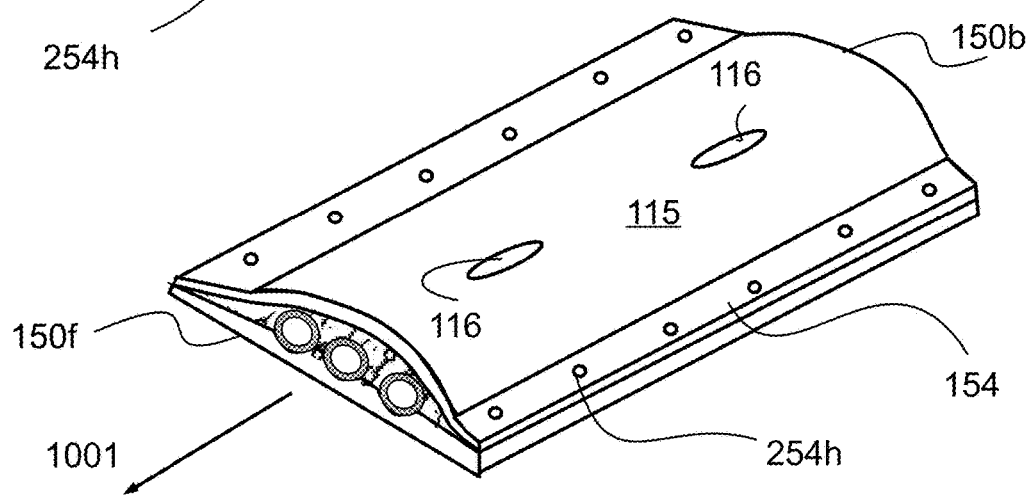
Figure 18A:
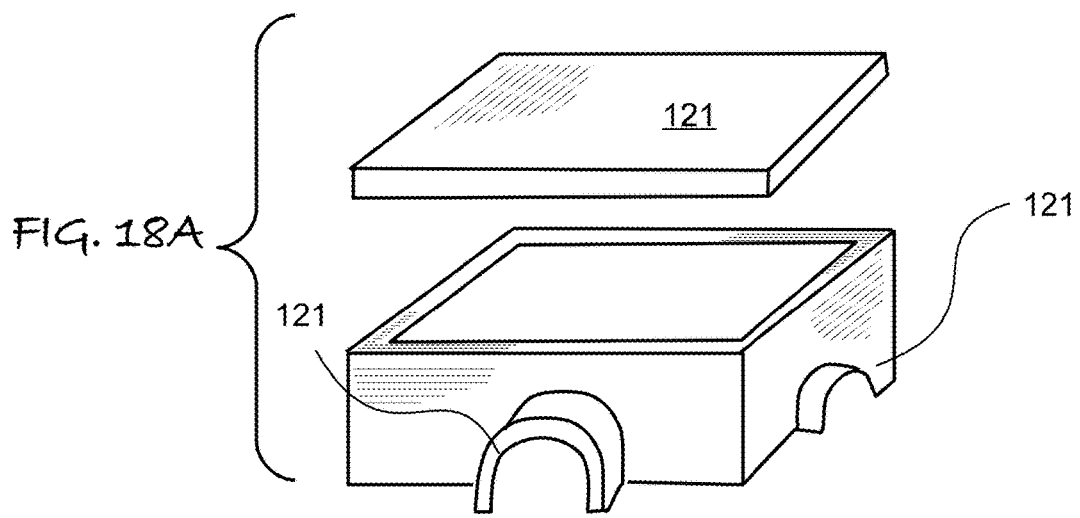
Figures 18B, 18C:
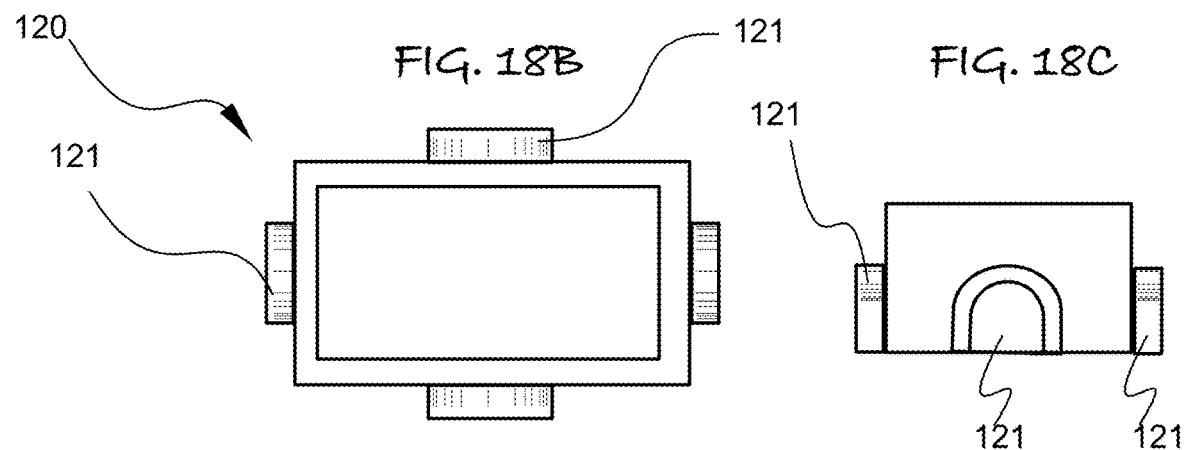
Figure 18D:
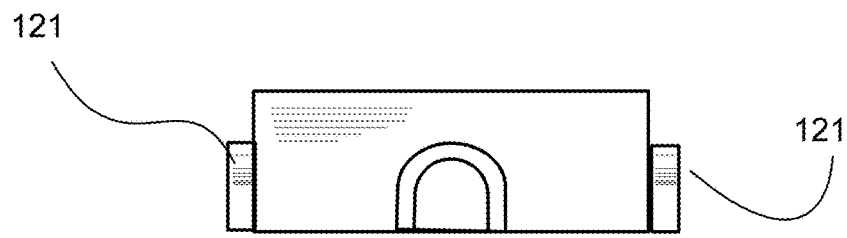
Figure 19A:
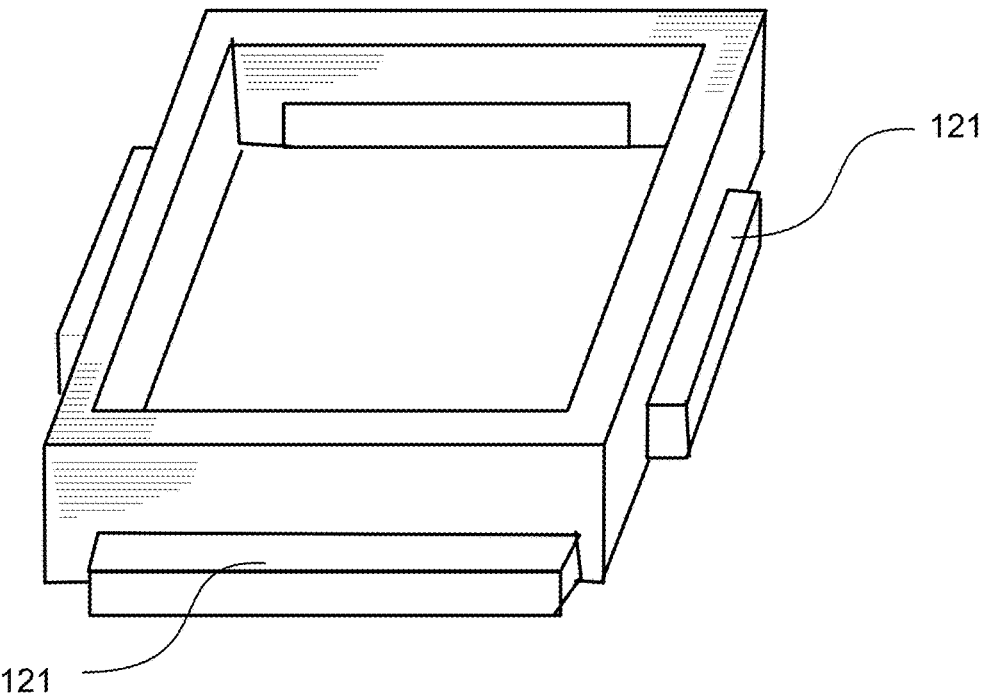
FIG. 19A is an exploded perspective view of another embodiment of a junction box without the lid and FIG. 19B is a front elevation view of a variant of the junction box with a different shape portal.
Figure 19B:
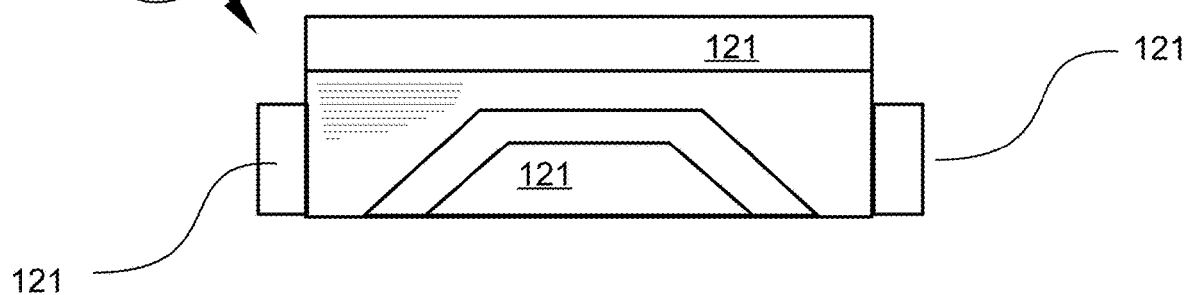

FIG. 17A-E schematically illustrate another alternative embodiment of a methods of forming a pipe 110 for GLDS 100 in which conductors 101a, 101b and 101c are protected. A series of trays 150 are disposed on the natural, re-graded or added ground surface 10 and then attached end to end along the common principal axis 1001 of the pipe 110 that they collectively form when joined. The conductive cable or conduit 101a, 101b and 101c are placed in concave channels 155 that extend between opposing front and rear ends which are intended to align with the principal axis of the pipe 110. The opposing sides transverse to front and rear ends have a series of holes. The lid 115 is domed in the center to extend over the installed conductive cable or conduit 101a, 101b and 101c, with opposing side flanges 154 shaped to engage the side region of the tray 150 and have a series of holes 154h for aligning with the holes in the tray 150. The lid 115 may have a series of holes 116 in the lid 115 for filling with concrete. The two flanges 154 of the lid 154 are thus in parallel alignment with and that straddle the principal axis 1001 of the pipe 110. FIG. 17D is an optional connection piece or coupler bar 170 that can be attached to over the interface of lids 115 that cover adjacent trays 150.

FIG. 18A to FIG. 19B schematically illustrate in various views alternative embodiments of junctions 120 with multiple portals 121 for receiving connections to the pipes 110 having conductors 101. The junction 120 is optionally sealed with a lid 121 after filling with concrete after connections have been made between incoming cable 101, which enter the junction 120 through segments of pipe 110 on one, two, three or any number additional portals 121 that may be disposed on the sides of the junction 120. These figures illustrate how the sides may extend outward from the portal 121 to match the shape of the pipes which in FIG. 19A-19D would have parallel sides and a arced top, or in FIG. 20, which the pipe 101 may have a rectangular cross-sectional shape, as shown in FIG. 20B in which the portal 121 are shaped to receive a pipe 101 with inward sloping sides.

Figure 20:
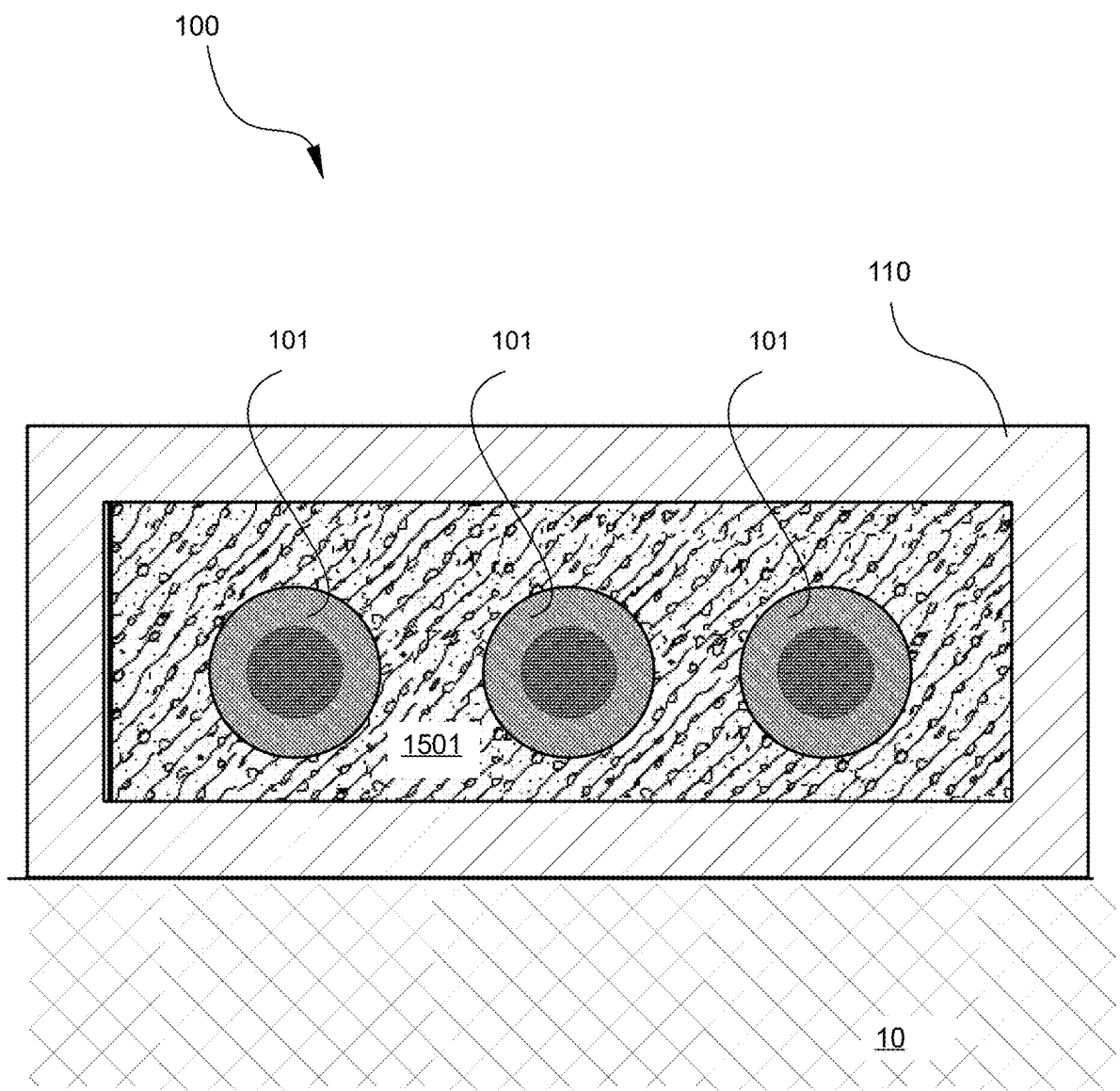
FIG. 20 is a schematic cross-sectional elevation view of another embodiment of a ground-level distribution system.

FIG. 20 schematically illustrated a portion of a pipe 110 or pipe segment with installed cable 101 surround by or enclosed in concrete 1501 within the pipe 110, the pipe 110 being disposed on the ground surface or terrain 10.

FIG. 21-30 illustrate components of another preferred embodiment of a ground level distribution system 100 in which the pipe 110 is formed of a plurality of trays 150 which are attached at opposing ends that are covered by lids 115 optionally after the trays 150 are filled. It should be understood that any of these embodiments may have the tray or enclosure 150 or cable support strips 160 that contains channel for supporting and providing physical separation between the electrical or conductor cables 101 and optionally one or more fiber optic cable 102 from the electrical or conductor cables 101.

Figure 21A:
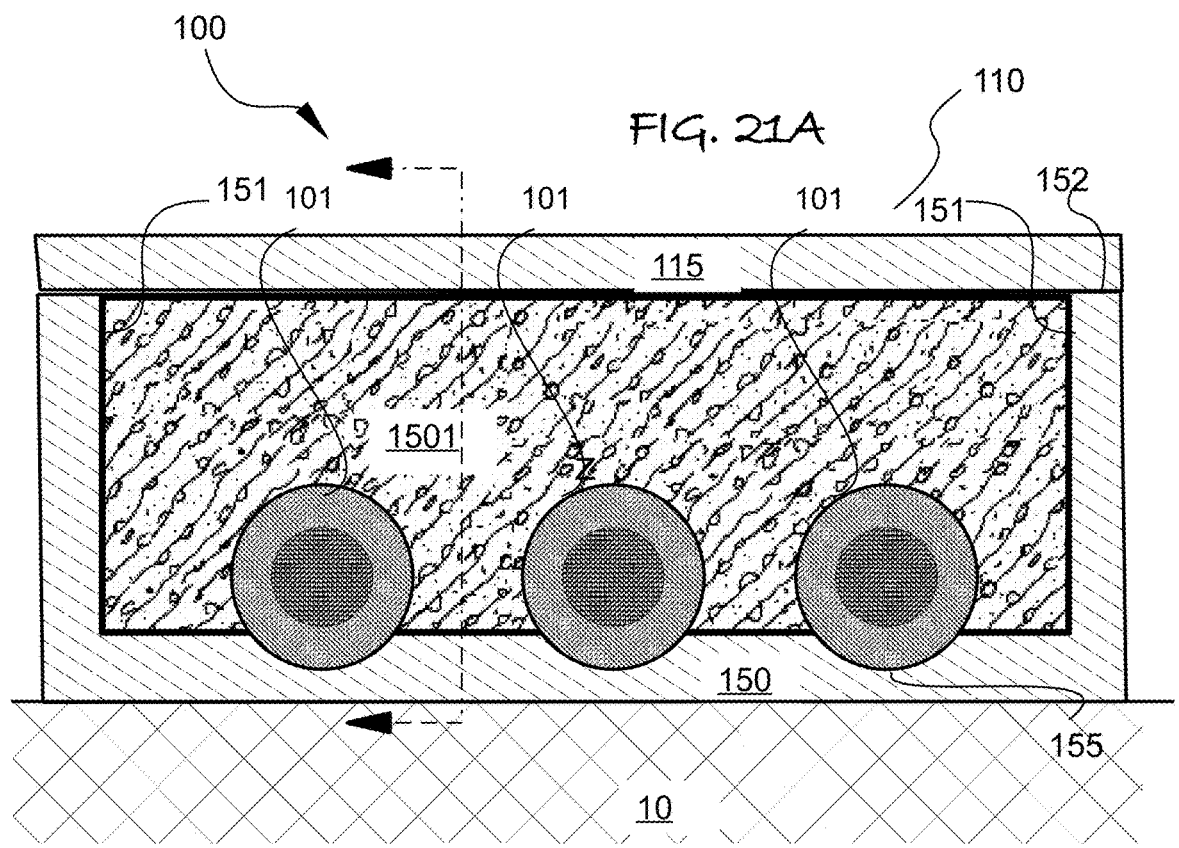

FIG. 21A illustrates an alternative embodiment of the pipe 110 with installed cap, covers or lid 115 over a base 150 for containing a plurality of conductor cables 101a, 101b and 101c. The base 150 has upright sidewalls 151 that terminate at a rim 152.

Figure 21B:
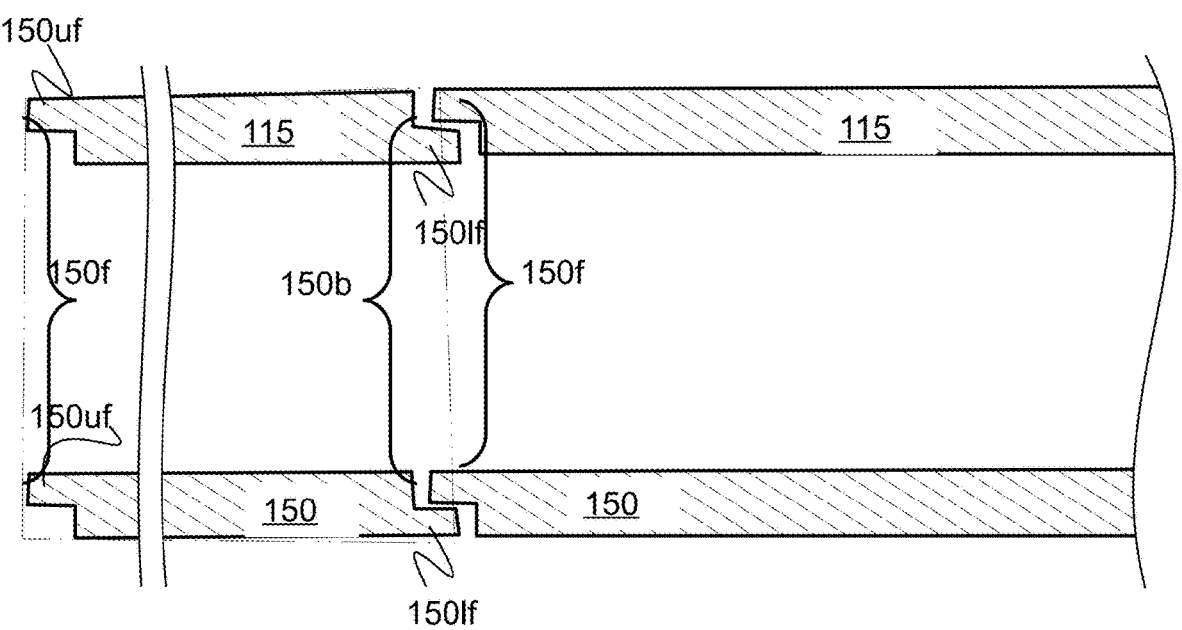
FIG. 21B is a side cross-sectional elevation view of connected components thereof that are transverse to the view FIG. 21A.

FIG. 21B schematically illustrated how the base or trays 150 and lids 115 may have a have a lag offset as upper flange 154uf on the front opposing end 150f and a lower flange 1541f at the back opposing end 150b provide for improved sealing by the overlap of the adjacent trays 150 and lid 115 that form the pipe 110.

In the various embodiment schematically illustrated in FIG. 21B-27D the opposing ends 150f and 150b of the tray 150 and other structures for receiving the cable 101 are preferably configured to overlap with the opposing portion of the identical tray 150 to form a linear path for disposing a different conductor and/or signal cable 101 in each channel 155 to form a ground mounted pipe 110. Hence, the GLDS 100 is optionally formed by assembling a plurality of trays 150 that attach end to end to form an enclosing sides of the pipe 110 for the cables 101 and/or fiber optic cables 102.

In addition, the upward facing surface of the tray 150 may have semi-circular depressions or portion of arcs 155 that extend lengthwise as channel to accommodate insulated conductor cables 101 or rigid or pliable plastic pipe through which cables 101 can be passed through. The semi-circular depressions need not form a complete semi-circle, but rather a sufficient number of short points or arc segments to support the cables 101. The depressions 155 can be arranged in a spaced apart relationship of adjacent placement of conductor cable 101, and some depression may be smaller than others for supporting smaller diameter cables, including fiber optic cables 102.

The space between the opposing sides 151 of the trays 150 and the interior bottom 153 provide a cavity 157 for receiving an at least fire-resistant or fireproof material 1501 to surround the cables 101. A cap or cover 115 may be placed over each tray or base 150 after the cavity 1507 is filled with a preferably fireproof material. It should be understood that the various cross-sections of conduit or pipe 110 with installed cable 101 that are surrounded by a concrete 1501, the concrete 1501 may be replaced with a different supporting media that is solid or particulate and is preferably a refractory or fire-resistant material. Fire resistant particulate, such as refractory ceramics and mineral like perlite and vermiculite would allow re-work and reconfiguration in temporary structures without the need to break up concrete.

The cap or cover 115 for the tray 150 is preferably one of curved and slanted at the sidewalls 154 that descend downward to a lower rim 117 to match the curvature of the sides 151 of the tray 150, with the hole 118h on the side flanges 118 that extend laterally from each side of the rim 117 coming into alignment with the holes 154h to receive the appropriate form of an anchor 401 which couples the pipe 101 to the surface or ground 10, as well as the lid 115 to the tray 150.

Side flanges 154 that extend the length of each tray 150 may have holes 154h or perforation to allow the insertion of anchoring members or anchor bolts 401 or other means to tie the assembly of trays 150 to the underlying ground surface 10, and thus provide alternative anchoring means. In any of the various embodiments, the underlaying terrain, soil, or ground surface 10 may be solid or a bed of complaint matter 12 that can optionally be hardened and protected from wear or erosion by wind and water.

FIG. 22A illustrates schematically an alternative embodiment of the pipe 110 with installed cap, covers or lid 115 over a tray or base 150 for containing a plurality of conductor cables 101a, 101b and 101c. The base 150 has upright sidewalls 151 that terminate at a rim 152. The cap 115 in FIG. 22A may have outer descending flanges 115f that extend beyond the sidewalls 151 and the extend downward partially over the sidewall to prevent transverse movement once installed.

Alternatively, the cap 115 in FIG. 22B may have an inner portion 115i that descends partly below the rim 152 and an outer flange 115f that is disposed on the rim 152. One or more portions 115i of the cap 115 that descent below the rim 152 of the tray 150 allow the cap 115 to be sealed in place in the on the tray 150 when the descending portions are embedded in uncured concrete that fill the cavity 157 and surrounds the cable 101 and/or 102 or conduit tubing for receiving the same.

FIG. 23D illustrates a cross sections of an embodiment of the GLDS 100 in which the cable 101 are surround by a protective concrete 1501 that was formed by filling the trays 150 after the conductors 101 are inserted into bottom of the tray 150. The A soft or compliant filler material 12, such as sand may be placed on the ground 10 before setting down the tray 150, such that when the tray 150 is filled with concrete 1501 the weight allows it to settle in the sand 12 which conforms to the exterior bottom shape of the tray 150.

In FIGS. 23A and 23C the tray 150 has inward sloping sidewall 151 that terminate at a rim 152. The tray 150 has an interior bottom 153 between the bases of the sides 151. The exterior of the base of the sides walls 151 have side flanges 154 that extend laterally outward from each sidewall 151 and have a plurality of holes 154$h$ for receiving anchoring members or anchor bolts 401 that enter the underlying ground surface 10 to secure the plurality of trays 150 and thus the pipe 110 and GLDS 100 in place. The cables 101 or hollow dielectric tubes for receiving cable 101 may be placed within semi-circular channels 155 formed in the bottom 153 of the tray 150, and optionally channels for fiber optical cable 102. The upper flange 154$uf$ of the rightward tray will then extend over the lower flange 15$flf$ of the leftward tray 150. The tray 150 is completed by fixing the bottom 153 to the ground surface or terrain 10 before placing one or more conductive cables 101 or fiber optical cables 102 in the channel 155 in the bottom 153. Then the lid 115 is placed over the bottom 153 such that flanges 118 on the opposing sides of the lid 115 rim 117 extend over the flanges 154 of the bottom 153. Flange 118 may terminate at a downward extending edge 119 that extends over the vertical side of the flanges 154. The tray 150 can be filled with concrete via holes 116 in the top portion or lid 115. The filling of the trays 150 and placement of the lids 115 thereon then seals the overlapping flange of both the tray 150 and the lid 115. In other embodiments, the tray 150 can be filled to the rim of the sides and the lids 115 then attached before the concrete sets.

As shown schematically in FIG. 25A-25C the tray 150 itself may have either an open or flat bottom 153 and a plurality of cable supports strips 160 are disposed along the length of the end-to-end assembly of trays 150, each cable support strip 160 being spaced apart from the most adjacent cable support strips 160. The cable support strips 160 have a series of adjacent support surfaces, such as the semi-circular channels 165, which are intended for receiving cable 101. The cable strips 160 also have descending stand offs 167 to raise the circular channel 165 above an optional bottom 153 of the tray 150 or the top of the earth or soil 10. When concrete 1501 is added to fill the cavity 157, it can flow under the support strips 160, and more particularly under the circular channels 166 and thus when solidified provide support structural support if vehicles drive over the completed pipe 110 and prevent damage to the cable 101. Circular channels 166 may have a smaller diameter to support additional and smaller diameter fiber optical cables.

FIG. 26A-27C are perspective views the components of the trays 150 and the lids 115 for end-to-end assembly to form a section of a ground disposed pipe 110 for housing conductor cable 101. The trays 150 and lids 115 are intended in these Figures, among others to generally correspond with the corresponding components in FIG. 23A-26C. In particular, FIG. 26A shows a curved tray 150 before insertion of cable 101 and placement of the lid 115. FIG. 26B shows a partial view thereof that includes the ground 10 contacting portion of the tray 150, whereas FIG. 26C shows the fitting of the lid 115 over a single curved tray 150 before insertion of cable 101.

Figure 27A:
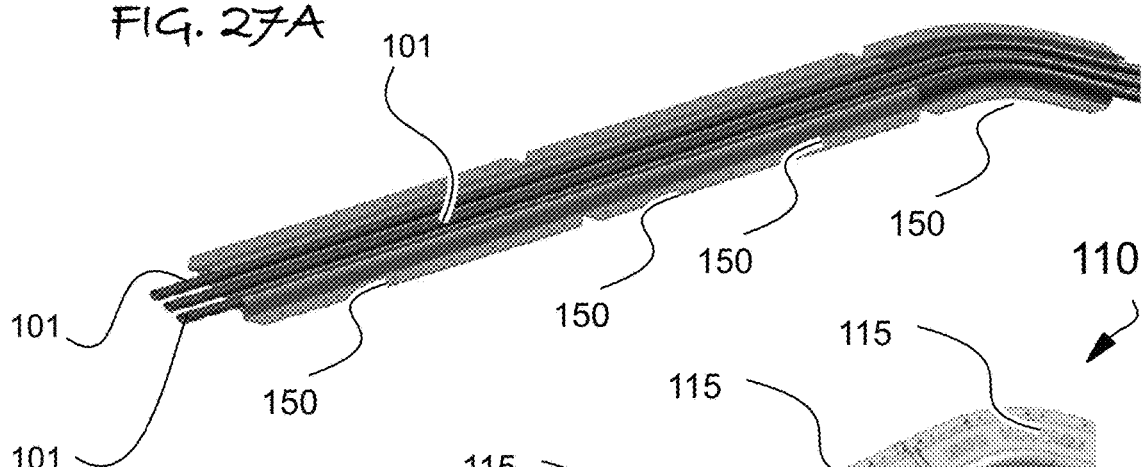
FIG. 27A-27D schematically illustrate in perspective view another alternative embodiment of the tray and lid for forming the ground-level distribution system.
Figure 27B:
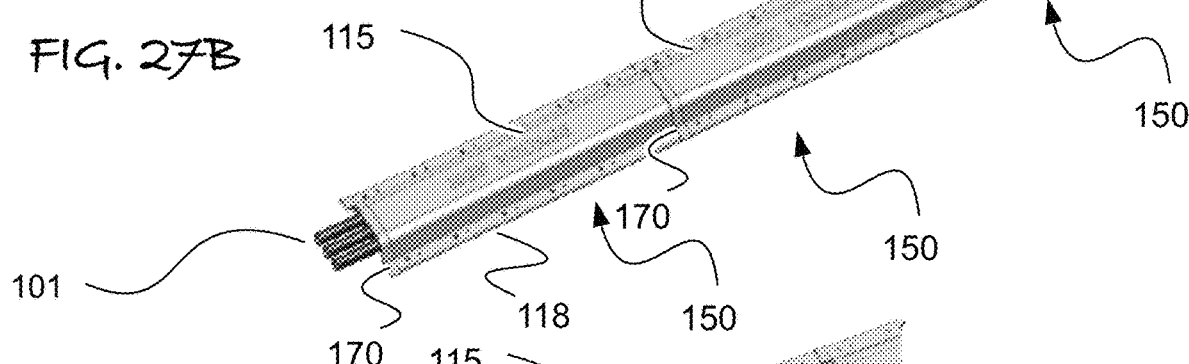

FIG. 27A illustrates in perspective view a plurality of trays 150 assembled end to end, for forming a portion of a ground mounted pipe 110, in which three or more cables 101 are in place before covering with the lid 115. FIG. 27B then shows the trays 150 covered by lids 115. FIG. 11C is an enlarged view of a portion of FIG. 11B, and FIG. 11D is an inverted perspective view of the coupler bar that 170 fits over the connection of adjacent trays 150 in which flanges at the front 150$f$ and back 150$b$ of adjacent trays 150 and lids 115 may meet.

Figure 27C:
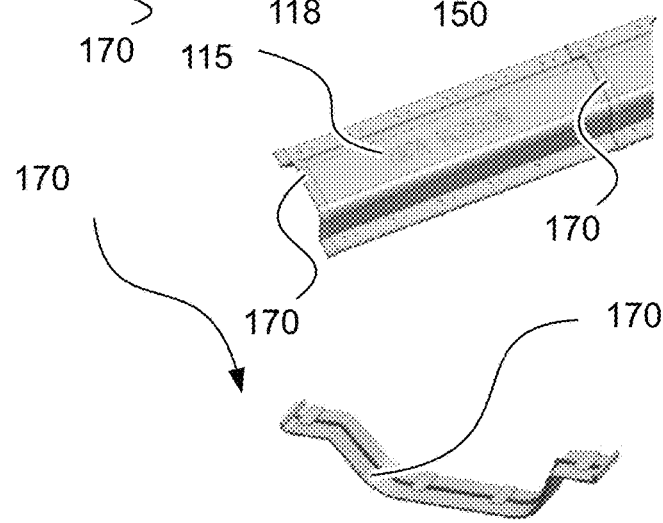
Figure 27D:
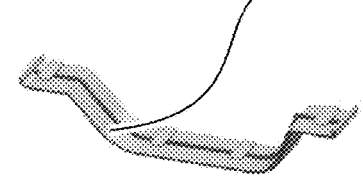

FIG. 27A-C also schematically illustrate that the caps or lid 115 may held in place by a coupler bar 170. Ideally the cap 115 and coupler bar 170 engage the tray 150 via a snap fitting. Hence, the coupler bar 170 is preferably configured of plastic that is sufficiently flexible to enable a snap fit over the portion of the caps 115 that cover adjacent trays 150. The trays or bases 150 may be curved to change the direction of the linear path, such as to proceed around obstacle or accommodate a transition to or from a vertical orientation, such as up a utility pole 11, as illustrated in FIG. 28C in which the path of the pipe 110 transitions from horizontal and at ground level to ascent up the side of the utility pole 11. The trays or bases 150 may be curved to better match the soil or terrain 10, as well as curved to the right or left on the ground (FIGS. 26B-C and FIGS. 27A-B) to change direction of the pipe 110 to avoid obstacles that are difficult or environmentally destructive to relocation, such as boulders or mature trees. When the terrain is particularly steep the lid 115 with holes 116 may be installed before inserting, pouring, or pumping concrete 1501 into the cavity 1507 between the cap or lid 115 and the tray 150.

FIG. 28A-C illustrated in perspective view portion of a pipe 101 connecting junctions 120 or to overhead power lines on poles 11. FIG. 28C illustrate how the pipe 110 enclosing cable 101 may have a tray 150 and lid 115 combine to curve on the ground surface and to arch upward from the ground surface 10 up the pole 11. In FIG. 28A the pole 11 to the left now longer supports OH lines as they extend in the pipe 110 on the ground surface. FIG. 28B illustrates the pipe 110 extending between and beyond junction 120. The junction 120 may contain system and environmental monitors which transmitted encoded signal thereof, such as fluctuations in voltage or current in any of the cable 101, the temperature thereof and that of the environment to the fiber optical cable 102 that is also enclosed in the pipe 110. The pipe 110 may be mounted or disposed on or at the ground surface, as illustrated in FIGS. 31A-32C, 30A and 30C, or extend over various structure that either by-pass surface structures obstacle or allow passage for wildlife, such as over tunnel 304 or under a vehicle ramp 301, well as connected to any pipe 110 with cable 101 that is supported above the ground surface such as with adjustable conduit stand 505 and conduit resting stand 501.

FIG. 29A-D illustrate in perspective view alternative shape or the bases or trays 150 and the caps or lids 115 for covering them that have a different number of channels for spacing apart and supporting cables or conduit 101 an/or 102.

Figure 30A:
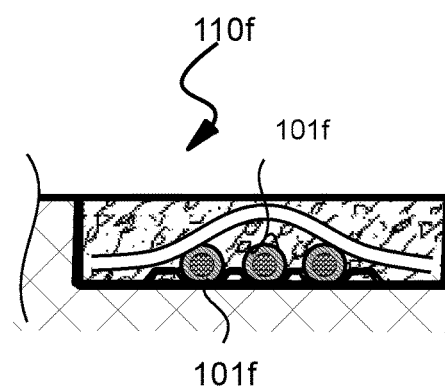
FIG. 30A-30D schematically illustrate portions of a GLDS 100 with a transition from a flush mounted variant thereof via a junction box (FIG. 30C) and a transition from a buried distribution system via a junction box (FIG. 30D) in which FIG. 30A corresponds to section line A-A in FIG. 30C whereas FIG. 30B corresponds to section line B-B in FIG. 30C.
Figure 30B:
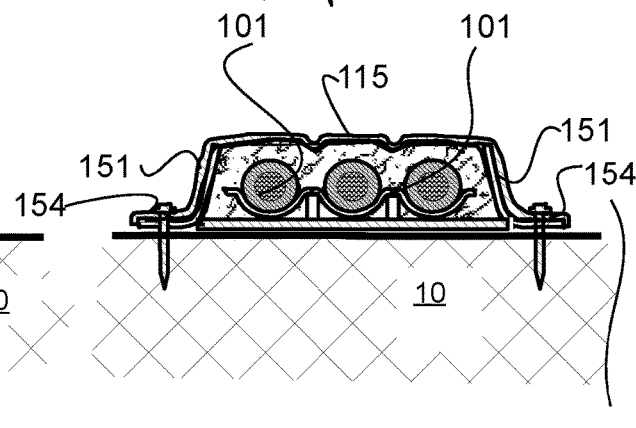
Figure 30C:
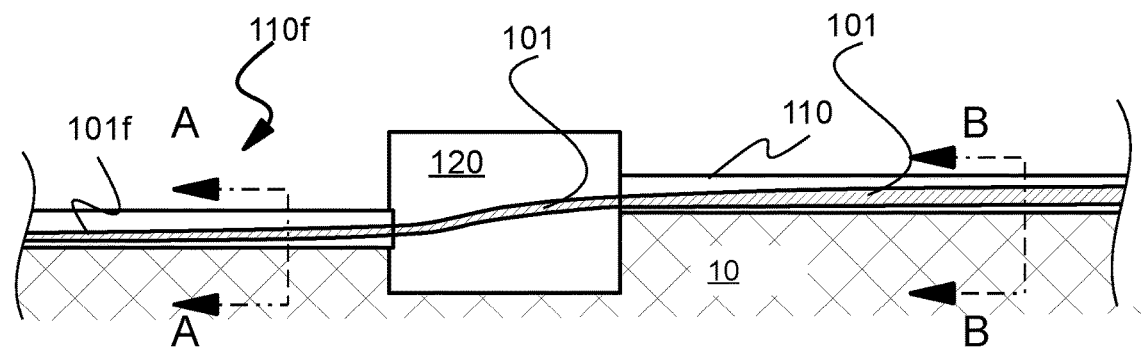
Figure 30D:
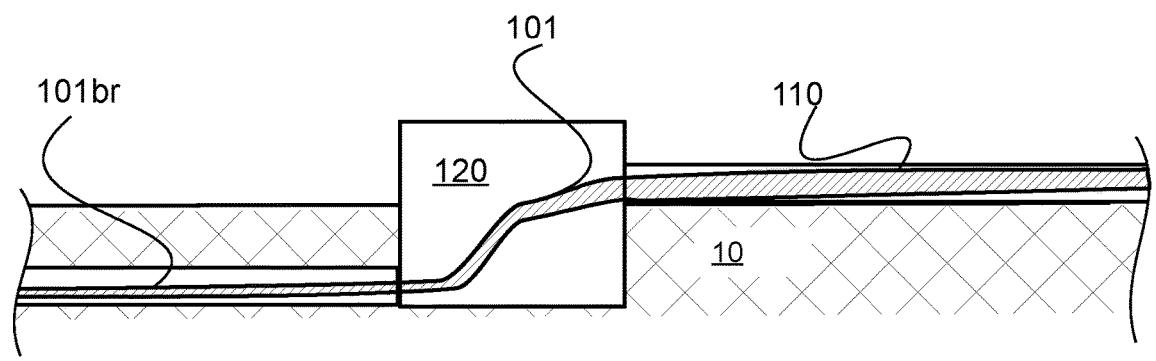
Figure 32A:
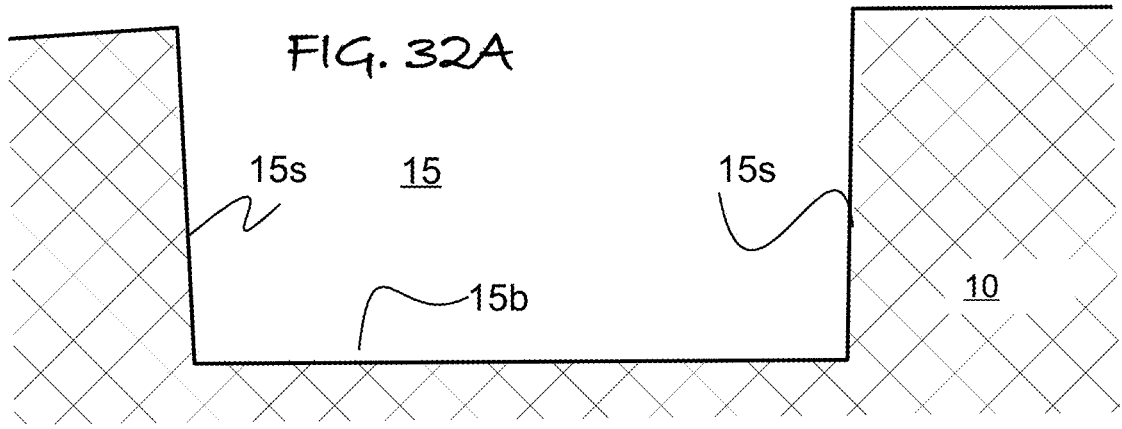
FIG. 32A-33C schematically illustrate in cross-sectional elevation views steps in a process for installing a flush mounted variant of a GLDS.
Figure 32B:
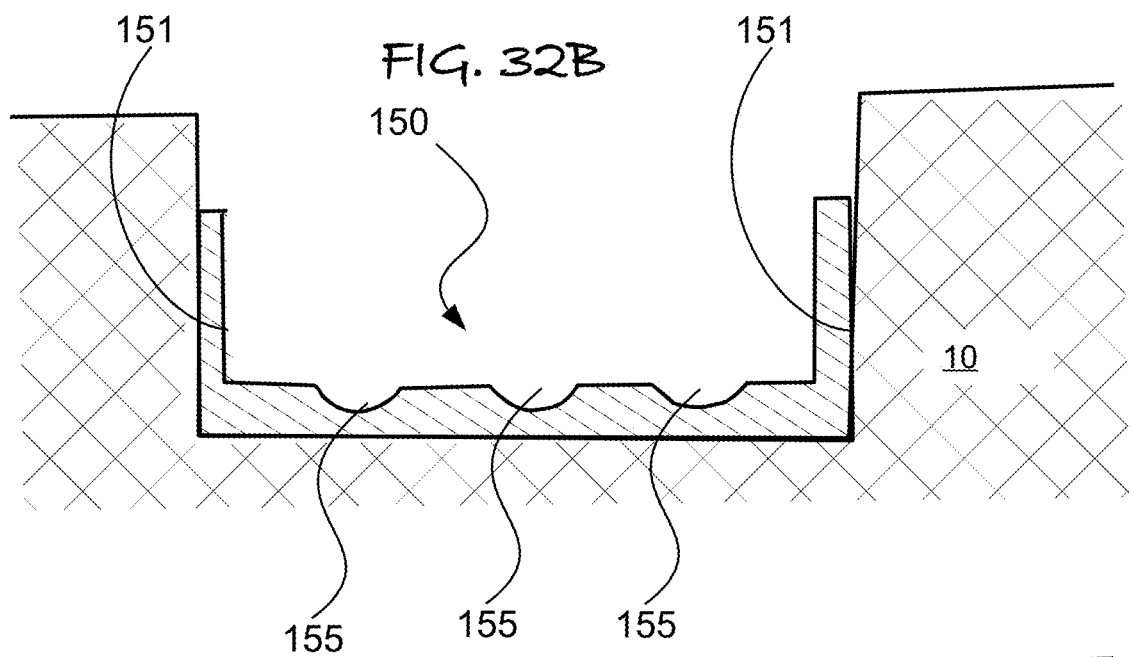
Figure 32C:
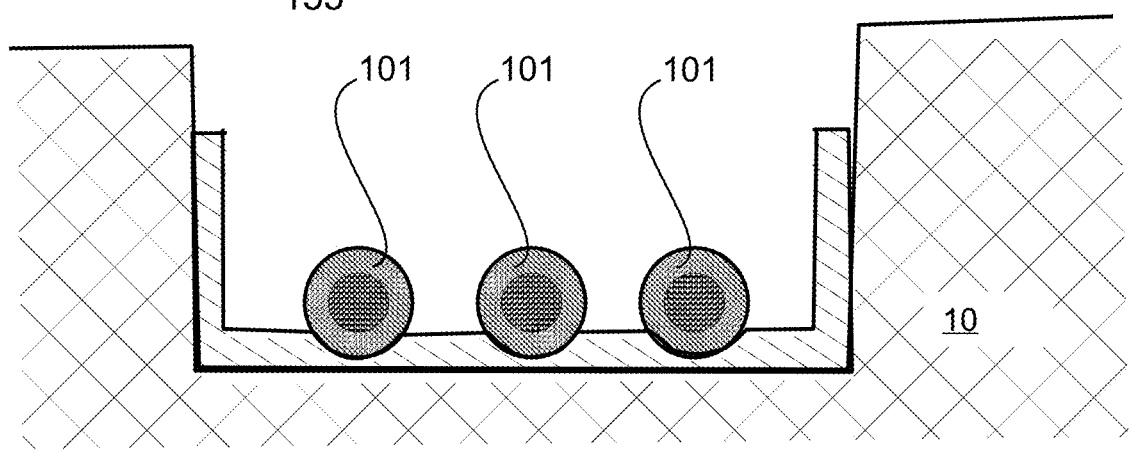
Figure 33A:
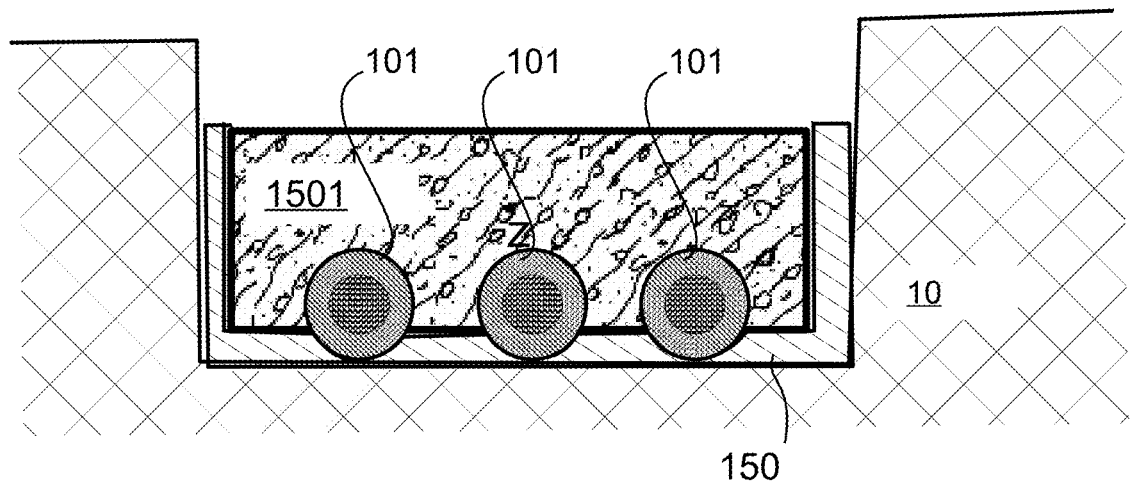
Figure 33B:
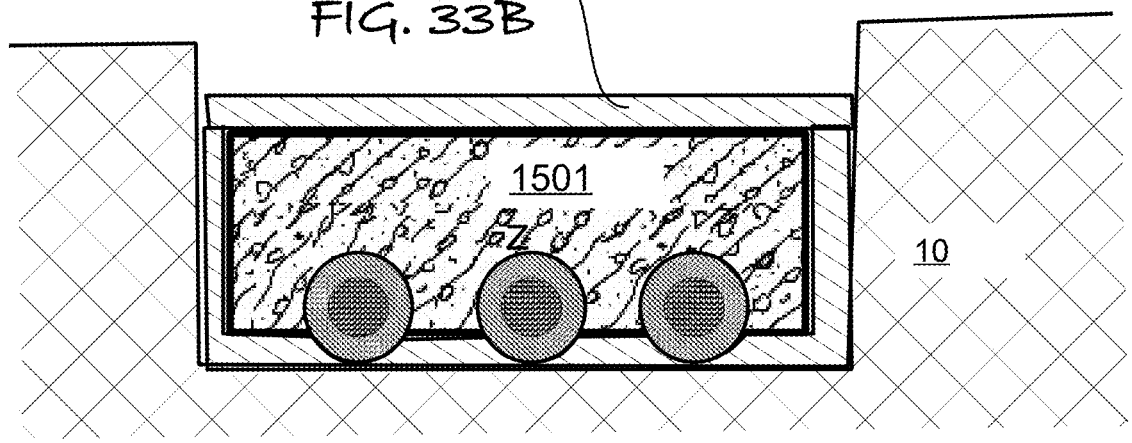
Figure 33C:
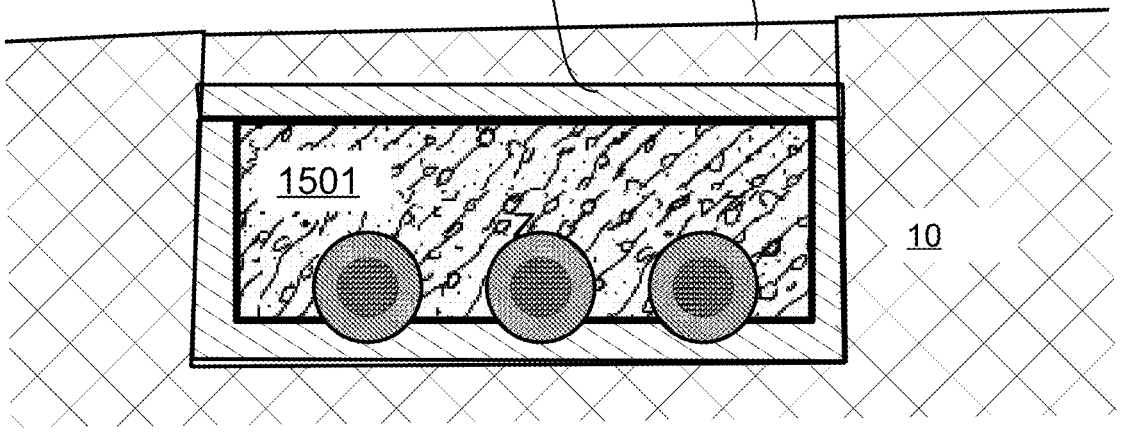

FIG. 30A-D illustrate in various views how a GLDS 100 may have a flush or essentially flush pipe 110 portion connected via a junction box 120 to a pipe 110 mounted or above the top of the terrain or soil 10. FIG. 30A corresponds to section line A-A in FIG. 30C whereas FIG. 30B corresponds to section line B-B in FIG. 30C. In FIG. 30A an essentially flush pipe 110f that contains conduits or cables 110f (to the left side of the elevation view in FIG. 30C) has a top at or just below ground level. FIG. 30B is cross-section elevation view of the ground level pipe 110 (to the rightside of the elevation view in FIG. 30C) with the cable or conduit 101 being slightly bent in the transition between them through the junction box 120 (FIG. 30C). FIG. 30D is a schematic side elevation view of the transition from a buried distribution system or pipe containing cables or conduits 101br on the left of the junction box 120 to the GLDS 100 on the right, in which the cable or conduit 101 is also bent in the transition. Such transitions can also be accomplished by splicing cable 101 in a junction box 120.

FIG. 31A-C illustrate alternative means for connecting a GLDS 100 to a buried distribution system in which the last unit or component of the pipe 110 is optionally a base or tray 150 with lid 115 that is tapered downward to brings the cable or conduit 101 into an optionally buried junction box 120 for underground distribution. In FIGS. 31B and 31D cable or conduit 101 is shown in cross-hatching, while alternative embodiment of these components are shown schematically in isolation in FIGS. 21A and C.

In FIGS. 31A and B, the combined base or tray 150 with lid 115 connects this last component that form the pipe 110 on the front side 150f while the end or back 150bf may form a sealed connection with the top of the junction box 120 so that the same cable or conduit 101 can extend between them with a gradual bend avoiding the need to form a splice via an intermediate connector in the junction box 120. The end or back opening 150bf faces downward while the front opening 150f faces sideways or laterally.

In FIGS. 31B and C, the cable 101 enter the buried box 120 from the sides, so the component, which optionally may comprise the base or tray 150 covered by lid 115 also tapers downward with a buried back face 150br provided for forming a preferably sealed connection to the junction box 120. Both the front side 150f and back face 150br that is buried face laterally. It should be understood that the use of the base or tray 150 with the lid 115 is merely an example, and these components may also be sealed at the top, rather than receive a lid for closure of an open top.

FIG. 32A-33C illustrate a process of installation using the base 150 with uprights sidewalls 151 to form a flush or essentially flush pipe 110 with multiple conductors 101, using a cross-section through the ground 10 that is transverse to the principal axis of the pipe 110. In the first step, FIG. a shallow trench 15 is formed in the ground surface 10 by excavation, or mounding soil or granular solid spaced apart to form the sides 15s that extend upward from the bottom 15b. Then, bases or trays 150 with upright sides 151 are inserted or formed in the in the trench 15, with earth 10 either being generally flush with exterior sidewalls 151 or being filled in with earth of other granular filler to the exterior of the sidewalls 151. Next, conductor 101 or conduits for receiving a flexible conductor 101 are placed in the mating depressions of channel 155, which are optionally part of the base, or formed by spaced apart cable supports strips 160 (as illustrated in FIG. 25A-C.) in either a base with sides, or if the earth or soil 10 surrounding the trench 15 is sufficiently stable then the cable support strip 160 may be placed on the bottom 15b of the trench 15. However, it is preferable to deploy some versions of the base or trays 150 with sides that can then serve as a guide, so the trench is excavated at a sufficient depth to protect the cable 101 and is still generally flush or slightly below with the top of the earth 10 to provide vertical space for adding an optional lid 115. The region between the sides 15s of the trench 15 and/or the sides 151 of a base or tray 150 is filled with concrete 1501 to cover the conductors 101. The lid 115 may then be set over the wet concrete to provide further protection, as well as a marking to aid in locating the pipe 110 in case of a need for further service or repair, as well as an additional warning barrier against inadvertent excavation thereof. To the extent the top of the lid 115 is below the level of the adjacent earth 10, it can be covered with layer 16, which is optionally earth or soil 10, or other granular material such as paving asphalt and the like when it is desired to provide ground level electrical distribution systems 100 adjacent streets and roads. The flush or essentially flush pipe 110 may be considered a Minimum Cover Cable system (MCCS) as the amount or soil 10 or aggregate covering the pipe 110 or the lids 115 thereof may be less than about 4 inches (100 mm), and the depth below the soil or terrain grade 10 of the bottom of the pipe 110 or the trays or bases thereof less than about 4 to 12 inches (100 mm to 300 mm), while still providing adequate protection to and from the high voltage in the conductors thereof, and eliminating the likely of live conductors being penetrated or exposed in a manner that can ignite fires. The amount or soil 10 or aggregate covering the pipe 110 or the lids 115 is also generally less than about half of the height of the cavity 5107 formed between a lid 115 and base or tray 150. Such flush or essentially flush pipe 110 of the MCCS can also be deployed below or as part of a GLDS 100 that includes ground level pipe 110 as described in other embodiment to create a Multi-Layer Electric Primary system.

In another embodiment of the method the various useful shapes of at least portion of the bases and trays 150 may be formed in the shallow trench by extruding a continuous base of concrete via one of a die and a pattern to provide walls and channel to space apart and support the conductor cable 101 and/or fiber optic cables 102. The continuous base 150 of concrete is preferably fire-resistant concrete.

FIGS. 34A and 34B illustrate another alternative embodiment of a junction box 120 for connecting segments of the pipe 110 in the GLDS showing how the cable 101 enter the base of the junction box 120 and then follow a convoluted path, such to first extent at least partway up the walls, then extend around the interior perimeter, then descending to exit on the opposite side. The extra length of each of the 3 cable 101 (for ground, neutral and powered cables) provided by the convoluted path within the junction box 120 provides for also additional space for including switches, 3 or more way distribution junctions as well as making splices if the GLDS segment 110 on one side is completely damaged and needs to be replaced by new cables 101 brought into the junction box 120. The junction box 170 may be of sufficient height to form a walk-in height enclosure that is formed of reinforcement, such as with an anchored cement foundation, walls and or roof to withstand high winds in storms and tornados. Such enclosures also have wind and debris impact resilient door and fitting for entering to provide service, testing, maintenance, or repair.

Figure 35A:
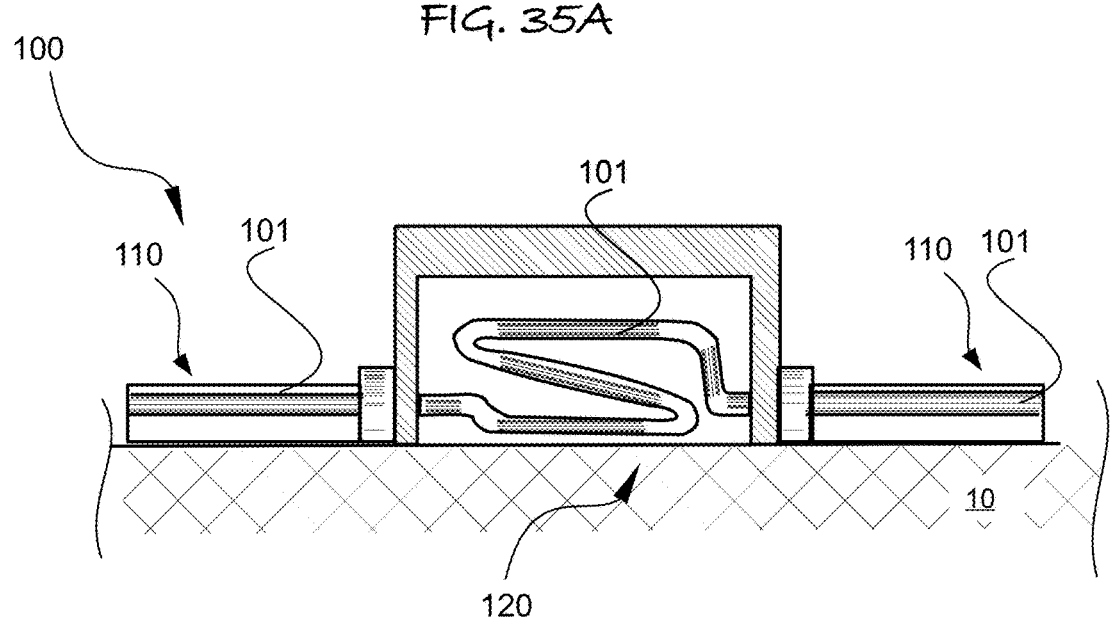
Figure 35B:
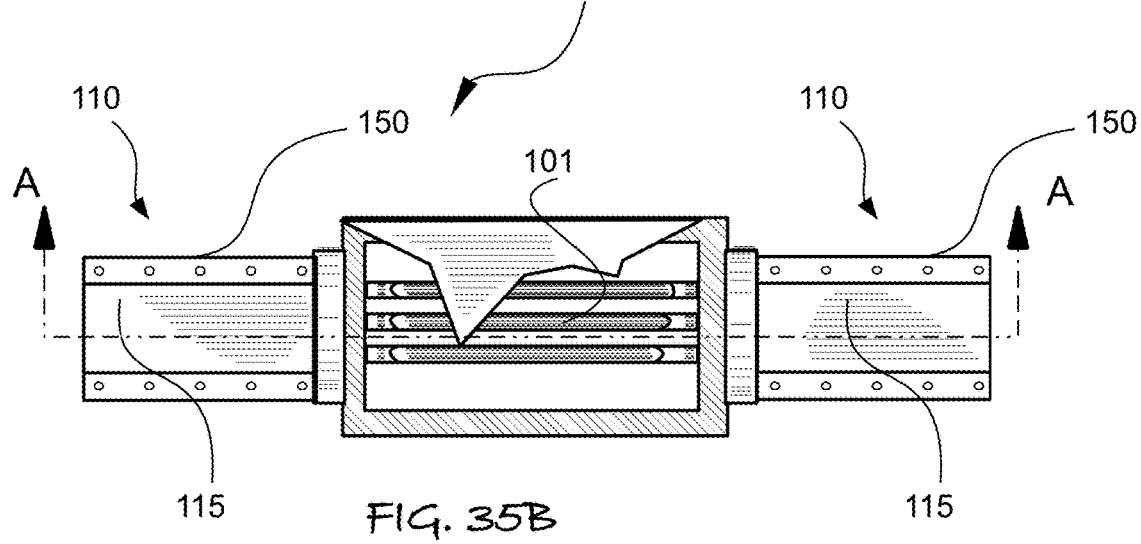
FIG. 35B is a cut-away top plan view thereof in which section line A-A corresponds to FIG. 35A.

FIGS. 35A and 35B illustrate an alternative embodiment of a junction box 120 in which each of the 3 cables 101 are situated side by side as the enter the junction box but are folded in a convoluted shape, such as the Z-pattern to provide extra cable length for making splices if the GLDS segment 110 on one side is completely damaged and needs to be replaced by new cables 101 brought into the junction box 120.

FIG. 36A-37C illustrate alternative means for making gradual adjustment of one or more of each GLDS component, such as the trays or enclosures 150 and lid 115 to follow a non-planar terrain or grade 10.

Figure 36A:
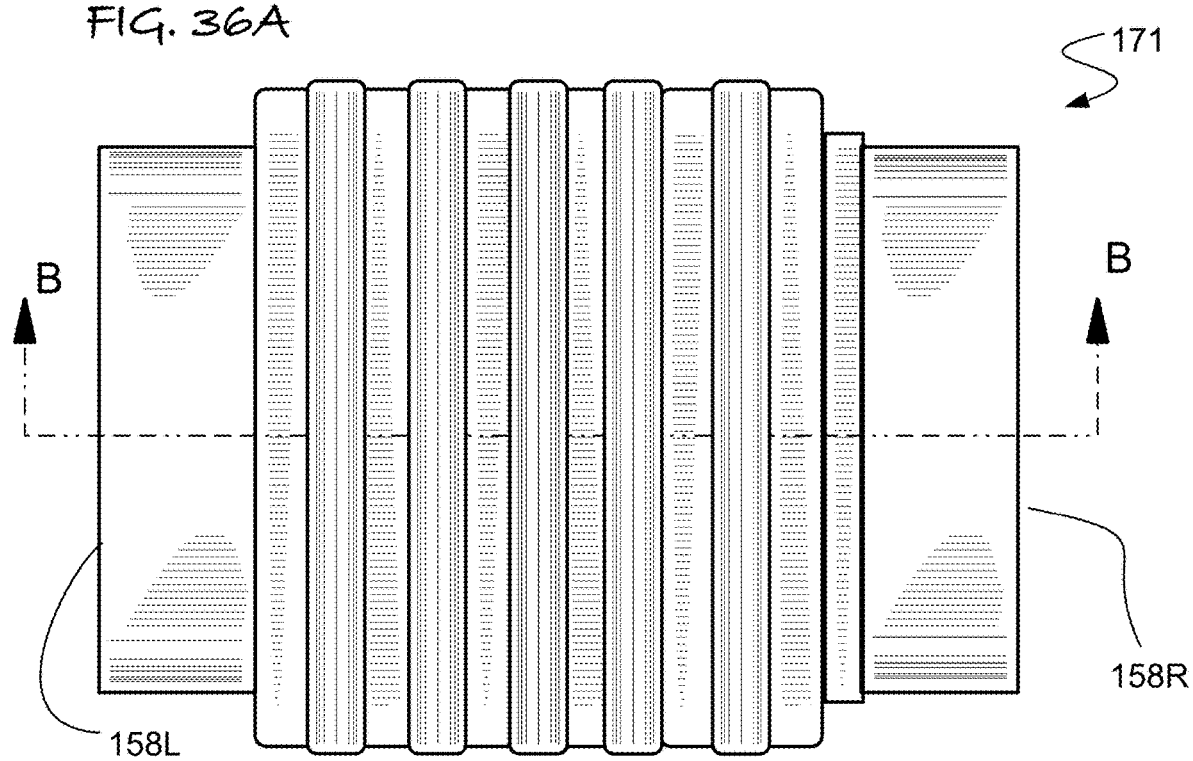
Figure 36B:
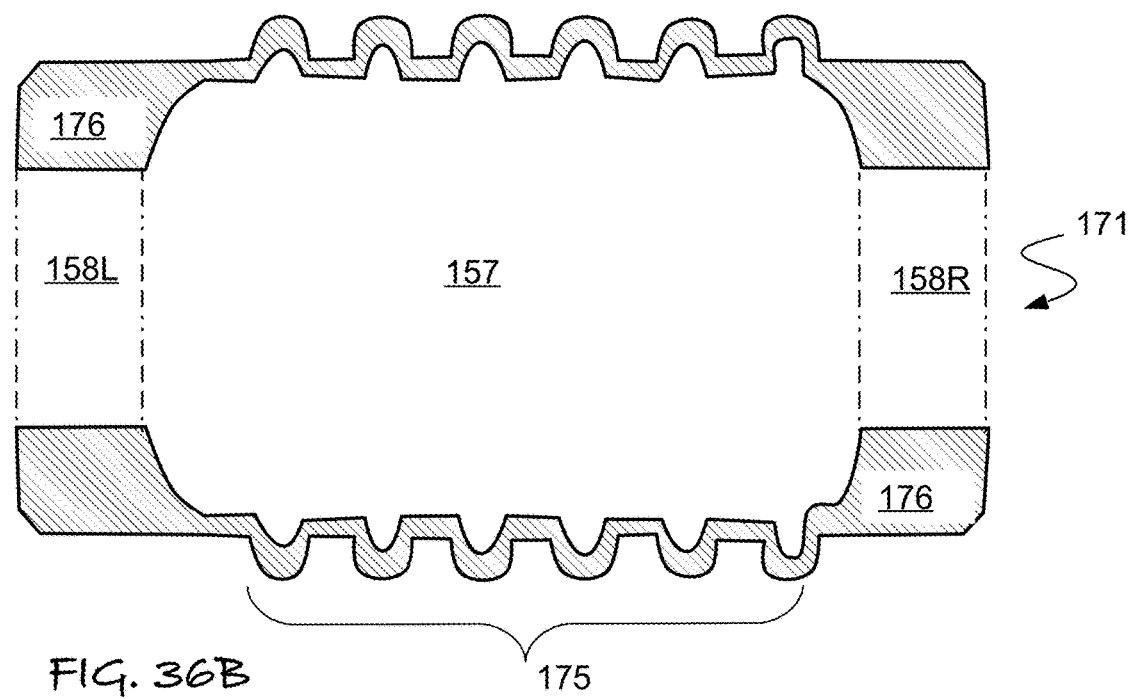
FIG. 36B is a cross-sectional elevation view thereof at section line B-B in FIG. 36A.

In FIGS. 36A and 36B a variant of a coupler 170 that is now a hollow coupling segment 171 with an interior cavity 157 for joining two assembled trays or enclosures 150 with lids 115. The hollow coupling segment 171 has a central or medial convoluted plastic or elastomeric portion 175 that is flexible until filled with solidified insulator such as concrete 1501. The central portion 175 may have more rigid or thicker opposing end portions 176 for engaging and sealing open ends of the tray or enclosure 150 either before or after inserting the lid 115. The depth of the hollow coupling segment 171 can be varied to accommodate the intended width of the pipe 110 transverse to the principal axis. The open right and left side segments 158R and 158L defined by the opposing ends 176 then extend outward from the central portion 175 to receive and sealingly engage the flanges at the front 150f and back 150b of adjacent trays or enclosures 150 to provide a variable change in angle of the pipe 110 that receives cable 101 to form the GLDS 100. Cables 101 that extend through the pipe 110 may then curves within the central convoluted portion 175. The convoluted central portion 175 may have thinner walls that the right and left side segments 158R and 158L so the flexure can occur at the changes in direction of the convolutions and/or flexible convoluted central portion 175 may be made of a more compliant or elastomeric polymer or resin, such as a thermoplastic elastomer or silicone rubber.

In FIG. 37A-C, the tray or enclosure 150 has a central portion 1575 that is hollow having a convoluted plastic or elastomeric outer wall capable of flexure as shown in FIG. 37C, in a similar mode to the convoluted plastic or elastomeric portion 175 in FIGS. 36A and 36B. In FIG. 37A the open base or tray component 150 for forming a pipe 100 of the GLDS 100 has a lid or cover 115 installed on the open left side 150L, whereas the lid 115 is or cover is not yet installed in the right side 150R. In the cross-sectional elevation view in FIG. 37C the cover or lid 115 is installed on the right side 150R and the left side 150L and the central convoluted portion 175 between them is flexed to tilt the right side 150R at an acute angle away from the left side 150L. The cable 101 is shown inside the cavity 157 in an exterior elevation view and curves within the central convoluted portion being supported on cable support strips 160 or optionally semi-circular channels 155 formed or placed in the bottom 153 of the right side 150R and the left side 150L of the tray or enclosure 150. The lids 115 on the left and right sides of the tray or enclosure may be installed before or after concrete 1501 is placed in the cavity 157. When the lids 115 are placed on the right 150R and left 150L sides the concrete 1501 may flow around the cable 101 from the upper adjacent enclosure 150 of the pipe 110.

It is preferable that the set of assembled trays or enclosures 150 and caps or lids 115, and/or functionally equivalent components are filled with a relatively fire resilient concrete 1501 so that a wildfire can pass through or adjacent the GLDS 100 while the concrete protects the integrity of filling material and overall system as it relates to longevity.

The concrete 1501 used to fill the pipe 110 may be admixed with clay, limestone, and gypsum as well as non-metallic reinforcing fibers, such as glass fiber and aramid fibers to improve strength and fire resistance. Appropriate concrete formulations are provided in the following patent documents, all of which are incorporated herein by reference: U.S. Ser. No. 10/029,945B2 issued 2018 Jul. 24 to WERZ J, et al.; U.S. Pat. No. 4,276,091A issued 1981 Jun. 39 to Kaiser Aluminum Corp.; U.S. Pat. No. 5,472,497A issued on 1992 Jun. 20 to Jaklin, H. and CN108975810A published 2018 Dec. 11 (inventors She Wei et al.)

Fire resistant concrete 1501 will also contain a potential internal ignition within the pipe 110, as well as maintain structural integrity where the cables 101 are not damaged by external or internal heat, and thus limit the portion of the GLDS 100 that would need local repair.

It is also preferable that the set of assembled trays 150 that together form the sealed elongated pipe 110 are fabricated from a dielectric material or composite that is either neither flammable nor will propagate flames that originate either internally or externally. A range of plastic resins, and particularly plastic resins that contain particulate and/or glass fibers for reinforcement, as well as organic flame retardant additives are known for this purpose. Non-limiting examples of these materials are disclosed in the following patent documents, which are incorporated herein by reference. The includes EP2346130A2 issued 2011 Jul. 20 to Kupilik, P. et al. for "Fireproof tube for cables"; and U.S. Pat. No. 5,985,385A which issued on 1999 Nov. 16 to Gottfied S and U.S. Pat. No. 5,681,640A issued Oct. 28, 1997 to Kiser, M. D.

There are also many types of suitable plastic materials commercially available such as Kydex T™ brand formable and fire-retardant sheet from ACI Plastics of 3001 Spruce St. St. Louis, Mo. 63103Royalite™ brand Aerospace Rated Sheet as well as Oyalite FR Weather Resistant Sheet, R87/59, both available from Spartech 11650 Lakeside Crossing Ct. Maryland Heights, Mo., United States, 63146. Also, potentially useful materials are plastic, resins and composites qualified for use on aircraft interiors due to their FAR 25/853 flame-rated compliance. Such materials may include the Royalite® product line, Noryl™ Modified Polyphenylene Ether Sheet, GTX grade UL 94HB and EN265 grade UL 94V-1, as well as composites and filled resins (such as with granular fillers, discrete fibers or continuous fibers) based on any of the following polymers, which include without limitation: Polyetherether ketone (PEEK), Polyetherketone (PEK), polyphenylene sulfide (PES), Polyphenylene Ether (PPE), Polyamide-imide, blends of polyvinylchloride (PVC) and acrylic, butadiene and styrene copolymers (ABS) and blends of PVC and acrylic resins. Fiberglass, mineral and ceramic fillers, and flame retardant compounds can be used as fillers to render various plastic resins such as the above less flammable and likely to propagate flames, and thus comply with standards such as UL 94 V-0, 5VA, HB, FMVSS 302. Furthermore, the plastic resins may contain ultraviolet (UV) light absorbing fillers, such as titanium dioxide and zinc oxide to improve resistance to degradation from solar exposure on the upper and side surface of the lids 115 and bases or trays 150, and similar components such as the coupler bars 170.

It should be appreciated that the use of plastic trays 150 and lids 115, and components with equivalent function or placement or assembly may be fabricated from materials other than plastic, resin or plastic/resin and fiber composites, such as without limitation pre-cast concrete components or ceramic components. Depending on strength and stiffness of the material used to form the trays and bases 150 and related structure that support the cable 101 the thickness of the upright walls 154 is preferably at least about 0.1 inches thick (2.5 mm) to about 0.5 inches (12 mm) and more preferably about 0.25 inches (6 mm) thick or greater. The height of the trays or bases 150 may vary to accommodate cable 101 of different diameter. The cable support strips 160 and the channels and the semi-circular channels 155 formed in the bottom 153 of the tray 150, as well as comparable structures in other embodiments for supporting cables 101 and 102 may be formed of or coated with low coefficient of friction resins such as Ultrahigh Molecular Weight Polyethylene (UHMWPE), fluoropolymers, polyamide resins and resins filled with low friction fillers, such as molybdenum disulfide to facilitate pulling cables through the pipe 110 with or without the covers or lids 115 in places as an alternative to laying the cables 101 into the cable support strips or semi-circular channels 155 and comparable structures in other embodiments.

It should be appreciated that significant benefits accrue from using various plastic materials for the trays 150 and lids 115 in combination with encasing the conductors 101 in concrete. The trays 110 with various sidewalls for a mold for containing the liquid concrete when it is poured to cover and protect the conductors 110. Then, by covering the opening in the tray 150 with the plastic lid 115 the concrete filler 1501 is protected from the elements which can erode it. The lid 115 also provides a means to indicate the location of a live conductor to enhance safety. The indication in the lid 115 can be embossed so it is still visible if a sticker, decal, or painted indicia becomes faded over time, or is washed or eroded away.

It should also be appreciated that other benefits of the various embodiment of the GLDS 100 may include reliable power to customers that is robust in resisting damage and interruptions from high winds or storms.

Further, the GLDS 100 will also eliminate or reduce utilities cost in vegetation management, and the risk of tree/root growth into facilities (as experienced in underground systems) and improve the ease of inspection of the same to promote prompt interventions that avoid service disruptions.

In addition, the GLDS will eliminate the risk of dig-ins by providing clear indication of high-power line. The GLDS 100 further improves the environmental hazard management to support leach field challenges and methane gases below ground, which has challenged Pacific Gas and Electric in restoring new service to the Northern California town of Paradise after it was destroyed by a wildfire.

The various embodiment of the GLDS 100 may be particularly suited as a solution to provide electric services that transit utility easements (PUE) due to limited space, as well as situations in which fire risk from OH power lines need to be mitigated without excavation, such as on Native America reservations, organic farms and vineyard that surround wineries.

While the invention has been described in connection with a preferred embodiment, it is not intended to limit the scope of the invention to the particular form set forth, but on the contrary, it is intended to cover such alternatives, modifications, and equivalents as may be within the spirit and scope of the invention as defined by the appended claims. Such alternatives may include various combinations and sub-combinations of components, materials, features, process steps and other aspects of the innovations from some embodiments, with those in other embodiments.

For example, in all the embodiments in which a lid 115 is used to cover a tray or base 150 to form an enclosure to be coupled with other enclosures to form the pipe 110, some of the lids 115 may have holes for filling the pipe 110 with a granular or fluid material like various aggregates and concrete. In an additional example any of the enclosures may be curved or best within a common plane of the pipe 110 or bent, to direct the pipe 110 upward or downward, or deploy a flexible enclosure or couple multiple enclosures with flexible couplings to provide a gradual modulation of slope of portion of the pipe 110 to match the terrain or ground 10, both for pipe 110 disposed on the ground level or essentially flush with the terrain or ground level 10.

I claim:

1. A ground level primary electric distribution system (GLDS) that comprises:
    a. a plurality of trays connected at opposing ends to form an elongated cavity for receiving a plurality of spaced apart conductor cables,
    b. each tray being covered by a lid configured to close an upper horizontal opening in the tray in which one of the lid and the tray have lateral sides that are generally orthogonal to the opposing ends in which the lateral sides slope upward from a lateral base of the tray to the upper horizontal opening in the tray,
    c. in which at least a portion of the lateral base of the tray is disposed substantially at ground level,
    d. a plurality of spaced apart conductor cables extending within the elongated cavity, in which a space between the conductor cable and the lid is filled with a fire-resistant solid that has hardened to bind the conductor cables to the tray.

2. The ground level primary electric distribution system (GLDS) according to claim 1 in which the lids and trays are formed of a non-flame propagating plastic material.

3. The ground level primary electric distribution system (GLDS) according to claim 2 in in which at least some of the tray have one or more of outward extending flanges that extend outward orthogonal to a principal axis of the elongated cavity.

4. The ground level primary electric distribution system (GLDS) according to claim 1, in which at least some of the trays are covered by lids that have downward extending side walls.

5. The ground level primary electric distribution system (GLDS) according to claim 1 in which at least some of the trays are covered by lids having lower portion that that penetrate below a rim at the horizontal opening to be at least partially immersed in the fire-resistant solid that has hardened to bind the lid to the tray and cables.

6. The ground level primary electric distribution system (GLDS) according to claim 1 in which at least some of the trays have one of a central portion with an interior cavity surrounded by convoluted flexible walls and are connected to an adjacent tray by an enclosure with convoluted flexible walls.

7. The ground level primary electric distribution system (GLDS) according claim 1 in which fire-resistant solid is a fiber reinforced concrete.

8. The ground-level primary electric distribution system of claim 1 further comprising one or more junctions within portion of the distributions system in which ends of conductors cables are one of spliced and coupled in electrical communication to a common bus in which the conductor cables extend in a convoluted path within the junction.

9. The ground-level primary electric distribution system of claim 1 in which the conductor cables are energized to at least 4,000 V.

10. The ground-level primary electric distribution system of claim 1 in which at least some of the connections between adjacent trays and the lids disposed thereon are covered by a plurality of coupling bars.

11. The ground-level primary electric distribution system of claim 1 in which the conductor cables are insulated with a flexible dielectric material and one of the lid and trays are more rigid than the flexible dielectric material.

12. The ground-level primary electric distribution system of claim 1 in which at least some of the trays and lids have horizontal outward extending side flanges disposed in proximal contact with the ground and are coupled thereto by anchoring fasteners that extend through overlapping holes in the side flanges of the lids and the side flanges of the trays.

13. The ground-level primary electric distribution system of claim 1 in which at least some of the lids have downward extending portions that cover exterior lateral sides of the trays.

14. The ground-level primary electric distribution system of claim 13 in which at least some of the lids with downward extending portions that cover the exterior of the lateral sides of the trays have outward extending horizontal flanges.

15. The ground-level primary electric distribution system of claim 14 in which at least some of the outward extending lateral flanges of the lids have through holes for receiving anchors fasteners to couple at least portion of the GLDS to the ground.

16. The ground-level primary electric distribution system of claim 8 in which at least one junction is a walk-in height reinforced enclosure.

17. The ground-level primary electric distribution system of claim 1 in which at least some of the lids have downward extending portion that covers the exterior of the lateral sides and in which the laterals side have horizontally outward extending flanges which are covered have horizontally outward extending flanges of the lids.

18. The ground-level primary electric distribution system of claim 17 in which at least some of the horizontally outward extending flanges of the lids and the trays have overlapping holes, at least some of the overlapping holes receiving anchoring fasteners that extend therethrough to couple the GLDS to the ground.

19. The ground-level primary electric distribution system according to claim 17 in which connections between at least some adjacent trays and the lids are covered by at least one coupling bar that engages at least one of the horizontally outward extending flanges of the lid after being flexed to snap in place over the horizontally outward extending flanges of the lids and the trays.

20. A ground level primary electric distribution system (GLDS) that comprises:
   a. a plurality of trays connected at opposing ends to form an elongated cavity for receiving a plurality of spaced apart conductor cables,
   b. each tray being covered by a lid configured to close a horizontal opening in the tray in which one of the lid and the tray have lateral sides that are generally orthogonal to the opposing ends in which the lateral sides extend upward proximal to a lateral base of the tray toward the horizontal opening in the tray,
   c. in which at least a portion of one of the lid and lateral base of the tray is substantially at ground level,
   d. a plurality of spaced apart conductor cables extending within the elongated cavity, in which at least a portion of the space between the conductor cables and the lid is filled with a dielectric filler in which at least some of the spaced apart conductor cables are a cable within a conduit (CIC).

21. The ground level primary electric distribution system (GLDS) according to claim 20 in which at least some of the trays have a one of a central portion with an interior cavity surrounded by a convoluted flexible walls are connected to an adjacent tray by an enclosure with convoluted flexible walls.

22. The ground level primary electric distribution system (GLDS) according to claim 20 in which at least some of the trays are covered by a domed lid.

23. The ground level primary electric distribution system (GLDS) according to claim 20 in which at least some of the trays support each of the spaced apart conductor cables in a concave channels formed in the lateral base of the tray.

24. The ground level primary electric distribution system (GLDS) according to claim 23 in in which at least lower exterior portions of the concave channels do not contact the ground.

25. He ground level primary electric distribution system (GLDS) according to claim 24 in in which for at least some of the trays the dielectric filler is fire-resistant solid that has hardened to bind the conductor cables to the tray.

26. The ground level primary electric distribution system (GLDS) according to claim 24 in which for at least some of the trays the dielectric filler is concrete.

27. The ground level primary electric distribution system (GLDS) according to claim 24 in which for at least for some of the trays the dielectric filler is fiber reinforced concrete that is not flammable.

28. The ground level primary electric distribution system (GLDS) according to claim 25 in in which for at least some of the lids and trays are formed of a non-flame propagating plastic material.

29. The ground level primary electric distribution system (GLDS) according to claim 20 in which at least some of the connections between adjacent trays and the lids disposed thereon are covered by a plurality of coupling bars.

30. The ground level primary electric distribution system (GLDS) according to claim 20 in which at least some trays have flanges at opposing open ends in which one open end has an outer flange and the opposing open end of the connecting tray has an inner flange in which the outer flange of the tray extends over the inner flange of the adjacent tray.

* * * * *